US007022469B2

(12) United States Patent
Suzuki et al.

(10) Patent No.: US 7,022,469 B2
(45) Date of Patent: Apr. 4, 2006

(54) SILVER HALIDE PHOTOGRAPHIC LIGHT-SENSITIVE MATERIAL

(75) Inventors: Hiroyuki Suzuki, Kanagawa (JP); Hirotomo Sasaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/825,672

(22) Filed: Apr. 16, 2004

(65) Prior Publication Data

US 2004/0202974 A1 Oct. 14, 2004

Related U.S. Application Data

(62) Division of application No. 10/635,441, filed on Aug. 7, 2003, which is a division of application No. 10/084,946, filed on Mar. 1, 2002, now Pat. No. 6,673,531.

(30) Foreign Application Priority Data

Mar. 1, 2001 (JP) .......................... P.2001-057069
Mar. 12, 2001 (JP) .......................... P.2001-068853
Mar. 12, 2001 (JP) .......................... P.2001-068855

(51) Int. Cl.
*G03C 1/09* (2006.01)
*C01G 3/12* (2006.01)
*C01B 17/00* (2006.01)
*C01F 7/74* (2006.01)
*C07F 1/08* (2006.01)

(52) U.S. Cl. ........................ 430/603; 430/605; 423/48; 423/561.1; 423/565; 556/113

(58) Field of Classification Search ................ 430/600, 430/603, 605, 608; 423/48, 561.1, 565, 561.5; 556/113
See application file for complete search history.

(56) References Cited

U.S. PATENT DOCUMENTS

| | | | | |
|---|---|---|---|---|
| 2,597,915 | A | 5/1952 | Yutzy et al. | |
| 3,408,196 | A | 10/1968 | McVeigh | |
| 3,408,197 | A | 10/1968 | McVeigh | |
| 3,442,653 | A | 5/1969 | Dunn et al. | |
| 4,165,380 | A * | 8/1979 | Hill | 514/495 |
| 5,252,455 | A | 10/1993 | Deaton | |
| 5,362,470 | A * | 11/1994 | Masutomi et al. | 423/509 |
| 5,376,522 | A | 12/1994 | Takiguchi et al. | |
| 5,700,631 | A | 12/1997 | Lok et al. | |
| 5,759,761 | A | 6/1998 | Lushington et al. | |
| 5,783,372 | A | 7/1998 | Budz et al. | |
| 6,316,178 | B1 | 11/2001 | Yamashita | |

FOREIGN PATENT DOCUMENTS

JP 4-342249 * 11/1992

* cited by examiner

*Primary Examiner*—Richard L. Schilling
(74) *Attorney, Agent, or Firm*—Sughrue Mion, PLLC

(57) ABSTRACT

A silver halide emulsion is disclosed, comprising at least one monovalent Au(I) complex coordinated with a compound represented by the following formula (1):

$$R^1—Ch—R^2 \quad (1)$$

wherein $R^1$ and $R^2$ each independently represents an alkyl group, an alkenyl group, an alkynyl group, an aryl group or a heterocyclic group, $R^1$ and $R^2$ may combine with each other to form a 3-, 4-, 5-, 6- or 7-membered ring, and Ch represents a sulfur atom, a selenium atom or a tellurium atom.

20 Claims, No Drawings

SILVER HALIDE PHOTOGRAPHIC LIGHT-SENSITIVE MATERIAL

This is a divisional of U.S. application Ser. No. 10/635,441 filed Aug. 7, 2003, which is a Divisional Application of U.S. application Ser. No. 10/084,946 filed Mar. 1, 2002 now U.S. Pat. No. 6,673,531, the disclosures of all of which are incorporated herein by reference.

FIELD OF THE INVENTION

The present invention relates to a silver halide emulsion, more specifically, the present invention relates to a silver halide emulsion ensuring high sensitivity, high contrast and low fog, reduced in the fluctuation of sensitivity due to difference in the humidity condition in aging after exposure or at the exposure, and exhibiting excellent reciprocity law characteristics at high illuminance. The present invention also relates to a production method of the emulsion and a silver halide photographic light-sensitive material using the emulsion.

BACKGROUND OF THE INVENTION

The silver halide emulsion for use in silver halide photographic light-sensitive materials is usually subjected to a chemical sensitization using various chemical substances so as to obtain desired sensitivity and gradation. Representative examples of known chemical sensitization methods include sulfur sensitization, selenium sensitization, tellurium sensitization, noble metal sensitization using gold or the like, reduction sensitization and various sensitization methods using a combination thereof. Recently, silver halide photographic light-sensitive materials are strongly demanded to have high sensitivity, excellent graininess, high sharpness and rapid processability with expedited progress of development and to cope with these requirements, various improvements have been made on the above-described sensitization methods.

Also, color printing papers are demanded to have enhanced sensitivity, image quality and performance at the processing, such as toughness, and to satisfy these requirements, an emulsion ensuring high sensitivity and high contrast and an emulsion reduced in the fluctuation of photographic properties due to difference in the temperature and humidity conditions at exposure are demanded. On the other hand, apparatuses for laser scanning exposure are recently widespread and therefore, suitability for short-time and high-illuminance exposure becomes one of importance performances. The laser scanning exposure is greatly characterized in that the exposure can be performed at a high speed and the resolution can be improved. However, the color printing paper to which the laser scanning exposure is applied must have suitability for unprecedentedly short-time (specifically $10^{-6}$ sec.) and high-illuminance exposure.

Among those sensitization methods, most widely and commonly used is a gold-sulfur sensitization method using a so-called labile sulfur compound capable of reacting with silver ion to produce silver sulfide and a gold compound. This method is described in detail, for example, in P. Grafikides, *Chimie et Physique Photographique,* 5th ed., Paul Montel (1987), T. H. James (compiler), *The Theory of the Photographic Process,* 4th ed., Macmillan (1977), and H. Frieser, *Die Grundlagen der Photographischen Prozesse mit Silber-halogeniden*, Akademische Verlagasgeselshaft (1968).

In applying a gold-sulfur sensitization to a silver halide emulsion, a method of individually adding a labile sulfur compound capable of reacting with silver ion to produce silver sulfide and a gold compound is generally used and this method is described in the publications cited above and also in *Nippon Shashin Gakkai Shi* (*Journal of Japan Photographic Society*), vol. 50, No. 2, page 108 et seq. (1987) and *Journal of the Optical Society of America*, vol. 39, No. 6, page 494 et seq. (1949). The gold compound and the labile sulfur compound used in the methods described in these publications are a chloroauric acid and a thiourea compound or a thiosulfate, respectively. However, use of these compounds has various problems, for example, the attained elevation of sensitivity is not sufficiently high, fogging is readily generated, the gradation is softened and the light-sensitive material after storage for a long period of time undergoes serious generation of fog. Thus, means to solve these problems is keenly demanded.

As for the method of applying gold-sulfur sensitization using a gold compound other than the chloroauric acid, methods using a gold complex of thioethers described in JP-B-38-6447 (the term "JP-B" as used herein means an "examined Japanese patent publication") and JP-A-62-85239 (the term "JP-A" as used herein means an "examined published Japanese patent application"), a gold complex of rhodanines described in JP-A-1-147537, a gold complex of mesoions described in JP-A-4-267249, or a gold complex of hydantoins described in JP-A-4-268550 are known. However, these methods all are not satisfactory for solving the above-described problems.

JP-A-4-67032, JP-A-4-75053 and JP-A-4-86649 describe gold complex compounds which, it is stated, have an effect of improving the increase of fog in aging of a light-sensitive material for a long period of time and preventing the deterioration of graininess accompanying the increase of fog. These compounds, however, all fail in exhibiting an activity enough to solve the above-described problems.

Other than these, a gelatin dispersion of gold sulfide colloid is generally known as a gold sensitizer. A preparation method of gold sulfide colloid is described in *Research Disclosure*, Item 37154, page 227 (March, 1995), however, if a gold sulfide colloid is prepared according to this method, as described in *Nippon Shashin Gakkai Dai* 15 *Kai Shuki Kenkyu Happyo Kai Koen Yoshi Shu* (*Japan Photographic Society,* 15*th Autumn Meeting for Presentation of Researches, Summary of Lectures*), page 26, cyan ion which is environmentally harmful is disadvantageously produced as a by-product. Furthermore, since the gold thiocyanate is sparingly soluble such that the solubility product is about 25, precipitates undesired in view of production may be disadvantageously produced.

Other than the above-described Au(I) compounds containing a monovalent gold atom, Au(III) compounds containing a trivalent gold atom, such as chloroauric acid, are also known as the gold sensitizer. The chloroauric acid is sufficiently stable in an aqueous solution but gives photographic properties insufficient in view of, for example, sensitivity, gradation, suitability for high-illuminance exposure and toughness against temperature and humidity environments at the exposure. Thus, this compound is still in need of improvements.

JP-A-4-204724 describes a method for applying gold-selenium sensitization to a silver halide emulsion, where a labile selenium compound capable of reacting with silver ion to produce silver selenide and a gold compound are separately added. This technique also incurs conspicuous increase of fog and cannot solve the above-described problems.

SUMMARY OF THE INVENTION

Under these circumstances, the present invention has been made to solve the above-described problems.

One object of the present invention is to provide a silver halide photographic light sensitive material in which a specific gold-chalcogen complex is used and thereby which is ensured with low fog and high sensitivity, reduced in the generation of fogging during storage for a long period of time, less fluctuated in the sensitivity due to aging after exposure and favored with high contrast.

Another object of the present invention is to provide a silver halide color photographic light-sensitive material which is advantageous in view of cost and environment, ensures high sensitivity and high contrast, less fluctuates in the sensitivity due to difference in the humidity condition at the exposure and exhibits excellent high-illuminance reciprocity law characteristics.

Still another object of the present invention is to provide a preparation method of gold sulfide collide, which is preferred to the environment from the standpoint of producing no cyan ion.

These objects of the present invention can be attained by the followings.

[1] A silver halide emulsion comprising at least one monovalent Au(I) complex coordinated with a compound represented by the following formula (1):

$$R^1—Ch—R^2 \quad (1)$$

wherein $R^1$ and $R^2$ each independently represents an alkyl group, an alkenyl group, an alkynyl group, an aryl group or a heterocyclic group, $R^1$ and $R^2$ may combine with each other to form a 3-, 4-, 5-, 6- or 7-membered ring, and Ch represents a sulfur atom, a selenium atom or a tellurium atom.

[2] A silver halide emulsion chemically sensitized by a monovalent Au(I) complex coordinated with a compound represented by formula (1).

[3] A chemical sensitization method for silver halide emulsions, comprising chemically sensitizing a silver halide emulsion using a monovalent Au(I) complex coordinated with a compound represented by formula (1).

[4] The silver halide emulsion as described in [2], wherein in the Au(I) complex, Ch of formula (1) is coordinated to the gold atom.

[5] The silver halide emulsion as described in [2], wherein the Au(I) complex is a gold complex represented by the following formula (2):

$$[L^1\text{-Au(I)-}(L^2)_m]X_n \quad (2)$$

wherein $L^1$ represents a compound represented by formula (1), $L^2$ represents a compound represented by formula (1) or a halogen atom, provided that $L^1$ and $L^2$ may be the same or different or may be combined, X represents a counter salt necessary for neutralizing the electric charge of the compound, m represents 0 or 1, and n represents a value of 0 to 1 and may be a decimal.

[6] The silver halide emulsion as described in [5], wherein $L^1$ and $L^2$ in formula (2) are the same compound and the metal complex is a symmetric gold complex.

[7] The silver halide emulsion as described in [5], wherein in formula (2), either $L^1$ or $L^2$ is substituted by at least one water-soluble group.

[8] The silver halide emulsion as described in [5], wherein in formula (2), $L^1$ and $L^2$ are substituted by at least one water-soluble group.

[9] The silver halide emulsion as described in [2], wherein in formula (1), Ch is a sulfur atom.

[10] The silver halide emulsion as described in [2], which has a silver chloride content of 90 mol % or more.

[11] A preparation method for gold sulfide colloids, comprising preparing a gold sulfide colloid using a Au(I) complex represented by formula (2).

[12] The preparation method for gold sulfide colloids as described in [11], wherein the gold sulfide colloid is prepared in a protective colloid solution.

[13] A silver halide emulsion chemically sensitized by a gold sulfide colloid prepared according to the method described in [11].

[14] A silver halide emulsion comprising at least one gold compound represented by the following formula (3):

$$[Au_xCh_yM_z]W_p \quad (3)$$

wherein Ch represents a sulfur atom, a selenium atom or a tellurium atom, M represents an alkali metal, W represents a counter salt necessary for neutralizing the electric charge of the compound, x, y and p each represents an integer of 1 or more, and z represents an integer of 0 to 2.

[15] A silver halide emulsion chemically sensitized by a gold compound represented by formula (3).

[16] A chemical sensitization method for silver halide emulsion, comprising chemically sensitizing a silver halide emulsion using a gold compound using a gold compound represented by formula (3).

[17] The silver halide emulsion as described in [15], wherein in formula (3), Ch is a sulfur atom or a selenium atom.

[18] The silver halide emulsion as described in [15], wherein in formula (3), x+y is from 4 to 40.

[19] The silver halide emulsion as described in [15], wherein in formula (3), Au is a monovalent ion.

[20] The silver halide emulsion as described in [15], wherein in formula (3), the $[Au_xCh_yM_z]$ ion has a cyclic or cage structure.

[21] The silver halide emulsion as described in [15], wherein tabular grains having an aspect ratio of 8 or more occupy 50% or more of the projected area of all silver halide grains.

[22] A silver halide photographic light-sensitive material comprising a support having thereon at least one silver halide emulsion layer, wherein at least one of the silver halide emulsion layers contains a silver halide emulsion chemically sensitized using at least one member selected from a Au(I) complex coordinated with a compound represented by the following formula (1) and a gold compound represented by the following formula (3):

$$R^1—Ch—R^2 \quad (1)$$

wherein $R^1$ and $R^2$ each independently represents an alkyl group, an alkenyl group, an alkynyl group, an aryl group or a heterocyclic group, $R^1$ and $R^2$ may combine with each other to form a 3-, 4-, 5-, 6- or 7-membered ring, and Ch represents a sulfur atom, a selenium atom or a tellurium atom;

$$[Au_xCh_yM_z]W_p \quad (3)$$

wherein Ch represents a sulfur atom, a selenium atom or a tellurium atom, M represents an alkali metal, W represents a counter salt necessary for neutralizing the electric charge of the compound, x, y and p each represents an integer of 1 or more, and z represents an integer of 0 to 2.

[23] A silver halide photographic light-sensitive material comprising a support having thereon at least one silver halide emulsion layer, wherein at least one of the silver halide emulsion layers contains at least one member selected from a Au(I) complex coordinated with a compound represented by the following formula (1) and a gold compound represented by the following formula (3):

$$R^1—Ch—R^2 \quad (1)$$

wherein $R^1$ and $R^2$ each independently represents an alkyl group, an alkenyl group, an alkynyl group, an aryl group or a heterocyclic group, $R^1$ and $R^2$ may combine with each other to form a 3-, 4-, 5-, 6- or 7-membered ring, and Ch represents a sulfur atom, a selenium atom or a tellurium atom;

$$[Au_xCh_yM_z]W_p \quad (3)$$

wherein Ch represents a sulfur atom, a selenium atom or a tellurium atom, M represents an alkali metal, W represents a counter salt necessary for neutralizing the electric charge of the compound, x, y and p each represents an integer of 1 or more, and z represents an integer of 0 to 2.

DETAILED DESCRIPTION OF THE INVENTION

The compound represented by formula (1) for use in the present invention is described in detail below.

$$R^1—Ch—R^2 \quad (1)$$

In formula (1), $R^1$ and $R^2$ each independently represents an alkyl group, an alkenyl group, an alkynyl group, an aryl group or a heterocyclic group. $R^1$ and $R^2$ may combine with each other to form a 3-, 4-, 5-, 6- or 7-membered ring.

In formula (1), the alkyl, alkenyl or alkynyl group represented by $R^1$ and $R^2$ is preferably a substituted or unsubstituted and linear, branched or cyclic alkyl, alkenyl or alkynyl group having from 1 to 30 carbon atoms, more preferably a substituted or unsubstituted alkyl group having from 1 to 20 carbon atoms.

In formula (1), the aryl group represented by $R^1$ and $R^2$ is preferably a substituted or unsubstituted and monocyclic or condensed cyclic aryl group having from 6 to 30 carbon atoms, such as phenyl group and naphthyl group, more preferably a substituted or unsubstituted phenyl group.

In formula (1), the heterocyclic group represented by $R^1$ and $R^2$ is preferably a substituted or unsubstituted and saturated or unsaturated 5-, 6- or 7-membered heterocyclic ring containing at least one of a nitrogen atom, an oxygen atom and a sulfur atom. This heterocyclic ring may be monocyclic or may form a condensed ring with another aryl or heterocyclic ring. The heterocyclic group is preferably a 5- or 6-membered heterocyclic group and examples thereof include a pyrrolyl group, a pyrrolidinyl group, a pyridyl group, a piperidyl group, a piperazinyl group, an imidazolyl group, a pyrazolyl group, a pyrazinyl group, a pyrimidinyl group, a triazinyl group, a quinolyl group, an isoquinolyl group, an indolyl group, an indazolyl group, a benzimidazolyl group, a pyranyl group, a chromenyl group, a thienyl group, an oxazolyl group, a thiazolyl group, a benzoxazolyl group, a benzothiazolyl group, a morpholino group and a morpholinyl group.

The compound represented by formula (1) is preferably a compound where at least one of $R^1$ and $R^2$ is an alkyl group, more preferably a compound where one is alkyl group and another is an aryl group, still more preferably a compound where both are an alkyl group.

$R^1$ and $R^2$ each may be substituted and representative examples of the substituent include a halogen atom, an alkyl group (including a cycloalkyl group, a bicycloalkyl group and a tricycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl- or aryl-sulfonylamino group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group and a silyl group.

More specifically, examples of the substituent include a halogen atom (e.g., chlorine, bromine, iodine), an alkyl group [a linear, branched or cyclic, substituted or unsubstituted alkyl group; the alkyl group includes an alkyl group (preferably an alkyl group having from 1 to 30 carbon atoms, e.g., methyl, ethyl, n-propyl, isopropyl, tert-butyl, n-octyl, eicosyl, 2-chloroethyl, 2-cyanoethyl, 2-ethylhexyl), a cycloalkyl group (preferably a substituted or unsubstituted cycloalkyl group having from 3 to 30 carbon atoms, e.g., cyclohexyl, cyclopentyl, 4-n-dodecylcyclohexyl), a bicycloalkyl group (preferably a substituted or unsubstituted bicycloalkyl group having from 5 to 30 carbon atoms, namely, a monovalent group resulting from removing one hydrogen atom of bicycloalkane having from 5 to 30 carbon atoms, e.g., bicyclo[1,2,2]heptan-2-yl, bicyclo[2,2,2]octan-3-yl), and a tricycloalkyl group having many ring structures; the alkyl group in the substituents described below (for example, the alkyl group in an alkylthio group) means an alkyl group having such a concept], an alkenyl group [a linear, branched or cyclic, substituted or unsubstituted alkenyl group, such as an alkenyl group (preferably a substituted or unsubstituted alkenyl group having from 2 to 30 carbon atoms, e.g., vinyl, allyl, phenyl, geranyl, oleyl), a cycloalkenyl group (preferably a substituted or unsubstituted cycloalkenyl group having from 3 to 30 carbon atoms, namely, a monovalent group resulting from removing one hydrogen atom of cycloalkane having from 3 to 30 carbon atoms, e.g., 2-cyclopenten-1-yl, 2-cyclohexen-1-yl) and a bicycloalkenyl group (a substituted or unsubstituted bicycloalkenyl group, preferably a substituted or unsubstituted bicycloalkenyl group having from 5 to 30 carbon atoms, namely, a monovalent group resulting from removing one hydrogen atom of bicycloalkane having one double bond, e.g., bicyclo[2,2,1]hept-2-en-1-yl, bicyclo[2,2,2]oct-2-en-4-yl)], an alkynyl group (preferably a substituted or unsubstituted alkynyl group having from 2 to 30 carbon atoms, e.g., ethynyl, propargyl, trimethylsilylethynyl), an aryl group (preferably a substituted or unsubstituted aryl group having from 6 to 30 carbon atoms, e.g., phenyl, p-tolyl, naphthyl, m-chlorophenyl, o-hexadecanoylaminophenyl), a heterocyclic group (preferably a monovalent group resulting from removing one hydrogen atom of a substituted or unsubstituted, aromatic or non-aromatic 5- or 6-membered heterocyclic compound, more preferably an aromatic 5- or 6-membered heterocyclic group having from 3 to 30 carbon atoms, e.g., 2-furyl, 2-thienyl, 2-pyrimidinyl, 2-benzothiazolyl), a cyano group, a hydroxyl group, a nitro group, a carboxyl group, an alkoxy group (preferably a substituted or unsubstituted alkoxy group having from 1 to 30 carbon atoms, e.g., methoxy, ethoxy, isopropoxy, tert-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 4-tert-butylphenoxy, 3-nitrophenoxy, 2-tetradecanoylaminophenoxy), a silyloxy group (preferably a silyloxy group having from 3 to 20 carbon atoms, e.g., trimethylsilyloxy, tert-butyldimethylsilyloxy), a heterocyclic oxy group (preferably a substituted or unsubstituted heterocyclic oxy group having from 2 to 30 carbon atoms, e.g., 1-phenyltetrazol-5-oxy, 2-tetrahydropyranyloxy), an acyloxy group (preferably a formyloxy group, a substituted or unsubstituted alkylcarbonyloxy group having from 2 to 30 carbon atoms and a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N,N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, tert-butoxycarbonyloxy, n-octylcarbonyloxy), an aryloxycarbonyloxy group (preferably a substituted or unsubstituted aryloxycarbonyloxy group having from 7 to 30 carbon atoms, e.g., phenoxycarbonyloxy, p-methoxyphenoxycarbonyloxy, p-n-hexadecyloxyphenoxy-carbonyloxy), an amino group (preferably an amino group, a substituted or unsubstituted alkylamino group having from 1 to 30 carbon atoms and a substituted or unsubstituted anilino.group having from 6 to 30 carbon atoms, e.g., amino, methylamino, dimethylamino, anilino, N-methylanilino, diphenylamino), an acylamino group (preferably a formylamino group, a substituted or unsubstituted alkylcarbonylamino group having from 1 to 30 carbon atoms or a substituted or unsubstituted arylcarbonylamino group having from 6 to 30 carbon atoms, e.g., formylamino, acetylamino, pivaloylamino, lauroylamino, benzoylamino, 3,4,5-tri-n-octyloxyphenylcarbonylamino), an aminocarbonyl-amino group (preferably a substituted or unsubstituted aminocarbonylamino group having from 1 to 30 carbon atoms, e.g., carbamoylamino, N,N-dimethylaminocarbonylamino, N,N-diethylaminocarbonylamino, morpholinocarbonylamino), an alkoxycarbonylamino group (preferably a substituted or unsubstituted alkoxycarbonylamino group having from 2 to 30 carbon atoms, e.g., methoxycarbonylamino, ethoxycarbonylamino, tert-butoxycarbonylamino, n-octadecyloxycarbonylamino, N-methylmethoxycarbonylamino), an aryloxycarbonylamino group (preferably a substituted or unsubstituted aryloxycarbonylamino group having from 7 to 30 carbon atoms, e.g., phenoxycarbonylamino, p-chlorophenoxycarbonylamino, m-n-octyloxyphenoxycarbonylamino), a sulfamoylamino group (preferably a substituted or unsubstituted sulfamoylamino group having from 0 to 30 carbon atoms, e.g., sulfamoylamino, N,N-diraethylaminosulfonylamino, N-n-octylaminosulfonylamino), an alkyl- or aryl-sulfonylamino group (preferably a substituted or unsubstituted alkylsulfonylamino group having from 1 to 30 carbon atoms or a substituted or unsubstituted arylsulfonylamino group having from 6 to 30 carbon atoms, e.g., methylsulfonylamino, butylsulfonylamino, phenylsulfonylamino, 2,3,5-trichlorophenylsulfonylamino, p-methylphenylsulfonylamino), an alkylthio group (preferably a substituted or unsubstituted alkylthio group having from 1 to 30 carbon atoms, e.g., methylthio, ethylthio, n-hexadecylthio), an arylthio group (preferably a substituted or unsubstituted arylthio group having from 6 to 30 carbon atoms, e.g., phenylthio, p-chlorophenylthio, m-methoxyphenylthio), a heterocyclic thio group (preferably a substituted or unsubstituted heterocyclic thio group having from 2 to 30 carbon atoms, e.g., 2-benzothiazolylthio, 1-phenyltetrazol-5-ylthio), a sulfamoyl group (preferably a substituted or unsubstituted sulfamoyl group having from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl), a sulfo group, an alkyl- or aryl-sulfinyl group (preferably a substituted or unsubstituted alkylsulfinyl group having from 1 to 30 carbon atoms or a substituted or unsubstituted arylsulfinyl group having from 6 to 30 carbon atoms, e.g., methylsulfinyl, ethylsulfinyl, phenylsulfinyl, p-methylphenylsulfinyl), an alkyl- or arylsulfonyl group (preferably a substituted or unsubstituted alkylsulfonyl group having from 1 to 30 carbon atoms or a substituted or unsubstituted arylsulfonyl group having from 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having from 2 to 30 carbon atoms, or a substituted or unsubstituted arylcarbonyl group having from 7 to 30 carbon atoms, e.g., acetyl, pivaloyl, 2-chloroacetyl, stearoyl, benzoyl, p-n-octyloxyphenylcarbonyl), an aryloxycarbonyl group (preferably a substituted or unsubstituted aryloxycarbonyl group having from 7 to 30 carbon atoms, e.g., phenoxycarbonyl, o-chlorophenoxycarbonyl, m-nitrophenoxycarbonyl, p-tert-butylphenoxycarbonyl), an alkoxycarbonyl group (preferably a substituted or unsubstituted alkoxycarbonyl group having from 2 to 30 carbon atoms, e.g., methoxycarbonyl, ethoxycarbonyl, tert-butoxycarbonyl, n-octadecyloxycarbonyl), a carbamoyl group (preferably a substituted or unsubstituted carbamoyl group having from 1 to 30 carbon atoms, e.g., carbamoyl, N-methylcarbamoyl, N,N-dimethylcarbamoyl, N,N-di-n-octylcarbamoyl, N-(methylsulfonyl)carbamoyl), an aryl- or heterocyclic-azo group (preferably a substituted or unsubstituted arylazo group having from 6 to 30 carbon atoms or a substituted or unsubstituted heterocyclic azo group having from 3 to 30 carbon atoms, e.g., phenylazo, p-chlorophenylazo, 5-ethylthio-1,3,4-thiadiazol-2-ylazo), an imide group (preferably N-succinimide or N-phthalimide), a phosphino group (preferably a substituted or unsubstituted phosphino group having from 2 to 30 carbon atoms, e.g., dimethylphosphino, diphenylphosphino, methylphenoxyphosphino), a phosphinyl group (preferably a substituted or unsubstituted phosphinyl group having from 2 to 30 carbon atoms, e.g., phosphinyl, dioctyloxyphosphinyl, diethoxyphosphinyl), a phosphinyloxy group (preferably a substituted or unsubstituted phosphinyloxy group having from 2 to 30 carbon atoms, e.g., diphenoxyphosphinyloxy, dioctyloxyphosphinyloxy), a phosphinylamino group (preferably a substituted or unsubstituted phosphinylamino group having from 2 to 30 carbon atoms, e.g., dimethoxyphosphinylamino, dimethylaminophosphinylamino), and a silyl group (preferably a substituted or unsubstituted silyl group having from 3 to 30 carbon atoms, e.g., trimethylsilyl, tert-butyldimethylsilyl, phenyldimethylsilyl).

Among the above-described functional groups, those having a hydrogen atom may further be substituted by a substituent described above after removing the hydrogen atom.

Among the substituents which $R^1$ and $R^2$ in formula (1) each may have, preferred are a halogen atom, an alkyl group, an alkenyl group, an alkynyl group, an aryl group, a heterocyclic group, a cyano group, a hydroxyl group, a carboxyl group, an alkoxy group, an aryloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, an alkyl- or aryl-sulfonylamino group, an alkylthio group, an arylthio group, a heterocyclic thio group, a sulfamoyl group, a sulfo group, an alkyl- or arylsulfonyl group, an acyl group, an aryloxycarbonyl group, an alkoxycarbonyl group, a carbamoyl group, an imidco group, a phosphino group, a phosphinyl group, a phosphinyloxy group, a phosphinylamino group and a silyl group, more preferred are a halogen atom, an alkyl group, an alkenyl group, an alkynyl group, an aryl group, a heterocyclic group, a cyano group, a hydroxyl group, a carboxyl group, an alkoxy group, an aryloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, an alkyl- or aryl-sulfonylamino group, an alkylthio group, an arylthio group, a heterocyclic thio group, a sulfamoyl group, a sulfo group, an alkyl- or aryl-sulfonyl group, an acyl group, an aryloxycarbonyl group, an alkoxycarbonyl group, a carbamoyl group, a phosphinyl group and a phosphinyloxy group.

In formula (1), $R^1$ and $R^2$ may combine with each other to form a 3-, 4-, 5-, 6- or 7-membered ring. In this case, the ring structure formed is a saturated or unsaturated sulfur-containing heterocyclic ring and the ring may be monocyclic or may form a condensed ring with another carbon ring or heterocyclic ring. The total number of carbons is preferably 2 to 30. Examples of the ring include a thiirane ring, a thiethane ring, a thiolane ring, a thiane ring, a dithian ring, a thiepane ring, a thiomorpholine ring, a thioxane ring, a thiazole ring, a thiophene ring, a thianthrene ring, a phenoxathiine ring, a phenothiazine ring.

In formula (1), when $R^1$ and $R^2$ combine with each other to form a 3-, 4-, 5-, 6- or 7-membered ring, the ring structure formed may have a substituent and examples thereof are the same as those described above for the substituent which $R^1$ and $R^2$ may have. The preferred range of each substituent is also the same.

In the present invention, the compound represented by formula (1) preferably has a non-cyclic structure where $R^1$ and $R^2$ are not combined.

In the case where $R^1$ and $R^2$ have a substituent, the substituent is also preferably an acidic functional group or a salt thereof. The acidic functional group as the substituent of $R^1$ and $R^2$ is preferably a functional group capable of forming a Brϕnsted acid, more preferably a functional group having a pKa value of 7 or less in water. Preferred examples of the acidic functional group for use in the present invention include a carboxyl group, a sulfo group and a phosphorus-containing acidic functional group. Among these, a carboxyl group and a sulfo group are preferred. In the case where $R^1$ and $R^2$ have a salt of an acidic functional group, the salt is preferably an alkali metal salt (e.g., Na salt, K salt), an alkaline earth metal salt (e.g., Ca salt, Mg salt, Ba salt), an ammonium salt, a phosphonium salt and a sulfonium salt of the above-described acidic functional groups. Furthermore, when the salt of the acidic functional group is an ammonium salt, a phosphonium salt or a sulfonium salt, an inner salt is also preferred.

In formula (1), Ch represents a sulfur atom, a selenium atom or a tellurium atom, preferably a sulfur atom or a selenium atom, and most preferably a sulfur atom.

In the present invention, the compound represented by formula (1) is preferably a compound where Ch is a sulfur atom or a selenium atom and at least one of $R^1$ and $R^2$ is an alkyl group, more preferably a compound where Ch is a sulfur atom, one of $R^1$ and $R^2$ is an alkyl group and another is an aryl group, still more preferably a compound where Ch is a sulfur atom and $R^1$ and $R^2$ both are an alkyl group, and most preferably a compound where Ch is a sulfur atom, $R^1$ and $R^2$ both are an alkyl group and at least one of $R^1$ and $R^2$ is substituted by an acidic functional group or a salt thereof.

The compound represented by formula (2) is described in detail below.

In formula (2), $L^1$ represents a compound represented by formula (1) and the preferred range thereof is the same as that of formula (1). $L^2$ represents a compound represented by formula (1) or a halogen atom and when $L^2$ is a compound represented by formula (1), the preferred range thereof is the same as that of formula (1). In the case where $L^2$ is a halogen atom, specific examples thereof include a fluorine atom, a chlorine atom, a bromine atom and an iodine atom. In the present invention, $L^2$ is preferably a chlorine atom or a bromine atom, more preferably a chlorine atom.

In formula (2), $L^1$ and $L^2$ may be the same or different and when n represents a value except for 0, the compound represented by formula (2) is preferably a symmetric gold complex where $L^1$ and $L^2$ are the same compound. When n represents 0, the compound is preferably a complex where $L^2$ is a halogen atom.

In formula (2), $L^1$ and $L^2$ may combine together to form a 12- to 30-membered large cyclic compound, however, in the present invention, $L^1$ and $L^2$ are preferably not combined and each an independent molecule. In formula (2), $L^1$ or $L^2$ may have a cyclic structure by itself but in the present invention, $L^1$ and $L^2$ each preferably has a non-cyclic structure.

In formula (2), X represents a counter ion necessary for neutralizing the electric charge of the compound. When the counter ion represented by X is anion, specific examples thereof include a halogenium ion (e.g., $F^-$, $Cl^-$, $Br^-$, $I^-$), tetrafluoroboronate ion ($BF_4^-$), hexafluorophosphonate ion ($PF_6^-$) hexafluoroantimonate ion ($SbF_6^-$), sulfate ion ($S_2O_2^{2-}$), an arylsulfonate ion (e.g., p-toluenesulfonate ion, naphthalene-2,5-disulfonate ion) and a carboxy ion (e.g. acetate ion, trifluoroacetate ion, oxalate ion, benzoate ion). In the case where the counter ion represented by X is cation, specific examples thereof include an alkali metal ion (e.g., lithium cation, sodium cation, potassium cation), an alkaline earth metal ion (e.g., magnesium ion, calcium ion), a substituted or unsubstituted ammonium ion (e.g., ammonium, triethylammonium, tetramethylammonium), and a substituted or unsubstituted pyridinium ion (e.g., pyridinium, 4-phenylpyridinium). In the present invention, the counter salt represented by X is preferably anion, more preferably a halogenium ion, a tetrafluoroboronate ion, a hexafluorophosphonate ion, a hexafluoroantimonate ion, a sulfate ion or an arylsulfonate ion, still more preferably a halogenium ion, a tetrafluoroboronate ion, a hexafluorophosphonate ion or a hexafluoroantimonate ion.

In formula (2), m represents 0 or 1. In the present invention, m is preferably 1.

In formula (2), n is a number of X, which is necessary for neutralizing the electric charge of the compound, and represents a value of 0 to 1. The value may be a decimal. In the present invention, n is preferably 0 or 1, more preferably 0.

In the present invention, the compound represented by formula (2) is preferably a compound where $L^1$ is a compound represented by formula (1), $L^2$ is a compound represented by formula (1) or a halogen atom, m is 1, and n is 0 or 1, more preferably a compound where $L^1$ is a compound represented by formula (1), $L^2$ is a halogen atom, m is 1 and n is 0.

Specific examples of the compounds represented by formulae (1) and (2) are set forth below, however, the present invention is not limited thereto.

TABLE I-1

| | |
|---|---|
| 1-1 | $HOCH_2CH_2SCH_2CH_2OH$ |
| 1-2 | $HOCH_2CH_2SCH_2CH_2SCH_2CH_2OH$ |
| 1-3 | $HOCH_2CH_2SCH_2CH_2SCH_2CH_2SCH_2CH_2OH$ |
| 1-4 | $HOCH_2CH_2CH_2SCH_2CH_2SCH_2CH_2CH_2OH$ |
| 1-5 | 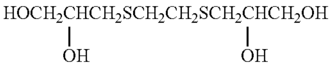 |
| 1-6 | $CH_3SCH_2CH_2OH$ |
| 1-7 | $CH_3CH_2SCH_2CH_2OH$ |
| 1-8 | $CH_3SCH_2CH_2CH_2OH$ |
| 1-9 | 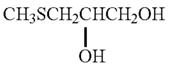 |
| 1-10 | 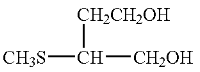 |
| 1-11 | $CH_3SCH_2CH_2NH_2$ |
| 1-12 | $CH_3SCH_2CH_2CH_2NH_2$ |
| 1-13 | 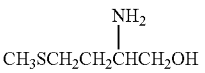 |
| 1-14 | 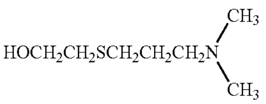 |
| 1-15 | $HOCH_2CH_2SCH_2CH_2NH_2$ |
| 1-16 | 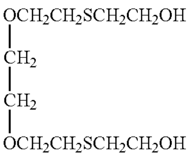 |
| 1-17 | 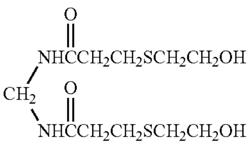 |

TABLE I-1-continued

| | |
|---|---|
| 1-18 | 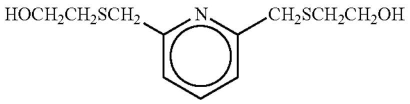 |
| 1-19 | 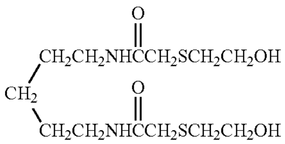 |
| 1-20 | $CH_3CH_2CH_2CH_2NHCH_2CH_2SCH_3$ |

TABLE I-2

| | |
|---|---|
| 1-21 | 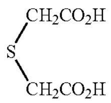 |
| 1-22 | 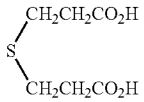 |
| 1-23 | $CH_3SCH_2CO_2H$ |
| 1-24 | $CH_3SCH_2CH_2CO_2H$ |
| 1-25 | 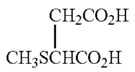 |
| 1-26 | 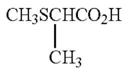 |
| 1-27 | 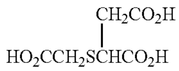 |
| 1-28 | 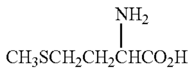 |
| 1-29 | 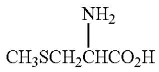 |
| 1-30 | 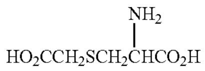 |
| 1-31 | 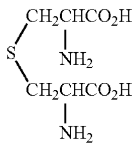 |
| 1-32 | 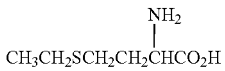 |

TABLE I-2-continued
| | |
|---|---|
| 1-33 | 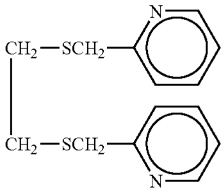 |
| 1-34 | 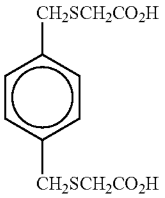 |
| 1-35 | $N\text{-}(CH_2CH_2SCH_2CH_2CO_2K)_3$ |
| 1-36 | 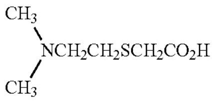 |
| 1-37 | 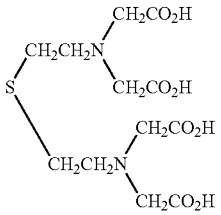 |
| 1-38 | 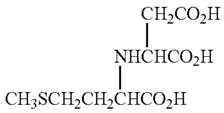 |
| 1-39 | 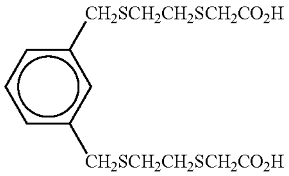 |
| 1-40 | 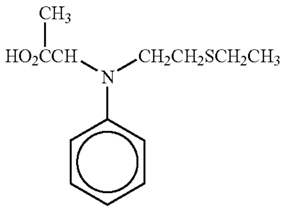 |
TABLE I-3
| | |
|---|---|
| 1-41 | $CH_3CH_2SCH_2CH_3$ |
| 1-42 | $CH_3CH_2CH_2CH_2SCH_2CH_2CH_2CH_3$ |
| 1-43 | 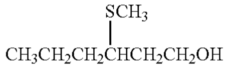 |
TABLE I-3-continued
| | |
|---|---|
| 1-44 | 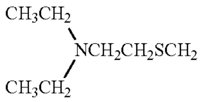 |
| 1-45 | $CH_3SCH_2CO_2CH_3$ |
| 1-46 | 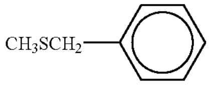 |
| 1-47 | 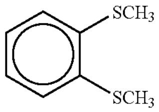 |
| 1-48 | 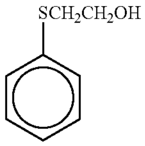 |
| 1-49 | 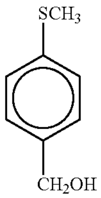 |
| 1-50 | 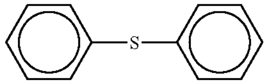 |
| 1-51 | 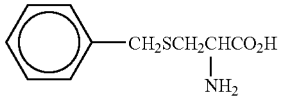 |
| 1-52 | 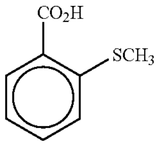 |
| 1-53 | 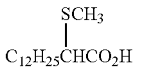 |
| 1-54 | $CH_3SCH_2CH_2CH_2SO_3Na$ |
| 1-55 | $CH_3SCH_2CH_2SO_3Na$ |
| 1-56 | $CH_3SCH_2CONH_2$ |
| 1-57 | 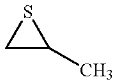 |
| 1-58 | 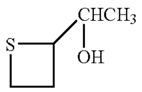 |
| 1-59 | 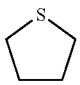 |

TABLE I-3-continued
| | |
|---|---|
| 1-60 | 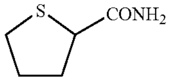 |
TABLE I-4
| | |
|---|---|
| 1-61 | 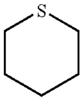 |
| 1-62 | 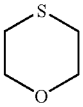 |
| 1-63 | 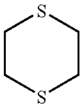 |
| 1-64 | 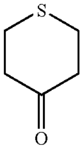 |
| 1-65 | 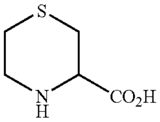 |
| 1-66 | 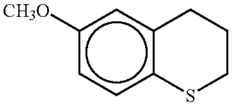 |
| 1-67 | 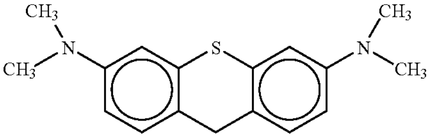 |
| 1-68 | 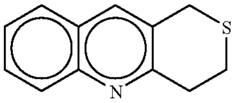 |
| 1-69 | 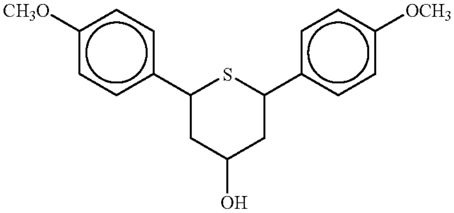 |
TABLE I-4-continued
| | |
|---|---|
| 1-70 | 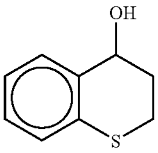 |
| 1-71 | 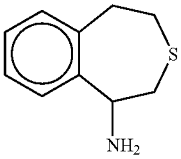 |
| 1-72 | 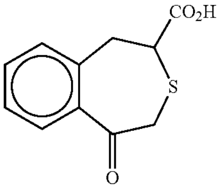 |
| 1-73 | 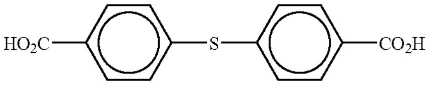 |
| 1-74 | $CH_3SCH_2CH_2CH_2SO_2NH_2$ |
| 1-75 | 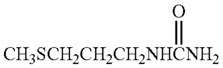 |
TABLE I-5
| | |
|---|---|
| 1-81 | $HOCH_2CH_2SeCH_2CH_2OH$ |
| 1-82 | $HOCH_2CH_2CH_2SeCH_2CH_2CH_2OH$ |
| 1-83 | 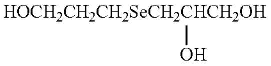 |
| 1-84 | $HOCH_2CH_2SeCH_2CH_2SCH_2CH_2OH$ |
| 1-85 | $HOCH_2CH_2SeCH_2CH_2CH_2NH_2$ |
| 1-86 | $HOCH_2CH_2SeCH_2CH_2CH_2SO_3H$ |
| 1-87 | 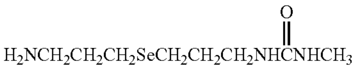 |
| 1-88 | 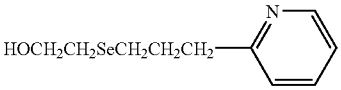 |
| 1-89 | 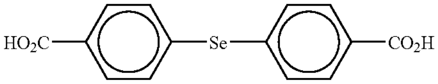 |
| 1-90 | 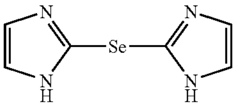 |
| 1-91 | 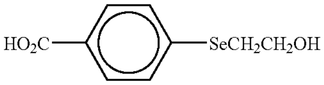 |

TABLE I-5-continued

| | |
|---|---|
| 1-92 | $HOCH_2CH_2SeCH_2CH_2CH_2SeCH_2CH_2OH$ |
| 1-93 | $Me_3SiCH_2SeCH_2SiMe_3$ |
| 1-94 | $Me_3SiCH_2CH_2CH_2SeCH_2CH_2CH_2SiMe_3$ |
| 1-95 | 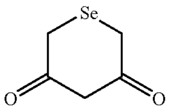 |
| 1-96 | 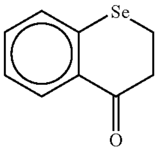 |
| 1-97 | 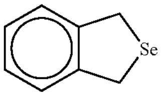 |
| 1-98 | 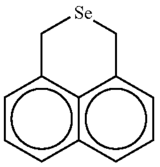 |
| 1-99 | 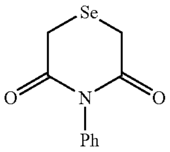 |

TABLE I-6

| | |
|---|---|
| 1-101 | $HOCH_2CH_2TeCH_2CH_2OH$ |
| 1-102 | $HOCH_2CH_2CH_2TeCH_2CH_2CH_2OH$ |
| 1-103 | 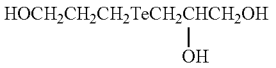 |
| 1-104 | $HOCH_2CH_2TeCH_2CH_2SCH_2CH_2OH$ |
| 1-105 | $HOCH_2CH_2TeCH_2CH_2CH_2NH_2$ |
| 1-106 | $HOCH_2CH_2TeCH_2CH_2CH_2SO_3H$ |
| 1-107 | 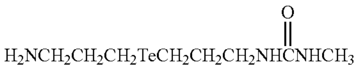 |
| 1-108 | 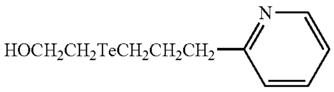 |
| 1-109 | 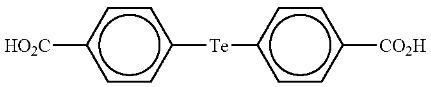 |
| 1-110 | 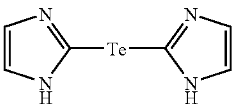 |

TABLE I-6-continued

| | |
|---|---|
| 1-111 | 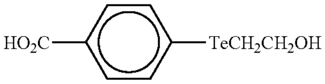 |
| 1-112 | $HOCH_2CH_2TeCH_2CH_2CH_2TeCH_2CH_2OH$ |
| 1-113 | $Me_3SiCH_2TeCH_2SiMe_3$ |
| 1-114 | $Me_3SiCH_2CH_2CH_2TeCH_2CH_2CH_2SiMe_3$ |
| 1-115 | 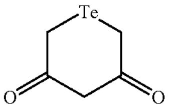 |
| 1-116 | 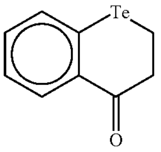 |
| 1-117 | 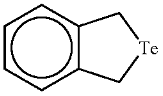 |
| 1-118 | 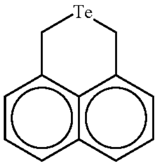 |
| 1-119 | 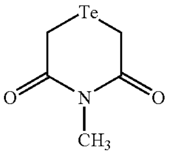 |

TABLE I-7

$[L^1\text{-Au(I)-}(L^2)_m]X_n$

| | $L^1$ | $L^2$ | m | X | n |
|---|---|---|---|---|---|
| 2-1 | 1-1 | $Cl^-$ | 1 | — | 0 |
| 2-2 | 1-2 | $Cl^-$ | 1 | — | 0 |
| 2-3 | 1-6 | $Br^-$ | 1 | — | 0 |
| 2-4 | 1-8 | $Cl^-$ | 1 | — | 0 |
| 2-5 | 1-9 | $Cl^-$ | 1 | — | 0 |
| 2-6 | 1-12 | $I^-$ | 1 | — | 0 |
| 2-7 | 1-15 | $Cl^-$ | 1 | — | 0 |
| 2-8 | 1-21 | $Cl^-$ | 1 | — | 0 |
| 2-9 | 1-24 | $Br^-$ | 1 | — | 0 |
| 2-10 | 1-25 | $Cl^-$ | 1 | — | 0 |
| 2-11 | 1-28 | $Cl^-$ | 1 | — | 0 |
| 2-12 | 1-29 | $Br^-$ | 1 | — | 0 |
| 2-13 | 1-30 | — | 0 | $BF_4^-$ | 1 |
| 2-14 | 1-36 | — | 0 | $PF_6^-$ | 1 |
| 2-15 | 1-41 | $Cl^-$ | 1 | — | 0 |
| 2-16 | 1-60 | $Cl^-$ | 1 | — | 0 |
| 2-17 | 1-82 | — | 0 | $SbF_6^-$ | 1 |
| 2-18 | 1-91 | $Cl^-$ | 1 | — | 0 |
| 2-19 | 1-101 | — | 0 | $SO_4^{2-}$ | 0.5 |
| 2-20 | 1-109 | $Cl^-$ | 1 | — | 0 |

TABLE I-8

| | $[L^1\text{—Au(I)—}(L^2)_m]X_n$ | | | | |
|---|---|---|---|---|---|
| | $L^1$ | $L^2$ | m | X | n |
| 2-21 | 1-1 | 1-1 | 1 | $Cl^-$ | 1 |
| 2-22 | 1-2 | 1-2 | 1 | $Br^-$ | 1 |
| 2-23 | 1-6 | 1-28 | 1 | $Cl^-$ | 1 |
| 2-24 | 1-8 | 1-2 | 1 | $Br^-$ | 1 |
| 2-25 | 1-9 | 1-9 | 1 | $Cl^-$ | 1 |
| 2-26 | 1-12 | 1-28 | 1 | $Cl^-$ | 1 |
| 2-27 | 1-15 | 1-15 | 1 | $Cl^-$ | 1 |
| 2-28 | 1-21 | 1-21 | 1 | $Cl^-$ | 1 |
| 2-29 | 1-24 | 1-2 | 1 | $BF_4^-$ | 1 |
| 2-30 | 1-25 | 1-25 | 1 | $BF_4^-$ | 1 |
| 2-31 | 1-28 | 1-28 | 1 | $Cl^-$ | 1 |
| 2-32 | 1-29 | 1-29 | 1 | $Cl^-$ | 1 |
| 2-33 | 1-30 | 1-30 | 1 | 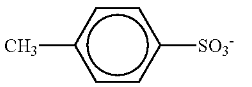 | 1 |
| 2-34 | 1-36 | 1-36 | 1 | $SbF_6^-$ | 1 |
| 2-35 | 1-41 | 1-41 | 1 | $SbF_6^-$ | 1 |
| 2-36 | 1-60 | 1-60 | 1 | $SbF_6^-$ | 1 |
| 2-37 | 1-82 | 1-28 | 1 | $PF_6^-$ | 1 |
| 2-38 | 1-91 | 1-91 | 1 | $PF_6^-$ | 1 |
| 2-39 | 1-101 | 1-101 | 1 | $BF_4^-$ | 1 |
| 2-40 | 1-109 | 1-109 | 1 | $BF_4^-$ | 1 |

The compound represented by formula (1) for use in the present invention is easily available because many compounds are available on the market. Furthermore, the compound represented by formula (2) for use in the present invention can be easily synthesized from a compound represented by formula (1) and an easily available gold compound such as chloroauric acid, sodium tetrachloroaurate ($NaAuCl_4$), sodium tetrabromoaurate ($NaAuBr_4$), potassium tetrachloroaurate ($KAuCl_4$), potassium tetrabromoaurate ($KAuBr_4$), ammonium tetrachloroaurate ($NH_4AuCl_4$) or ammonium tetrabromoaurate ($NH_4AuBr_4$), according to various known methods. The synthesis method is optimally selected according to individual compounds and therefore, a synthesis method which can be generally used may not be specified, however, the compound can be synthesized by the method described, for example, in Gmelin, *Handbook Au Suppl.*, Vol. B1, pp. 298–300 and pp. 308–311. The synthesis methods of the compounds for use in the present invention are described below by referring to synthesis examples of representative compounds.

SYNTHESIS EXAMPLE OF COMPOUND 2-11

In 300 ml of distilled water, 2.93 g of chloroauric acid tetrahydrate was dissolved and thereto, 1.77 g of potassium carbonate was added. To a solution obtained by dissolving 4.25 g of Compound 1-28 of the present invention in 400 ml of distilled water, the chloroauric acid solution prepared above was gradually added and thereafter, the resulting solution was stirred for 30 minutes to obtain an aqueous solution of Compound 2-11.

SYNTHESIS EXAMPLE OF COMPOUND 2-2

In 250 ml of distilled water, 2.61 g of chloroauric acid tetrahydrate was dissolved and thereto, 1.75 g of potassium carbonate was added. To a solution obtained by dissolving 4.62 g of Compound 1-2 of the present invention in 400 ml of distilled water, the chloroauric acid solution prepared above was gradually added and thereafter, the resulting solution was stirred for 30 minutes to obtain an aqueous solution of Compound 2-2.

The amount of the compound represented by formula (1) or (2) for use in the present invention varies over a wide range according to the case, however, is generally from $1\times10^{-6}$ to $5\times10^{-3}$ mol, preferably from $5\times10^{-6}$ to $5\times10^{-4}$ mol, per mol of silver halide. The compound represented by formula (1) or (2) for use in the present invention can be added in any stage from immediately after the grain formation until immediately before the completion of chemical sensitization, but is preferably added in the period between after desalting and during chemical sensitization.

The silver halide emulsion of the present invention may be used after subjecting it to another gold sensitization known in the art and in this case, various Au(III) compounds can be used. Examples of the Au(III) compound which can be used include chloroauric acid, potassium tetrachloroaurate, ammonium tetrachloroaurate, potassium tetrabromoaurate, auric chloride, auric bromide, auric iodide, potassium auric iodide and Au(III) hydroxide. This Au(III) compound used as a gold sensitizer may be added to the silver halide emulsion separately from or simultaneously with the compound represented by formula (1) or (2) for use in the present invention.

In the present invention, the gold sensitization may be combined with another sensitization method such as sulfur sensitization, selenium sensitization, tellurium sensitization, reduction sensitization or noble metal sensitization using a noble metal except for gold compounds.

Furthermore, a colloidal gold sulfide produced by adding the compound represented by formula (2) and a water-soluble sulfur compound to a flowing protective colloid solution may also be used as a sensitizer. The preparation method of colloidal gold sulfide for use in the present invention is specifically described below. The colloidal gold sulfide for use in the present invention can be prepared by adding a solution of a Au(I) complex represented by formula (2) and a solution containing a sulfur compound to a protective colloid solution and reacting these solutions under appropriate reaction conditions.

The solution of a Au(I) complex represented by formula (2) may be any solution but is preferably a water-soluble solution. In the present invention, the solution of a Au(I) complex represented by formula (2) is prepared by adding an excess amount (2 to 100 molar times) of a compound represented by formula (1) for use in the present invention to a solution of an Au(III) compound of various types, such as chloroauric acid, sodium tetrachloroaurate ($NaAuCl_4$), sodium tetrabromoaurate ($NaAuBr_4$), potassium tetrachloroaurate ($KAuCl_4$), potassium tetrabromoaurate ($KAuBr_4$), ammonium tetrachloroaurate ($NH_4AuCl_4$), ammonium tetrabromoaurate ($NH_4AuBr_4$), auric chloride, auric bromide, auric iodide, potassium auric iodide and Au(III) hydroxide. According to this method, the by-products other than the Au(I) complex represented by formula (2) are sulfoxides, selenoxides and telluloxides and the generation of cyan ion which is environmentally not preferred does not occur as described, for example, in *Comprehensive Coordination Chemistry*, Vol. 5, Chap. 55, page 874, Pergamon (1987).

The solution containing a sulfur compound for use in the preparation of the colloidal gold sulfide is prepared by dissolving a sulfur compound disclosed as a sulfur sensitizer in conventionally known patent publications in water or an organic solvent (e.g., alcohols, esters, amides). The sulfur sensitizer may be a labile sulfur compound and the labile sulfur compounds described, for example, in P. Grafkides,

*Chimie et Physicque Photographique,* 5th ed., Paul Montel (1987), *Research Disclosure*, vol. 307, No. 307150 may be used. Specifically, thiosulfates (e.g., hypo), thioureas (e.g., thiourea, diphenylthiourea, triethylthiourea, N-ethyl-N'-(4-methyl-2-thiazolyl)thiourea, carboxymethyltrimethylthiourea, N,N'-dicarboxymethylthiourea, N-acetyltrimethylthiourea), thioamides (e.g., thioacetamide), rhodanines (e.g., diethyl rhodanine, 5-benzylidene-N-ethyl rhodanine), phosphinesulfides (e.g., trimethylphosphinesulfide), thiohydantoins, 4-oxo-oxazolidine-2-thiones, disulfides or dipolysulfides (e.g., dimorpholine disulfide, cystine, hexathiocanethione), mercapto compounds (e.g., cysteine, thioglucose), polythionate, elemental sulfur, known sulfur compounds such as hydrogen sulfide, sodium sulfide and sodium hydrosulfide, and active gelatin may be used.

The protective colloid for use in the preparation of the colloidal gold sulfide is preferably water-soluble. Specific examples of the protective colloid which can be used include proteins such as gelatin (including those formed into a low molecular weight gelatin by enzymolysis), gelatin derivatives, graft polymers of gelatin with another polymer, albumin and casein; sugar derivatives such as cellulose derivatives (e.g., hydroxyethyl cellulose, carboxymethyl cellulose, cellulose sulfuric acid esters), sodium alginate and starch derivatives; and various synthetic hydrophilic polymer materials such as homo- or co-polymers of polyvinyl alcohol, polyvinyl alcohol partial acetal, poly-N-vinylpyrrolidone, polyacrylic acid, polymethacrylic acid, polyacrylamide, polyvinylimidazole and polyvinylpyrazole. Among these, gelatin is preferred. The concentration of the dispersion medium such as gelatin may be freely selected according to the purpose but is preferably from 0.01 to 20% by mass (i.e., by weight), more preferably from 0.1 to 10% by mass, most preferably from 0.5 to 5% by mass. The gelatin dispersion of gold sulfide may have either a sol form or a gel form.

The solution of Au(I) complex represented by formula (2) and the solution containing a sulfur element may be added in such a manner that one is added first and another is added later or both solutions are simultaneously added dropwise. The reaction temperature may be selected over a wide range but is preferably from 0 to 100° C., more preferably from 0 to 80° C.

The gold concentration of the colloidal gold sulfide dispersion is decided according to the requirement in view of suitability for the production of colloidal gold sulfide and an emulsion using the colloidal gold sulfide. The concentration is preferably, in terms of the gold atom concentration, from 0.1 to 100 mmol/kg, more preferably from 0.5 to 50 mmol/kg. In the preparation of the colloidal gold sulfide for use in the present invention, the sulfur compound is preferably used in an amount of 0.5 to 10 molar times, more preferably from 0.6 to 6 molar times, based on the Au(I) complex represented by formula (2).

The preparation example of the colloidal gold sulfide for use in the present invention is specifically described below. The material, amount used, ratio, reaction temperature, operation and the like described in the following specific preparation examples can be appropriately changed insofar as it does not depart from the purport of the present invention. Accordingly, the preparation method of the colloidal gold sulfide for use in the present invention is not limited to the following specific examples.

(Preparation Method of Colloidal Gold Sulfide S)

In 300 ml of distilled water, 2.93 g of chloroauric tetrahydrate was dissolved and thereto, 1.77 g of potassium carbonate was added. The resulting chloroauric acid solution was gradually added to a solution obtained by dissolving 4.25 g of Compound 1-28 of the present invention in 400 ml of distilled water. The obtained mixed solution was stirred for 30 minutes to prepare Solution A. Then, Solution B was prepared by dissolving 1.71 g of sodium sulfide nonahydrate. Finally, 45 g of gelatin was added to 1.1 liter of distilled water and dissolved under heating at 40° C. to prepare Solution C. While stirring Solution C kept at a temperature of 40° C. with a stirrer, Solution A and Solution B were added dropwise over 30 minutes. After the completion of dropwise addition, the mixed solution was further stirred at 40° C. for 30 minutes and then desalted by ultrafiltration to obtain a gelatin dispersion of colloidal gold sulfide. This was designated as Colloidal Gold Sulfide S.

The amount of the colloidal gold sensitization of the present invention added in chemical sensitization may vary over a wide range depending on the case but is from $5\times10^{-6}$ to $1\times10^{-3}$ mol, preferably from $1\times10^{-5}$ to $5\times10^{-4}$ mol, per mol of silver halide.

In the present invention, the colloidal gold sulfide may be added in any stage from immediately after the grain formation until immediately before the completion of chemical sensitization but is preferably added in the period between after desalting and during chemical sensitization. The colloidal gold sulfide of the present invention may also be used in combination with the above-described gold sensitizer or in combination with the above-described chalcogen sensitizer or reduction sensitizer.

In the present invention, the silver halide emulsion is sensitized by the colloidal gold sulfide prepared using a Au(I) complex coordinated with a compound represented by formula (1), a Au(I) complex represented by formula (2), whereby a silver halide photographic light-sensitive material (preferably color photographic light-sensitive material) ensuring high sensitivity and high contrast, less fluctuating in the sensitivity due to difference in the humidity condition at the exposure, exhibiting excellent high-illuminance reciprocity law characteristics, and being advantageous in view of cost and environment can be provided. Furthermore, by virtue of the use of formula (2) the colloidal gold sulfide can be prepared without producing environmentally harmful cyan ion.

The compound represented by formula (3) for use in the present invention is described in detail below.

$$[Au_xCh_yM_z]W_p \quad (3)$$

The complex ion structure of the compound represented by formula (3) may be a chained structure, a cyclic structure or a cage structure but is preferably an independent molecular structure such as cyclic structure or cage structure, more preferably a cyclic structure.

In formula (3), Au is preferably an ion, more preferably a monovalent ion.

In formula (3), Ch represents a sulfur atom, a selenium atom or a tellurium atom. In the present invention, Ch is preferably a sulfur atom or a selenium atom, more preferably a sulfur atom. Although Ch may be in the form of either an ion or an atom, the moiety $[Au_xCh_y]$ as a whole has an electric charge. In the above-described cyclic or cage structure, M may be contained.

In formula (3), M represents an alkali metal and examples thereof include lithium cation, sodium cation and potassium cation.

In formula (3), W represents a counter ion necessary for neutralizing the electric charge of the compound. In the case where the counter ion represented by W is anion, examples thereof include a halogenium ion (e.g., $F^-$, $Cl^-$, $Br^-$, $I^-$), tetrafluoroboronate ion ($BF_4^-$), hexafluorophosphonate ion ($PF_6^-$), sulfate ion ($SO_4^{2-}$) an arylsulfonate ion (e.g., p-toluenesulfonate ion, naphthalene-2,5-disulfonate ion) and a carboxy ion (e.g., acetate ion, trifluoroacetate ion, oxalate ion, benzoate ion). In the case where the counter ion represented by W is cation, examples thereof include an alkali metal ion (e.g., lithium cation, sodium cation, potassium cation, rubidium cation, cesium cation), an alkaline earth metal ion (e.g., magnesium ion, calcium ion), a substituted or unsubstituted ammonium ion (e.g., ammonium, triethylammonium, tetramethylammonium), a substituted or unsubstituted pyridinium ion (e.g., pyridinium, 4-phenylpyridinium), a substituted arsenium ion (e.g., tetraphenylarsenium), a substituted phosphonium ion (e.g., tetraphenylphosphonium) and $(R_3P)_2N^+$. R represents an alkyl group [a linear, branched or cyclic, substituted or unsubstituted alkyl group; the alkyl group includes an alkyl group (preferably an alkyl group having from 1 to 30 carbon atoms, e.g., methyl, ethyl, n-propyl, isopropyl, tert-butyl, n-octyl, eicosyl, 2-chloroethyl, 2-cyanoethyl, 2-ethylhexyl), a cycloalkyl group (preferably a substituted or unsubstituted cycloalkyl group having from 3 to 30 carbon atoms, e.g., cyclohexyl, cyclopentyl, 4-n-dodecylcyclohexyl), a bicycloalkyl group (preferably a substituted or unsubstituted bicycloalkyl group having from 5 to 30 carbon atoms, namely, a monovalent group resulting from removing one hydrogen atom of bicycloalkane having from 5 to 30 carbon atoms, e.g., bicyclo[1,2,2]heptan-2-yl, bicyclo[2,2,2]octan-3-yl), and a tricycloalkyl group having many ring structures], an aryl group (preferably a substituted or unsubstituted aryl group having from 6 to 30 carbon atoms, e.g., phenyl, p-tolyl, naphthyl, m-chlorophenyl, o-hexadecanoylaminophenyl), or a heterocyclic group (preferably a monovalent group resulting from removing one hydrogen atom of a substituted or unsubstituted, aromatic or non-aromatic 5- or 6-membered heterocyclic compound, more preferably an aromatic 5- or 6-membered heterocyclic group having from 3 to 30 carbon atoms, e.g., 2-furyl, 2-thienyl, 2-pyrimidinyl, 2-benzothiazolyl).

In formula (3), x and y each represents an integer of 1 or more. In the present invention, x is preferably an integer of 1 to 20, more preferably from 1 to 12. In the present invention, y is preferably an integer of 1 to 20, more preferably from 1 to 13. Furthermore, in the present invention, x+y is preferably an integer o 4 to 40, more preferably from 5 to 25, still more preferably from 7 to 20. In addition, in the present invention, x and y preferably satisfy $x \leqq y$.

In formula (3), p is a number of W necessary for neutralizing the electric charge of the compound and represents an integer of 1 or more. In the present invention, p is preferably an integer of 1 to 8.

In the present invention, the compound represented by formula (3) is preferably a compound where Ch is a sulfur atom or a selenium atom and x+y is an integer of 4 to 40, more preferably a compound where Ch is a sulfur atom or a selenium atom and x+y is an integer of 5 to 25, most preferably a compound where Ch is a sulfur atom and x+y is an integer of 7 to 20. In the present invention, the compound represented by formula (3) is preferably used together with a labile sulfur compound, a labile selenium compound or a labile tellurium compound known as chalcogen sensitizers, more preferably together with a labile selenium compound.

Specific examples of the compound represented by formula (3) are set forth below, however, the present invention is not limited thereto.

TABLE II-1

| | |
|---|---|
| 1 | $Ph_4As[AuS_9]$ |
| 2 | $Ph_4P[AuS_9]$ |
| 3 | $(Ph_4P)_2[Au_2S_8]$ |
| 4 | $(Ph_4As)_4[Au_{12}S_8]$ |
| 5 | $(Ph_4P)_4[Au_{12}S_8]$ |
| 6 | $(Et_4N)_4[Au_{12}S_8]$ |
| 7 | $K[AuS_5]$ |
| 8 | $K_4[Au_6S_5]$ |
| 9 | $Na_3[AuS_2]$ |
| 10 | $Cs[Au_3S_2]$ |
| 11 | $Na_7[Au_5S_6]$ |
| 12 | Na[AuS] |
| 13 | $(Ph_4P)_2[Au_2Se_5]$ |
| 14 | $[(Ph_3P)\ _2N]_2[Au_2Se_5]$ |
| 15 | $(Bu_4N)_2[Au_2Se_5]$ |
| 16 | $(Ph_4P)_2[Au_2Se_6]$ |
| 17 | $Cs_2[Au_2Se_e]$ |
| 18 | $(Et_4N)_3[NaAu_{12}Se_8]$ |
| 19 | $(Ph_4P)_3[NaAu_{12}Se_8]$ |
| 20 | $K[AuSe_5]$ |
| 21 | $Et_4N[AuSe_5]$ |
| 22 | $K_3[AuSe_{13}]$ |
| 23 | $Ph_4P[AuSe_{13}]$ |
| 24 | $Na_5[AuSe_{12}]$ |
| 25 | K5[AuSe12] |
| 26 | $Cs[Au_3Se_2]$ |
| 27 | $Ph_4P[Au_3Se_2]$ |
| 28 | $Na_3[AuSe_8]$ |
| 29 | $Bu_4N[AuSe_8]$ |
| 30 | $Na[AuSe_2]$ |
| 31 | $Rb[AuSe_2]$ |
| 32 | $(Ph_4P)_4[KAu_9Te_7]$ |
| 33 | $Cs_4[KAu_9Te_7]$ |
| 34 | $(Ph_4P)_2[K_2Au_4Te_4]$ |
| 35 | $(Bu_4N)_2[K_2Au_4Te_4]$ |
| 36 | $[(Ph_3P)_2N]_2[Au_2Te_4]$ |
| 37 | $Rb_2[Au_2Te_4]$ |
| 38 | $Cs_2[Au_2S_8]$ |
| 39 | $Ph_4P[AuS_5]$ |
| 40 | $(Bu_4N)_4[Au_6S_5]$ |

The compound represented by formula (3) for use in the present invention can be synthesized in accordance with the method described, for example, in the following known publications:

*Angew. Chem. Int. Ed.,* 23, 246 (1984),
*Inorg. Chim. Acta,* 85, L39 (1984),
*Angew. Chem. Int. Ed.,* 23, 715 (1984),
*Inorg. Chem.,* 30, 3572 (1991),
*Angew. Chem. Int. Ed.,* 31, 787 (1992),
*Angew. Chem. Int. Ed.,* 24, 432 (1985),
*Inorg. Chim. Acta,* 102, L37 (1985),
*Kristallogr.,* 213, 18 (1998),
*J. Less-Common. Met.,* 137, 13 (1988),
*J. Less-Common. Met.,* 132, 173 (1987),
*J. Alloys Comp.,* 243, 1 (1996), and
*Angew. Chem. Int. Ed.,* 29, 914 (1990).

The amount added of the compound represented by formula (3) for use in the present invention may vary over a wide range according to the case but is from $1\times10^{-6}$ to $5\times10^{-3}$ mol, preferably from $5\times10^{-6}$ to $5\times10^{-4}$ mol, per mol of silver halide.

The compound represented by formula (3) for use in the present invention may also be added using water or a solvent such as alcohols (e.g., methanol, ethanol), ketones (e.g., acetone), amides (e.g., dimethylformamide), glycols (e.g., methylpropylene glycol) and esters (e.g., ethyl acetate). In the case where the compound is insoluble in various solvents, the solid itself may be pulverized and then used. The pulverization may be attained by a grinding method well-known as a pulverization technique of pigments, where the compound is ground together with a grinding agent such as salt in a kneader such as ball mill, sand mill or kneader, or by a well-known precipitation or synthetic precipitation method. Such pulverization may be performed according to the method described, for example, in *Saishin Ganryo Bunsan Gijutsu* (*Newest Pigment Dispersion Technology*), Gijutsu Joho Kyokai (1995).

The compound represented by formula (3) for use in the present invention may be added in any stage during the production of emulsion but is preferably added between after the formation of silver halide grains and before the completion of chemical sensitization.

Preferred embodiments of the silver halide emulsion using a gold complex coordinated with a compound represented by formula (1), and the silver halide photographic light-sensitive material using the emulsion are described below.

The silver halide grain in the silver halide emulsion for use in the present invention is preferably a cubic or tetradecahedral crystal grain having substantially {100} faces (this grain may have rounded corners and may have a hkl plane) or an octahedral crystal grain. Alternatively, 50% or more of the entire projected area are preferably occupied by a tabular crystal grain comprising a {100} face or a {111} face and having an aspect ratio of 2 or more. The aspect ratio is a value obtained by dividing the diameter of a circle corresponding to the projected area of a grain by the thickness of the grain. In the present invention, a cubic grain, a tabular grain having {100} main planes and a tabular grain having {111} main planes are preferably used.

The silver halide emulsion for use in the present invention may be a silver chloride, silver bromide, silver iodobromide or silver chloro(iodo)bromide emulsion but in view of rapid processability, is preferably a silver chloride, silver chlorobromide, silver chloroiodide or silver chlorobromoiodide emulsion having a silver chloride content of 90 mol % or more, more preferably having a silver chloride content of 95 mol % or more, still more preferably 98 mol % or more. Among these, a silver halide emulsion comprising silver halide grains having in the shell part thereof a silver iodochloride phase in an amount of 0.01 to 0.50 mol %, preferably from 0.05 to 0.40 mol %, per mol of all silver is preferred because high sensitivity can be obtained and suitably for high-illuminance exposure is excellent. Furthermore, a silver halide emulsion comprising silver halide grains having on the surface thereof a silver bromide localized phase in an amount of 0.2 to 5 mol %, preferably from 0.5 to 3 mol % is more preferred because high sensitivity can be obtained and moreover, the photographic properties can be stabilized.

In the case where the emulsion of the present invention contains silver iodide, the iodide ion may be introduced by adding an iodide salt solution solely or adding an iodide salt solution together with the addition of a silver salt solution and a high chloride salt solution. In the latter case, the iodide salt solution and the high chloride solution may be added separately or may be added as a mixed solution of iodide salt and high chloride salt. The iodide salt is added in the form of a soluble salt such as alkali or alkaline earth iodide salt. The iodide may also be introduced by cleaving iodide ion from an organic molecule as described in U.S. Pat. No. 5,389,508. Also, fine silver iodide grain may be used as another iodide ion source.

The iodide salt solution may be added concentrically at a certain period in the grain formation or may be added over a certain period of time. In the high chloride emulsion, the site to which iodide ion is introduced is limited from the standpoint of obtaining a high-sensitive and low-fogging emulsion. As the iodide ion is introduced more inside an emulsion grain, the sensitivity less increases. Therefore, the iodide salt solution is preferably added in the outer side than 50% of the grain volume, more preferably in the outer side than 70%, most preferably in the outer side than 80%. At the same time, the iodide salt solution is preferably added to end in the inner side than 98% of the grain volume, most preferably in the inner side of 96%. By ending the addition of the iodide salt solution slightly inside the grain surface, the obtained emulsion can have higher sensitivity and lower fogging.

The distribution of iodide ion concentration in the depth direction inside a grain can be measured by an etching/TOF-SIMS (Time of Flight-Secondary Ion Mass Spectrometry) method using, for example, TRIFTII-type TOF-SIMS manufactured by Phi Evans. The TOF-SIMS method is specifically described in *Hyomen Bunseki Gijutsu Sensho Niji Ion Shitsuryou Bunseki Ho* (*Surface Analysis Technology Selection, Secondary Ion Mass Spectrometry*), compiled by Nippon Hyomen Kagaku Kai, issued by Maruzen (1999). When emulsion grains are analyzed by the etching/TOF-SIMS method, the analysis may show that even if the addition of iodide salt solution is ended inside a grain, the iodide ion is bleeding out toward the grain surface. In the case where the emulsion of the present invention contains silver iodide, it is preferably shown in the analysis by the etching/TOF-SIMS method that the iodide ion has a concentration maximum on the grain surface and the iodide ion concentration is attenuated toward the inside.

In the case where the emulsion of the present invention contains a silver bromide localized phase, a silver bromide localized phase having a silver bromide content of at least 10 mol % is preferably formed on the grain surface by the epitaxial growth. The silver bromide content of the silver bromide localized phase is preferably from 10 to 60 mol %, most preferably from 20 to 50 mol %. The silver bromide localized phase is preferably constituted by from 0.1 to 5 mol % of silver, more preferably from 0.3 to 4 mol % of silver, based on the total amount of silver constituting the silver halide grain for use in the present invention. The silver bromide localized phase preferably contains Group VIII metal complex ion such as iridium(III) chloride, iridium(III) bromide, iridium(IV) chloride, sodium hexachloroiridium (III), potassium hexachloroiridium(IV), hexaammineiridium (IV) salt, trioxalatoiridium(III) salt and trioxalatoiridium (IV) salt. The amount of this compound added varies over a wide range according to the purpose but is preferably from $10^{-9}$ to $10^{-2}$ mol per mol of silver halide.

In the present invention, a metal ion may be integrated into the inside and/or surface of a silver halide grain by adding a transition metal ion in the process of forming and/or growing silver halide grains. The metal ion used is preferably a transition metal ion, more preferably iron, ruthenium, iridium, osmium, lead, cadmium or zinc. This metal ion is preferably accompanied by a ligand and used as a six-coordinated octahedral complex. In the case of using an inorganic compound as the ligand, cyanide ion, halide ion, thiocyan, hydroxide ion, peroxide ion, azide ion, nitrite ion, water, ammonia, nitrosyl ion or thionitrosyl ion is preferably used. This ligand compound is preferably used by coordinating it to any metal ion of iron, ruthenium iridium, osmium, lead, cadmium and zinc. It is also preferred to use a plurality of ligands in one complex molecule. An organic compound may also be used as the ligand and the organic compound is preferably a cyclic compound containing a main chain having 5 or less carbon atoms and/or a 5- or 6-membered heterocyclic compound, more preferably a compound having within the molecule a nitrogen atom, a phosphorus atom, an oxygen atom or a sulfur atom as a coordination atom to the metal, most preferably furan, thiophene, oxazole, isooxazole, thiazole, isothiazole, imidazole, pyrazole, triazole, furazane, pyrane, pyridine, pyridazine, pyrimidine or pyrazine. A compound having such a compound as a basic skeleton and having a substituent introduced into the skeleton is also preferred.

The combination of metal ion and ligand is preferably a combination of iron ion and ruthenium ion with cyanide ion. In this compound, the cyanide ion preferably occupies a majority in the coordination number to iron or ruthenium as a central metal (ion) and the remaining coordination sites are preferably occupied by thiocyan, ammonia, water, nitrosyl ion, dimethylsulfoxide, pyridine, pyrazine or 4,4'-bipyridine. The complex formed is most preferably a hexacyanoiron or hexacyanoruthenium complex where 6 coordination sites of the central metal (ion) are all occupied by cyanide ion. This complex having a cyanide ion ligand is preferably added during the grain formation in an amount of $1\times10^{-8}$ to $1\times10^{-2}$ mol, most preferably from $1\times10^{-6}$ to $5\times10^{-4}$ mol, per mol of silver. In the case of using iridium as the central metal (ion), the ligand is preferably fluoride ion, chloride ion, bromide ion or iodide ion, more preferably chloride ion or bromide ion. Specific preferred examples of the iridium complex include $[IrCl_6]^{3-}$, $[IrCl_6]^{2-}$, $[IrCl_5(H_2O)]^{2-}$, $[IrCl_5(H_2O)]^-$, $[IrCl_4(H_2O)_2]^-$, $[IrCl_4(H_2O)_2]^0$, $[IrCl_3(H_2O)_3]^0$, $[IrCl_3(H_2O)_3]^+$, $[IrBr_6]^{3-}$, $[IrBr_6]^{2-}$, $[IrBr_5(H_2O)]^{2-}$, $[IrBr_5(H_2O)]^-$, $[IrBr_4(H_2O)_2]^-$, $[IrBr_4(H_2O)^2]^0$, $[IrBr^3(H_2O)_3]^0$ and $[IrBr_3(H_2O)_3]^+$. This iridium complex is preferably added during the grain formation in an amount of $1\times10^{-10}$ to $1\times10^{-3}$ mol, most preferably from $1\times10^{-8}$ to $1\times10^{-5}$ mol, per mol of silver. In the case of using ruthenium and osmium as central metals, nitrosyl ion, thionitrosyl ion or water molecule is preferably used as a ligand together with chloride ion and it is more preferred to form a pentachloronitrosyl complex, a pentachlorothionitrosyl complex or a pentachloroaqua complex. A hexachloro complex is also preferably formed. This complex is preferably added during the grain formation in an amount of $1\times10^{-10}$ to $1\times10^{-6}$ mol, more preferably from $1\times10^{-9}$ to $1\times10^{-6}$ mol, per mol of silver.

In the present invention, the above-described complex is preferably integrated inside a silver halide grain by adding the complex to a reaction solution under grain formation, more specifically, by adding the complex directly to the reaction solution during the grain formation or adding, the complex to an aqueous halide solution for forming silver halide grains or to other solution. It is also preferred to incorporate the complex inside a silver halide grain using these methods in combination.

In the case of integrating the complex into a silver halide grain, this is preferably performed such that the complex is uniformly present inside a grain or as disclosed in JP-A-4-208936, JP-A-2-125245 and JP-A-3-188437, present only in the grain surface layer or such that the complex is present only inside a grain and a complex-free layer is added to the grain surface. It is also preferred to subject a fine grain having integrated therein a complex to physical ripening to modify the grain surface phase as disclosed in U.S. Pat. Nos. 5,252,451 and 5,256,530. Furthermore, these compounds may be used in combination and a plurality of complexes may be integrated into one silver halide grain. The halogen composition at the site where the complex is incorporated is not particularly limited, and the complex is preferably incorporated into any of a silver chloride layer, a silver chlorobromide layer, a silver bromide layer, a silver iodochloride layer and a silver iodobromide layer.

The silver halide grain contained in the silver halide emulsion for use in the present invention preferably has an average grain size (a number average of grain sizes, assuming that the diameter of a circle equivalent to the projected area of a grain is a grain size) of 0.1 to 2 μm.

The grain size distribution is preferably so-called monodisperse, where the coefficient of variation (obtained by dividing the standard deviation of the grain size distribution by an average grain size) is preferably 20% or less, preferably 15% or less, more preferably 10% or less. At this time, for the purpose of obtaining a wide latitude, two or more kinds of these monodisperse emulsions different in the average grain size are preferably blended and used in the same layer or coated one on another to form multiple layers.

The silver halide emulsion for use in the present invention may contain various compounds or precursors thereof for the purpose of preventing fogging during the production, storage or photographic processing of a light-sensitive material or for stabilizing the photographic performance. Specific examples of these compounds which are preferably used include those described in JP-A-62-215272 supra., pages 39 to 72. In addition, 5-arylamino-1,2,3,4-thiatriazole compounds (the aryl residue has at least one electron-attractive group) described in EP0447647 are also preferably used.

For elevating storability of the silver halide emulsion, the following compounds are preferably used in this invention: hydroxamic acid derivatives described in JP-A-11-109576; cyclic ketones having in adjacency to the carbonyl group a double bond with both ends being substituted by an amino group or a hydroxyl group described in JP-A-11-327094 (in particular, those represented by formula (S1); the paragraphs 0036 to 0071 may be incorporated into the present specification by reference) sulfo-substituted catechol and hydroquinones (for example, 4,5-dihydroxy-1,3-benzenedisulfonic acid, 2,5-dihydroxy-1,4-benzenedisulfonic acid, 3,4-dihydroxybenzenesulfonic acid, 2,3-dihydroxybenzenesulfonic acid, 2,5-dihydroxybenzenesulfonic acid, 3,4,5-trihydroxybenzenesulfonic acid, and salts thereof); hydroxylamines represented by formula (A) of U.S. Pat. No. 5,556,741 (the description in column 4, page 56 to column 11, line 22 of U.S. Pat. No. 5,556,741 is preferably applied also in the present invention and is incorporated into the present specification by reference); and water-soluble reducing agents represented by formulae (I) to (III) of JP-A-11-102045.

The spectral sensitization is performed for the purpose of imparting spectral sensitivity in a desired light wavelength region to each emulsion layer in the light-sensitive material of the present invention.

Examples of the spectral sensitizer used for the spectral sensitization in blue, green and red regions of the light-sensitive material of the present invention include those described in F. M. Harmer, *Heterocyclic compounds—Cyanine dyes and related compounds*, John Wiley & Sons [New York, London] (1964). Specific examples of the compound and the spectral sensitization method which are preferably used include those described in JP-A-62-215272 supra., page 22, right upper column to page 38. As for the red-sensitive spectral sensitizing dye for silver halide emulsion grains having a high silver chloride content, spectral sensitizing dyes described in JP-A-3-123340 are very preferred in view of stability, strong adsorption, temperature dependency of exposure and the like.

The amount of these spectral sensitizing dye added may be selected over a wide range and is preferably from $0.5 \times 10^{-6}$ to $1.0 \times 10^{-2}$ mol, more preferably from $1.0 \times 10^{-6}$ to $5.0 \times 10^{-3}$ mol, per mol of silver halide.

The silver halide emulsion for use in the present invention is subjected to chemical sensitization. The chemical sensitization may be performed, in addition to the sensitization using the Au(I) complex or colloidal gold sulfide of the present invention, by using sulfur sensitization represented by the addition of a labile sulfur compound, noble metal sensitization represented by gold sensitization, reduction sensitization and the like, individually or in combination. Preferred examples of the compounds for use in these chemical sensitization methods include the compounds described in JP-A-62-215272, page 18, right lower column to page 22, right upper column.

When the silver halide emulsion for use in the present invention is subjected to gold sensitization, the emulsion can be increased in the sensitivity and reduced in the fluctuation of photographic performance at the scan exposure with a laser ray or the like. In the gold sensitization, various inorganic compounds, Au(I) complexes having an inorganic ligand, and Au(I) compounds having an organic ligand may be used, in addition to the Au(I) complex and colloidal gold sulfide of the present invention. Examples of the inorganic compound include chloroauric acid and salts thereof, and examples of the Au(I) complex having an inorganic ligand include aurous dithiocyanate compounds such as potassium aurous(I) dithiocyanate, and aurous dithiosulfate compounds such as trisodium aurous(I) dithiosulfate.

Examples of the Au(I) compound having an organic ligand, which can be used, include bis-Au(I) mesoionic heterocyclic rings such as bis(1,4,5-trimethyl-1,2,4-triazolium-3-thiolate) Au(I) tetrafluoroborate described in JP-A-4-267249, organic mercapto Au(I) complexes such as bis(1-[3-(2-sulfonatobenzamide)phenyl]-5-mercaptotetrazole potassium salt) aurate(I) pentahydrate described in JP-A-11-218870, and Au(I) compounds coordinated with nitrogen compound anion such as bis(l-methylhydantoinato) Au(I) sodium salt tetrahydrate described in JP-A-4-268550. In addition, Au(I) thiolate compounds described in U.S. Pat. No. 3,503,749, gold compounds described in JP-A-8-69074, JP-A-8-69075 and JP-A-9-269554, and compounds described in U.S. Pat. Nos. 5,620,841, 5,912,112, 5,620,841, 5,939,245 and 5,912,111 may also be used. The amount of such a compound added may vary over a wide range according to the case but is usually from $5 \times 10^{-7}$ to $5 \times 10^{-3}$ mol, preferably from $5 \times 10^{-6}$ to $5 \times 10^{-4}$ mol, per mol of silver halide.

In the silver halide photographic light-sensitive material of the present invention, conventionally known photographic materials and additives may be used. For example, the photographic support which can be used includes a transmission-type support and a reflection-type support. Examples of the transmission-type support which can be preferably used include transparent film such as cellulose nitrate film and polyethylene terephthalate, and polyester of 2,6-naphthalenedicarboxylic acid (NDCA) and ethylene glycol (EG) or polyester of NDCA, terephthalic acid and EG, where an information recording layer such as magnetic layer is provided. The reflection-type support is preferably a reflective support having laminated thereon a plurality of polyethylene layers or polyester layers and containing a white pigment such as titanium oxide in at least one of these water-resistant resin layers (laminated layers).

The reflective support for use in the present invention is more preferably a reflective support obtained by providing a polyolefin layer having fine holes on a paper substrate in the side where a silver halide emulsion layer is provided. The polyolefin layer may comprise multiple layers and in this case, it is preferred that the polyolefin layer (for example, polypropylene, polyethylene) adjacent to the gelatin layer in the silver halide emulsion layer side has no fine hole and the polyolefin layer (for example, polypropylene, polyethylene) in the side closer to the paper substrate has fine holes. The density of the polyolefin layer having a multilayer structure or a single layer structure interposed between the paper substrate and a photographic constituent layer is preferably from 0.40 to 1.0 g/ml, more preferably from 0.50 to 0.70 g/ml. The thickness of the polyolefin layer having a multilayer structure or a single layer structure interposed between the paper substrate and a photographic constituent layer is preferably from 10 to 100 μm, more preferably from 15 to 70 μm. The ratio of the thickness of the polyolefin layer to the thickness of the paper substrate is preferably from 0.05 to 0.5, more preferably from 0.1 to 0.2.

From the standpoint of enhancing the rigidity of the reflective support, it is also preferred to provide the polyolefin layer on the surface opposite the photographic constituent layer (back surface) of the paper support. In this case, the polyolefin layer on the back surface is preferably formed of polyethylene or polypropylene having a matted surface, preferably polypropylene. The thickness of the polyolefin layer on the back surface is preferably from 5 to 50 μm, more preferably from 10 to 30 μm, and the density thereof is preferably from 0.7 to 1.1 g/ml. Examples of the preferred embodiment of the polyolefin layer provided on the paper substrate of the reflective support for use in the present invention include those described in JP-A-10-333277, JP-A-10-333278, JP-A-11-52513, JP-A-11-65024, EP0880065 and EP0880066.

The above-described water-resistant resin layer preferably contains a fluorescent brightening agent. The fluorescent brightening agent may also be dispersed in a hydrophilic colloid layer of the light-sensitive material. The florescent brightening agent which can be used is preferably a florescent brightening agent of benzoxazole type, coumarin type or pyrazoline type, more preferably a florescent brightening agent of benzoxazolyl naphthalene type or benzoxazolyl stilbene type. The amount used thereof is not particularly limited but is preferably from 1 to 100 $mg/m^2$. In the case of mixing the fluorescent brightening agent with the water-resistant resin, the mixing ratio to the resin is preferably from 0.0005 to 3% by mass, more preferably from 0.001 to 0.5% by mass.

The reflection-type support may also be a support obtained by providing a hydrophilic colloid layer containing a white pigment on the transmission-type support or on the above-described reflection-type support.

The reflection-type support may also have a metal surface with mirror reflection or secondary diffuse reflection.

The support for use in the light-sensitive material of the present invention may be a white polyester-base support for display or a support after a layer containing a white pigment is provided on the support in the side having a silver halide emulsion layer. Furthermore, in order to improve the sharpness, an antihalation layer is preferably provided on the support in the side where a silver halide emulsion layer is coated or on the back surface thereof. The support is preferably set to have a transmission density of 0.35 to 0.8 so that the display can be viewed with either reflected light or transmitted light.

For the purpose of enhancing the sharpness or the like of an image, it is preferred to add a dye capable of decoloration upon processing (particularly, oxonol-base dye) described in EP-A-0337490, pp. 27–76, to a hydrophilic colloid layer of the light-sensitive material of the present invention such that the light-sensitive material has an optical reflection density of 0.70 or more at 680 nm, or to incorporate 12% by mass or more (more preferably 14% by mass or more) of titanium oxide surface-treated with a di-, tri- or tetra-hydric alcohol (e.g., trimethylolethane), into the water-resistant resin layer of the support.

In the light-sensitive material of the present invention, a dye capable of decoloration upon processing (particularly, oxonol dye or cyanine dye) described in EP-A-0337490, pp., 27–76, is preferably added to a hydrophilic colloid layer so as to prevent irradiation or halation or enhancing the safe-light immunity or the like. In addition, the dyes described in European Patent 0819977 may also be preferably used in the present invention.

Some of these water-soluble dyes deteriorate the color separation or safelight immunity when the amount used thereof is increased. Examples of the dye which can be used without changing the color separation for the worse include the water-soluble dyes described in JP-A-5-127324, JP-A-5-127325 and JP-A-5-216185.

In the present invention, a colored layer capable of decoloration upon processing is used in place of or in combination with the water-soluble dye. The colored layer capable of decoloration upon processing may be used by directly contacting it with an emulsion layer or may be disposed to contact therewith through an intermediate layer containing a process color mixing inhibitor such as gelatin or hydroquinone. This colored layer is preferably provided as an underlayer (in the support side) of an emulsion layer which forms the same primary color as the color of the colored layer. All colored layers corresponding to respective primary colors may be individually provided or only a part thereof may be freely selected and provided. Also, a colored layer subjected to colorings corresponding to a plurality of primary color regions may also be provided. The optical reflection density of the colored layer is preferably such that the optical density value at a wavelength having a highest optical density in the wavelength region used for exposure (in a normal printer exposure, a visible light region of 400 to 700 nm and in the case of scanning exposure, the wavelength of the light source used for the scanning exposure) is from 0.2 to 3.0, more preferably from 0.5 to 2.5, still more preferably from 0.8 to 2.0.

For the formation of the colored layer, a conventionally known method may be used. Examples thereof include a method of incorporating a dye described in JP-A-2-282244, page 3, right upper column to page 8, or a dye described in JP-A-3-7931, page 3, right upper column to page 11, left lower column, which is in the form of a solid fine particle dispersion, into a hydrophilic colloid layer, a method of mordanting an anionic dye to a cationic polymer, a method of adsorbing a dye to a fine particle such as silver halide and thereby fixing the dye in a layer, and a method of using colloidal silver described in JP-A-1-239544. With respect to the method of dispersing fine powder of a dye in the solid state, a method of incorporating a fine powdered dye which is substantially water-insoluble at least at a pH of 6 or less but substantially water-soluble at least at a pH of 8 or more, is described, for example, in JP-A-2-308244, pages 4 to 13. The method of mordanting an anionic dye to a cationic polymer is described, for example, in JP-A-2-84637, pages 18 to 26. Also, the preparation method of colloidal silver as a light absorbent is disclosed in U.S. Pat. Nos. 2,688,601 and 3,459,563. Among these methods, the method of incorporating a fine powdered dye and a method of using colloidal silver are preferred.

The silver halide photographic light-sensitive material of the present invention can be used for color negative film, color positive film, color reversal film, color reversal printing paper, color printing paper and the like but is preferably used as color printing paper.

The color printing paper preferably comprises at least one yellow color-forming silver halide emulsion layer, at least one magenta color-forming silver halide emulsion layer and at least one cyan color-forming silver halide emulsion layer. In general, these silver halide emulsion layers are provided in the order of, from the side nearer to the support, a yellow color-forming silver halide emulsion layer, a magenta color-forming silver halide emulsion layer and a cyan color-forming silver halide emulsion layer.

Of course, a layer structure different from the above may be employed.

The silver halide emulsion layer containing a yellow coupler may be disposed at any position on the support, however, when the yellow coupler-containing layer comprises silver halide tabular grains, the layer is preferably provided at the position more distant from the support than at least one of the magenta coupler-containing silver halide emulsion layer and the cyan coupler-containing silver halide emulsion layer. From the standpoint of accelerating the color development, promoting the desilvering and reducing the residual color due to sensitizing dyes, the yellow coupler-containing silver halide emulsion layer is preferably provided at the position most distant from the support than other silver halide emulsion layers. In view of the reduction in the bleach-fixing discoloration, the cyan coupler-containing silver halide emulsion is preferably provided as a midmost layer of other silver halide emulsion layers and in view of the reduction in the light discoloration, the cyan coupler-containing silver halide emulsion layer is preferably provided as a lowermost layer. The yellow, magenta and cyan color-forming layers each may be composed of two or three layers. It is also preferred to provide a coupler layer containing no silver halide emulsion in adjacency to a silver halide emulsion layer to form a color-forming layer as described, for example, in JP-A-4-75055, JP-A-9-114035, JP-A-10-246940 and U.S. Pat. No. 5,576,159.

As for the silver halide emulsions, other materials (for example, additives) and photographic constituent layers (for example, layer arrangement), which can be used in the present invention, and the processing method and additives for the processing, which can be used for the processing of the light-sensitive material, those described in JP-A-62-215272, JP-A-2-33144 and EP-A-0355660, particularly those described in EP-A-0355660, are preferred. In addition, the silver halide color photographic light-sensitive materials and the processing methods therefore described in JP-A-5-34889, JP-A-4-359249, JP-A-4-313733, JP-A-4-270344, JP-A-5-66527, JP-A-4-34548, JP-A-4-145433, JP-A-2-854, JP-A-1-158431, JP-A-2-90145, JP-A-3-194539, JP-A-2-93641 and EP-A-0520457 may also be preferably used.

Particularly, as for the reflection-type support, silver halide emulsion, foreign metal ion species which are doped in a silver halide grain, storage stabilizer and antifoggant for silver halide emulsion, chemical sensitization method (including sensitizer), spectral sensitization method (including spectral sensitizer), cyan, magenta and yellow couplers and emulsification-dispersion method therefor, dye image preservability improver (for example, staining inhibitor and discoloration inhibitor), dye (colored layer), gelatin species, layer structure of light-sensitive material and coating pH of light-sensitive material, those described in patents shown in Table I-9 below may be preferably applied to the present invention.

TABLE I-9

| Element | JP-A-7-104448 | JP-A-7-77775 | JP-A-7-301895 |
|---|---|---|---|
| Reflection-type support | column 7, line 12 to column 12, line 19 | column 35, line 43 to column 44, line 1 | column 5, line 40 to column 9, line 26 |
| Silver halide emulsion | column 72, line 29 to column 74, line 18 | column 44, line 36 to column 46, line 29 | column 77, line 48 to column 80, line 28 |
| Foreign metal ion species | column 74, lines 19 to 44 | column 46, line 30 to column 47, line 5 | column 80, line 29 to column 81, line 6 |
| Storage stabilizer and antifoggant | column 75, lines 9 to 18 | column 47, lines 20 to 29 | column 18, line 11 to column 31, line 37 (particularly mercapto-heterocyclic compounds) |
| Chemical sensitization method (chemical sensitizer) | column 74, line 45 to column 75, line 6 | column 47, lines 7 to 17 | column 81, lines 9 to 17 |
| Spectral sensitization method (spectral sensitizer) | column 75, line 19 to column 76, line 45 | column 47, line 30 to column 49, line 6 | column 81, line 21 to column 82, line 48 |
| Cyan coupler | column 12, line 20 to column 39, line 49 | column 62, line 50 to column 63, line 16 | column 88, line 49 to column 89, line 16 |
| Yellow coupler | column 87, line 40 to column 88, line 3 | column 63, lines 17 to 30 | column 89, lines 17 to 30 |
| Magenta coupler | column 88, lines 4 to 18 | column 63, line 3 to column 64, line 11 | column 31, line 34 to column 77, line 44 and column 88, lines 32 to 46 |
| Emulsification-, dispersion method of coupler | column 71, line 3 to column 72, line 11 | column 61, lines 36 to 49 | column 87, lines 35 to 48 |
| Dye image preservability improver (staining inhibitor) | column 39, line 50 to column 70, line 9 | column 61, line 50 to column 62, line 49 | column 87, line 49 to column 88, line 48 |
| Discoloration inhibitor | column 70, line 10 to column 71, line 2 | | |
| Dye (colorant) | column 77, line 42 to column 78, line 41 | column 7, line 14 to column 19, line 42 and column 50, line 3 to column 51, line 14 | column 9, line 27 to column 18, line 10 |
| Gelatin species | column 78, lines 42 to 48 | column 51, lines 15 to 20 | column 83, lines 13 to 19 |
| Layer structure of light-sensitive material | column 39, lines 11 to 26 | column 44, lines 2 to 35 | column 31, line 38 to column 32, line 33 |
| Coating pH of light-sensitive material | column 72, lines 12 to 28 | | |
| Scan exposure | column 76, line 6 to column 77, line 41 | column 49, line 7 to column 50, line 2 | column 82, line 49 to column 83, line 12 |
| Preservative in developer | column 88, line 19 to column 89, line 22 | | |

In addition, the couplers described in JP-A-62-215272, page 91, right upper column, line 4 to page 121, left upper column, line 6, JP-A-2-33144, page 3, right upper column, line 14 to page 18, left upper column, last line and page 30, right upper column, line 6 to page 35, right lower column, line 11, and EP-A-0355660, page 4, lines 15 to 27, page 5, line 30 to page 28, last line, page 45, lines 29 to 31, and page 47, line 23 to page 63, line 50 are also useful as the cyan, magenta and yellow couplers for use in the present invention.

Furthermore, the compounds represented by formulae (II) and (III) of WO-98/33760. and formula (D) of JP-A-10-221825 may also be preferably used in the present invention.

These are described in more detail below.

The cyan coupler which can be used in the present invention is preferably a pyrrolotriazole-base coupler and preferred examples thereof include the couplers represented by formulae (I) and (II) of JP-A-5-313324, the couplers represented by formula (I) of JP-A-6-347960 and the couplers described in these patents.

Also, phenol-base and naphthol-base cyan couplers are preferably used and preferred examples thereof include the cyan couplers represented by formula (ADF) of JP-A-10-333297.

Other preferred examples of the cyan coupler include pyrroloazole-type cyan couplers described in European Patent 0488248 and EP-A-0491197, 2,5-diacylaminophenol couplers described in U.S. Pat. No. 5,888,716, pyrazoloazole-type cyan couplers having an electron-attractive group or a hydrogen bond group at the 6-position described in U.S. Pat. Nos. 4,873,183 and 4,916,051, and particularly pyrazoloazole-type cyan couplers having a carbamoyl group at the 6-position described in JP-A-8-171185, JP-A-8-311360 and JP-A-8-339060.

In addition, diphenylimidazole-base cyan couplers described in JP-A-2-33144, 3-hydroxypyridine-base cyan couplers described in EP-A-0333185 (in particular, Coupler (42) as a 4-equivalent coupler allowed to have a chlorine releasing group and converted into a 2-equivalent coupler, and Couplers (6) and (9) are preferred), cyclic active methylene-base cyan couplers described in JP-A-64-32260 (in particular, Couplers 3, 8 and 34 are preferred), pyrrolopyrazole-type cyan couplers described in EP-A-0456226, and pyrroloimidazole-type cyan couplers described in European Patent 0484909 may also be used.

Among these cyan couplers, pyrroloazole-base cyan couplers represented by formula (I) of JP-A-11-282138 are particularly preferred and the description in paragraphs 0012 to 0059 of this patent publication including Cyan couplers (1) to (47) is applied as it is to the present invention and preferably incorporated as a part of the present application.

The magenta coupler for use in the present invention may be a 5-pyrazolone-base magenta coupler or a pyrazoloazole-base magenta coupler described in known publications shown in the Table above. Among these, preferred in view of hue, image stability and color formability are pyrazolotriazole couplers described in JP-A-61-65245, in which a secondary or tertiary alkyl group is directly bonded to the 2-, 3- or 6-position of a pyrazolotriazole ring; pyrazoloazole couplers containing a sulfonamide group within the molecule described in JP-A-61-65246; pyrazoloazole couplers having an alkoxyphenyl-sulfamide ballast group described in JP-A-61-147254; and pyrazoloazole couplers having an alkoxy group or an aryloxy group at the 6-position described in EP-A-226849 and EP-A-294785.

In particular, the magenta coupler is preferably a pyrazoloazole coupler represented by formula (M-I) of JP-A-8-

122984 and the description in the paragraphs 0009 to 0026 of this patent publication is applied as it is to the present invention and incorporated as a part of the present specification.

In addition, pyrazoloazole couplers having a steric hindrance group at both the 3-position and the 6-position described in European Patents 854384 and 884640 may also be preferably used.

Examples of the yellow coupler which can be preferably used include, in addition to the compounds shown in the Table above, acylacetamide-type yellow couplers having a 3- to 5-membered ring structure at the acyl group described in EP-A-0447969; malondianilide-type yellow coupler having a ring structure described in EP-A-0482552; pyrrol-2 or 3-yl- or indol-2- or -yl-carbonylacetic acid anilide-base couplers described in EP-A-953870, EP-A-953871, EP-A-953872, EP-A-953873, EP-A-953874 and EP-A-953875; and acylacetamide-type yellow couplers having a dioxane structure described in U.S. Pat. No. 5,118,599. Among these, more preferred are acylacetamide-type yellow couplers where the acyl group is 1-alkylcyclopropane-1-carbonyl group, and malondianilide-type yellow couplers where one of the anilides constitute an indoline ring. These couplers can be used individually or in combination.

The coupler for use in the present invention is preferably emulsion-dispersed in an aqueous solution of hydrophilic colloid after impregnating the coupler in a loadable latex polymer (for example, the polymer described in U.S. Pat. No. 4,203,716) in the presence (or absence) of a high-boiling point organic solvent shown in the Table above or after dissolving the coupler together with a water-insoluble and organic solvent-soluble polymer.

Examples of the water-insoluble and organic solvent-soluble polymer which can be preferably used include homopolymers and copolymers described in U.S. Pat. No. 4,857,449, columns 7 to 15, and International Patent Publication WO88/00723, pages 12 to 30. In view of the dye image stability, methacrylate-base and acrylamide-base polymers are preferred, and acrylamide-base polymer is more preferred.

In the present invention, known color mixing inhibitors can be used and among these, those described in the following patents are preferred.

Examples of the color mixing inhibitor which can be used include high molecular weight redox compounds described in JP-A-333501, phenidone or hydrazine-based compounds described in WO98/33760 and U.S. Pat. No. 4,923,787, and white couplers described in JP-A-5-249637, JP-A-10-282615 and German Patent 19629142A1. In the case of elevating the pH of the developer and thereby expediting the development, the redox compounds described in German Patent 19618786A1, EP-A-839623, EP-A-842975, German Patent 19806846A1 and French Patent 2760460A1 are preferably used.

In the present invention, a compound containing a triazine skeleton having a high molar absorption coefficient is preferably used as an ultraviolet absorbent and for example, the compounds described in the following patents can be used. This compound is preferably added to a light-sensitive layer and/or a light-insensitive layer.

The compounds described in JP-A-46-3335, JP-A-55-152776, JP-A-5-197074, JP-A-5-232630, JP-A-5-307232, JP-A-6-211813, JP-A-8-53427, JP-A-8-234364, JP-A-8-239368, JP-A-9-31067, JP-A-10-115898, JP-A-10-147577, JP-A-10-182621, German Patent, 19739797A, EP-A-711804 and Japanese Published Unexamined International Application 8-501291 can be used.

Although gelatin is advantageously used as the binder or protective colloid for use in the light-sensitive material of the present invention, other hydrophilic colloid can be used by itself or in combination with gelatin. In a preferred gelatin, the content of heavy metal impurities such as iron, copper, zinc and manganese is preferably 5 ppm or less, more preferably 3 ppm or less.

The amount of calcium contained in the light-sensitive material is preferably 20 mg/$m^2$ or less, more preferably 10 mg/$m^2$ or less, most preferably 5 mg/$m^2$ or less.

In the present invention, microbicide/antifungal described in JP-A-63-271247 is preferably added so as to prevent various molds and bacteria from proliferating in a hydrophilic colloid layer and thereby deteriorating the image.

The coating pH of the light-sensitive material is preferably from 4.0 to 7.0, more preferably from 4.0 to 6.5.

In the present invention, from the standpoint of improving the coating stability of the light-sensitive material, preventing the generation of electrostatic charge, controlling the electrostatic charge amount and the like, a surfactant may be added to the light-sensitive material. The surfactant includes an anionic surfactant, a cationic surfactant, a betaine surfactant and a nonionic surfactant and examples thereof include those described in JP-A-5-333492. The surfactant for use in the present invention is preferably a surfactant containing a fluorine atom, more preferably a fluorine atom-containing surfactant.

The amount of the surfactant added to the light-sensitive material is not particularly limited but is generally from $1\times10^{-5}$ to 1 g/$m^2$, preferably from $1\times10^{-4}$ to $1\times10^{-1}$ g/$m^2$, more preferably from $1\times10^{-3}$ to $1\times10^{-2}$ g/$m^2$.

The fluorine atom-containing surfactant may be used by itself or in combination with another conventionally known surfactant but is preferably used in combination with another conventionally known surfactant.

The light-sensitive material of the present invention is used for the printing system using a normal negative printer and additionally, is suitably used for the scan exposure system using a cathode ray tube (CRT). The CRT exposure apparatus is simple and compact as compared with apparatuses using a laser and therefore, costs low. Also, the control of optical axis and colors is facilitated.

For the cathode ray tube used in the image exposure, various light emitters capable of emitting light in the required spectral region are used. For example, a red light emitter, a green light emitter and a blue light emitter are used individually or in combination of two or more. The spectral region is not limited to these red, green and blue regions but a phosphor capable of emitting light in the yellow, orange, ultraviolet or infrared region may also be used. In particular, a cathode ray tube using a mixture of these light emitters to emit white light is often used.

In the case where the light-sensitive material has a plurality of light-sensitive layers different in the spectral sensitivity distribution and the cathode ray tube also has phosphors which emit light in a plurality of spectral regions, multiple colors may be exposed at a time, namely, the light may be emitted from the tube surface after image signals of multiple colors are input to the cathode ray tube. A method of sequentially inputting the image signals every each color, sequentially emitting light of respective colors, and performing the exposure through a film which cuts colors other than those colors (sequential exposure) may also be employed. In general, the sequential exposure is advantageous for attaining high image quality because a high resolution cathode ray tube can be used.

The light-sensitive material of the present invention is preferably used for digital scanning exposure system using monochromatic high-density light such as gas laser, light-emitting diode, semiconductor laser or second harmonic generating light source (SHG) comprising a combination of a nonlinear optical crystal with a semiconductor laser or a solid state laser using a semiconductor laser as an excitation light source. In order to make the system compact and inexpensive, a semiconductor laser or a second harmonic generating light source (SHG) comprising a combination of a nonlinear optical crystal with a semiconductor laser or a solid state laser is preferably used. Particularly, in order to design a compact and inexpensive apparatus having a long life and high stability, a semiconductor laser is preferably used and at least one of exposure light sources is preferably a semiconductor laser.

In the case of using this scanning exposure light source, the spectral sensitivity maximum wavelength of the light-sensitive material of the present invention can be freely set according to the wavelength of the scanning exposure light source used. In the case of an SHG light source obtained by combining a nonlinear optical crystal with a semiconductor laser or a solid state laser using a semiconductor laser as an excitation light source, the oscillation wavelength of the laser can be halved and therefore, blue light and green light are obtained. As a result, the light-sensitive material can have a spectral sensitivity maximum in normal three wavelength regions of blue, green and red.

The exposure time in this scanning exposure is, when defined as the time for exposing a picture element size with a picture element density of 400 dpi, preferably $10^{-4}$ sec or less, more preferably $10^{-6}$ sec or less.

The preferred scanning exposure system which can be applied to the present invention is described in detail in the patents set forth in the Table above.

In processing the light-sensitive material of the present invention, the processing materials and processing methods described in JP-A-2-207250, page 26, right lower column, line 1 to page 34, right upper column, line 9, and in JP-A-4-97355, page 5, left upper column, line 17 to page 18, right lower column, line 20, may be preferably applied. For the preservative used in this developer, the compounds described in the patents shown in the Table above may be preferably used.

The present invention-is preferably applied also to a light-sensitive material having suitability for rapid processing.

The color development time means a time period from a light-sensitive material enters in a color developer until it enters in a bleach-fixing solution in the subsequent processing step. For example, in the case of processing the light-sensitive material in an automatic developing machine, the sum total of two time periods, namely, the time period where the light-sensitive material is immersed in a color developer (so-called in-liquid time) and the time period where the light-sensitive material is departed from the color developer and transferred in air toward the bleach-fixing bath in the subsequent step (so-called in-air time), is called a color development time. In the same way, the bleach-fixing time means the time period from the light-sensitive material enters in a bleach-fixing solution until it enters in the subsequent water washing or stabilizing bath. Also, the water washing or stabilization time means a time period where the light-sensitive material enters in the water washing or stabilizing solution and stays in the liquid (so-called in-liquid time) in preparation for the drying step.

In the present invention, when a rapid processing is performed, the color development time is preferably 60 seconds or less, more preferably from 6 to 50 seconds, still more preferably from 6 to 30 seconds. Similarly, the bleach-fixing time is preferably 60 seconds or less, more preferably from 6 to 50 seconds, still more preferably from 6 to 30 seconds. The water washing or stabilization time is preferably 150 seconds or less, more preferably from 6 to 130 seconds.

After the exposure, the light-sensitive material of the present invention is developed and the method therefor may be a wet system such as a conventional development method using a developer containing an alkali agent and a developing agent is used or a method of incorporating a developing agent into the light-sensitive material and performing the development using an activator solution (e.g., alkali solution) containing no developing agent, or a heat development system using no processing solution. Particularly, the activator method uses a processing solution not containing a developing agent and therefore, the processing solution is facilitated in the control and handling. Furthermore, the load at the treatment of waste solution is reduced and this is preferred also in view of environmental conservation.

In the activator method, the developing agent or a precursor thereof incorporated into the light-sensitive material is preferably a hydrazine-type compound described, for example, in JP-A-8-234388, JP-A-9-152686, JP-A-9-152693, JP-A-9-211814 and JP-A-9-160193.

Furthermore, a development method where the coated silver amount of the light-sensitive material is reduced and a treatment for amplifying the image (intensification treatment) using hydrogen peroxide is performed, is also preferably used. More specifically, an image formation method using an activator solution containing hydrogen peroxide is preferred and this is described in JP-A-8-297354 and JP-A-9-152695.

In the activator method, desilvering generally follows the processing with the activator solution, however, in the image intensification treatment using a light-sensitive material having a low silver amount, a simple and easy method such as water washing or stabilization may be performed by omitting desilvering. In the case of a system of reading image information from a light-sensitive material using a scanner or the like, a processing form dispensing with desilvering can be employed even when a light-sensitive material having a high silver amount, such as a light-sensitive material for photographing, is used.

For the processing with the activator solution, the desilvering solution (bleach/fixing solution) and the washing and stabilizing solution, known processing materials and known processing methods may be used. Preferred examples thereof include those described in *Research Disclosure*, Item 36544 (September, 1994), pages 536 to 541, and JP-A-8-234388.

In exposing the light-sensitive material of the present invention in a printer, a band stop filter described in U.S. Pat. No. 4,880,726 is preferably used, whereby light color mixing can be eliminated and color reproducibility can be greatly improved.

In the present invention, copy restriction may be applied by pre-exposing a yellow microdot pattern -in advance of imparting the image information as described in EP-A-0789270 and EP-A-0789480.

The light-sensitive material can be preferably used in combination with exposure and development systems described in the following publications:

the automatic printing and developing system described in JP-A-10-333253;

the light-sensitive material transportation device described in JP-A-2000-10206;

the recording system containing an image reading device described in JP-A-11-215312;

the exposure system comprising a color image recording unit described in JP-A-11-88619 and JP-A-10-202950;

the digital photoprinting system containing a remote diagnosis unit described in JP-A-10-210206; and the photoprinting system containing an image recording device described in JP-A-2000-310822.

Preferred embodiments of the silver halide emulsion using the gold compound represented by formula (3) and the silver halide photographic light-sensitive material using the silver halide emulsion are described below.

The silver halide emulsion for use in the silver halide photographic light-sensitive material of the present invention is not particularly limited on the silver halide, and silver chloride, silver chlorobromide, silver bromide, silver iodochloride or silver iodobromide may be used. The emulsion preferably contains bromide ion or iodide ion. The size of the silver halide grain is not particularly limited but is preferably, in terms of the equivalent-sphere diameter, from 0.01 to 3 μm. With respect to the shape of the silver halide grain, either a regular crystal form (regular crystal grain) or an irregular crystal form may be used. The regular crystal grain includes cubic form, octahedral form, dodecahedral form, tetradecahedral form, eicosahedral form and octatetracontahedral form. The irregular crystal form includes spherical form and pebble-like form. The grain may have one or more twin plane and a hexagonal tabular grain or triangular tabular grain having two or three parallel twin planes is preferably used. As for the tabular grain, the grain size distribution thereof is preferably monodisperse (coefficient of variation: from 10 to 20%). The preparation of monodisperse tabular grains is described in JP-A-63-11928. A monodisperse hexagonal tabular grain is described in JP-A-63-151618, a circular monodisperse tabular grain emulsion is described in JP-A-1-131541, and an emulsion in which 95% or more of the entire projected area is occupied by tabular grains having two parallel twin planes and the size distribution of the tabular grains is monodisperse., is disclosed in JP-A-2-838. Furthermore, a tabular grain emulsion prepared using a polyalkylene oxide block copolymer and having a coefficient of variation in the grain size of 10% or less is disclosed in EP-A-514742. By using these techniques, monodisperse grains preferred in the present invention can be prepared.

The coefficient of variation in the grain thickness is also preferably 20% or less, more preferably from 5 to 15%.

A tabular grain having (100) main plane and a tabular grain having (111) main plane are known. As for the former grain, silver bromide is described in U.S. Pat. No. 4,063,951 and JP-A-5-281640, and silver chloride is described in EP-A-0534395 and U.S. Pat. No. 5,264,337. The latter tabular grain is a grain having one or more twin planes and having various forms and with regard to this grain, silver chloride is described in U.S. Pat. Nos. 4,399,215, 4,983,508 and 5,183,732, JP-A-3-137632 and JP-A-3-116113. The present invention can be suitably applied to both a tabular grain having (100) main plane and a tabular grain having (111) main plane.

The tabular emulsion preferably used in the present invention is an emulsion in which silver halide grains having an aspect ratio (equivalent-circle diameter/grain thickness) of 2 to 100 occupy 50% (area) or more of all silver halide grains in the emulsion, preferably an emulsion in which silver halide grains having an aspect ratio of 5 or more, more preferably 8 or more, occupy 50% (area) or more, preferably 60% or more, more preferably 85% or more, of all silver halide grains in the emulsion.

The equivalent-circle diameter of the tabular grain is from 0.2 to 5.0 μm, preferably from 0.5 to 3.0 μm, more preferably from 0.6 to 2.0 μm. The thickness of the tabular grain is preferably from 0.02 to 0.3 μm, more preferably from 0.03 to 0.2 μm.

Also in the case of an internal latent image-type direct positive silver halide emulsion, the same range as in the above-described tabular emulsion is preferred but the emulsion is preferably such an emulsion that silver halide grains having an average grain diameter (equivalent-circle diameter) of 0.3 μm or more (preferably from 0.3 to 10 μm, more preferably from 0.5 to 5.0 μm, still more preferably from 0.5 to 3.0 μm) and an aspect ratio of 2 or more, more preferably 5 or more, still more preferably 8 or more (preferably 100 or less) occupy 50% (area) or more (preferably 70% or more, more preferably 85% or more) of all silver halide grains in the emulsion.

The silver halide grain may have a dislocation line within the grain and the technique for introducing a dislocation line into a silver halide grain by controlling the dislocation is described in JP-A-63-220238. A specific high iodide phase is provided inside a tabular silver halide grain having an average aspect ratio of 2 or more and the outside thereof is covered with a phase having an iodide content lower than the high iodide phase, whereby a dislocation can be introduced. This introduction of dislocation can provide effects such as increase of sensitivity, improvement of storability, improvement of latent image stability and reduction of pressure fog. According to this technique, the dislocation is introduced mainly into the edge part of a tabular grain. A tabular grain in which dislocation is introduced into the center part is described in U.S. Pat. No. 5,238,796. The present invention is effective on silver halide grains in which 50% or more by number of grains have 10 or more dislocation lines per one grain.

Additives which can be added from the grain formation until the coating in the preparation of a silver halide emulsion are not particularly limited. In order to accelerate the growth during the crystal formation or to effectively perform the chemical sensitization at the time of grain formation and/or chemical sensitization, a silver halide solvent may be used. The silver halide solvent which can be effectively used is preferably a water-soluble thiocyanate, ammonia, thioether or a thiourea. Examples of the silver halide solvent include thiocyanates (e.g., those described in U.S. Pat. Nos. 2,222,264, 2,448,534 and 3,320,069), ammonia, thioether compounds (e.g., those described in U.S. Pat. Nos. 3,271,157, 3,574,628, 3,704,130, 4,297,439 and 4,276,347), thione compounds (e.g., those described in JP-A-53-144319, JP-A-53-82408 and JP-A-55-77737), amine compounds (e.g., those described in JP-A-54-100717), thiourea derivatives (e.g., those described in JP-A-55-2982), imidazoles (e.g., those described in JP-A-54-100717) and substituted mercaptotetrazoles (e.g., those described in JP-A-57-202531).

The production method of the silver halide emulsion is not particularly limited. In general, an aqueous silver salt solution and an aqueous halogen salt solution are added to a reaction solution containing an aqueous gelatin solution while stirring efficiently. Specific examples of the production method include the methods described in P. Glafkides, *Chemie et Phisique Photographique*, Paul Montel (1967), G. F. Duffin, *Photographic Emulsion Chemistry*, The Focal Press (1966), and V. L. Zelikman et al., *Making and Coating Photographic Emulsion*, The Focal Press (1964). More specifically, any of an acidic process, a neutral process and an ammonia process may be used and the form for reacting a soluble silver salt and a soluble halogen salt may be any of a single jet method, a double jet method and a combination thereof. The growth is preferably accelerated within the range of not exceeding the critical supersaturation degree by using a method of changing the addition rate of silver nitrate or an aqueous alkali halide solution according to the grain growth speed (described in British Patent 1,535,016, JP-B-48-36890 and JP-B-52-16364) or a method of changing the concentration of the aqueous solution (described in U.S. Pat. No. 4,242,445 and JP-A-55-158124). These methods are preferably used because renucleation does not occur and silver halide grains uniformly grow.

In place of adding a silver salt solution and a halogen salt solution to a reactor, fine grains previously prepared may be added to the reactor to cause nucleation and/or grain growth to thereby obtain silver halide grains and this method is also preferred. This technique is described in JP-A-1-183644, JP-A-1-183645, JP-A-2-44335, JP-A-2-43534, JP-A-2-43535 and U.S. Pat. No. 4,879,208. According to this method, the halogen ion distribution within the emulsion grain crystal can be made completely uniform and preferred photographic properties can be achieved. In the present invention, emulsion grains having various structures can be used. A so-called core/shell double structure grain consisting of a grain inside (core) and an outside (shell), a triple structure grain (described in JP-A-60-222844) and a greater multiple structure grain may be used. When an emulsion grain is intended to have a structure in the inside thereof, not only a grain having the above-described wrapping structure but also a grain having a so-called junction structure may be prepared. Examples thereof are described in JP-A-58-108526, JP-A-59-16254, JP-A-59-133540, JP-B-58-24772 and EP-A-199290. The crystal to be joined may have a composition different from the host crystal and may be grown to join to the edge or corner part or on the plane part of the host crystal. This joined crystal can be formed irrespective of whether the host crystal has a uniform halogen composition or a core-shell type structure. In the case of the junction structure, silver halides can of course be combined with each other but also a silver salt compound not having a rock-salt structure, such as silver rhodanide and silver carbonate, can be combined, if possible, with silver halide to give a junction structure grain. In the present invention, a core-shell double structure grain is most preferred.

In the case of a silver iodobromide grain having the above-described structure, for example, in a core-shell type grain, the silver iodide content may be high in the core part and low in the shell part or on the contrary, the silver iodide content may be low in the core part and high in the shell part. Similarly, in the case of a grain having a junction structure, the grain may be a grain where the host crystal has a high silver iodide content and the joined crystal has a relatively low silver iodide content, or may be a grain having a reverse relationship with respect to the silver iodide content. The boundary between portions different in the halogen composition of a grain having the above-described structure may be clear or may be unclear due to a mixed crystal formed using difference in the composition. Furthermore, a continuous change may be positively imparted to the structure. The silver halide emulsion is preferably surface latent image type, however, as disclosed in JP-A-59-133542, when the developer or the development conditions are selected, an internal latent image-type emulsion may also be used. A shallow internal latent image-type emulsion covered with a thin shell may also be used depending on the purpose.

In the present invention, at least either one of the chemical sensitization of core and the chemical sensitization of shell is performed using the compound represented by formula (3) preferably at a pAg of 5 to 10, a pH of 4 to 8 and a temperature of 30 to 80° C. Together with the compound of formula (1), a chalcogen sensitizer, a gold sensitizer and further other chemical sensitizer may be used in combination. Representative examples of the gold sensitizer are chloroauric acid and an alkali salt thereof. Preferably, the chemical sensitization of core is performed using the compound of formula (3).

It is not always necessary that both the core and the shell are chemically sensitized using the compound of formula (3). In this case, the chemical sensitization using a chalcogen sensitizer or a gold sensitizer in combination or other chemical sensitizer is applied The production method of the silver iodobromide tabular emulsion which is preferably used in the present invention is described, for example, in U.S. Pat. Nos. 4,439,520, 4,434,226, 4,433,048, 4,414,310 and 5,334,495.

With respect to an ultra-thin tabular emulsion having a grain thickness of 0.1 μm or less, U.S. Pat. Nos. 5,460,928, 5,411,853 and 5,418,125 describe the emulsion.

In the case where the present invention is applied to a high silver chloride tabular emulsion, examples of the emulsion which is preferably used include those described in European Patents 723187, 619517, 534,395 and 584,644.

The silver halide emulsion is usually subjected to spectral sensitization. The dye usually used for the spectral sensitization is preferably a methine dye. The methine dye includes a cyanine dye, a merocyanine dye, a complex cyanine dye, a complex merocyanine dye, a holopolar cyanine dye, a hemicyanine dye, a styryl dye and a hemioxonol dye. To these dyes, any ring usually used for cyanine dyes as a basic heterocyclic ring may be applied. Examples of the basic heterocyclic ring which can be used include a pyrroline ring, an oxazoline ring, a thiazoline ring, a pyrrole ring, an oxazole ring, a thiazole ring, a selenazole ring, an imidazole ring, a tetrazole ring and a pyridine ring. Also, a ring obtained by condensing a cyclic hydrocarbon ring or an aromatic hydrocarbon ring to a heterocyclic ring may be used. Examples of the condensed ring include an indolenine ring, a benzindolenine ring, an indole ring, a benzoxazole ring, a naphthoxazole ring, a benzothiazole ring, a naphthothiazole ring, a benzoselenazole ring, a benzimidazole ring and a quinoline ring. On the carbon atom of these rings, a substituent may be bonded. To the merocyanine dye or complex merocyanine dye, a 5- or 6-membered heterocyclic ring having a ketomethylene structure may be applied. Examples of this heterocyclic ring include a pyrazolin-5-one ring, a thiohydantoin ring, a 2-thiooxazolidine-2,4-dione ring, a thiazolidine-2,4-dione ring, a rhodanine ring and a thiobarbituric acid ring.

The amount of the sensitizing dye added is preferably from 0.001 to 100 mmol, more preferably from 0.01 to 10 mmol, per mol of silver halide. The sensitizing dye is preferably added during chemical sensitization or before chemical sensitization (for example, at the grain formation or physical ripening).

Together with the sensitizing dye, a dye which itself has no spectral sensitization effect or a substance which absorbs substantially no visible light, but which exhibits supersensitization may be added to the emulsion. Examples of such a dye or substance include aminostil compounds substituted by a nitrogen-containing heterocyclic group (those described in U.S. Pat. Nos. 2,933,390 and 3,635,721), aromatic organic acid-formaldehyde condensation products (those described in U.S. Pat. No. 3,743,510), cadmium salts and azaindene compounds. The combination of the sensitizing dye with the above-described dye or substance is described in U.S. Pat. Nos. 3,615,613, 3,615,641, 3,617,295 and 3,635,721.

The silver halide emulsion is generally subjected to chemical sensitization before use. The chemical sensitization is performed using sensitization by the compound of formula (1), chalcogen sensitization (e.g., sulfur sensitization, selenium sensitization, tellurium sensitization), noble metal sensitization (e.g., gold sensitization) and reduction sensitization individually or in combination. In the present invention, chemical sensitization is preferably performed using a combination of sensitization by the compound of formula (1), sulfur sensitization and gold-sulfur sensitization, or additionally using selenium sensitization or tellurium sensitization. In the sulfur sensitization, a labile sulfur compound is used as a sensitizer. The labile sulfur compound is disclosed in P. Glafkides, *Chimie et Physique Photographique,* 5th Ed., Paul Montel (1987), *Research Disclosure*, Vol. 307, No. 307105, T. H. James (compiler), *The Theory of the Photographic Process,* 4th Ed., Macmillan (1977), and H. Frieser, *Die Grundlagen der Photographischen Prozess mit Silver-halogeniden*, Akademische Verlags-geselbshaft (1968). Examples of the sulfur sensitizer include thiosulfates (e.g., sodium thiosulfate, p-toluenethiosulfonate), thioureas (e.g., diphenylthiourea, triethylthiourea, N-ethyl-N'-(4-methyl-2-thiazolyl)thiourea, carboxymethyltrimethylthiourea), thioamides (e.g., thioacetamide, N-phenylthioacetamide), rhodanines (e.g., rhodanine, N-ethyl rhodanine, 5-benzylidene rhodanine, 5-benzylidene-N-ethyl rhodanine, diethyl rhodanine), phosphine sulfides (e.g., trimethylphosphine sulfide), thiohydantoins, 4-oxo-oxazolidine-2-thiones, dipolysulfides (e.g., dimorpholine disulfide, cystine, hexathiocane-thione), mercapto compounds (e.g., cysteine), polythionates and elemental sulfur. An active gelatin can also be used as a sulfur sensitizer.

In the selenium sensitization, a labile selenium compound is used as a sensitizer. The labile selenium compound is described in JP-B-43-13489, JP-B-44-15748, JP-A-4-25832, JP-A-4-109240, JP-A-4-271341 and JP-A-5-40324. Examples of the selenium sensitizer include colloidal metal selenium, selenoureas (e.g., N,N-dimethylselenourea, trifluoromethylcarbonyl-trimethylselenourea, acetyl-trimethylselenourea), selenoamides (e.g., selenoamide, N,N-diethylphenylselenoamide), phosphine selenides (e.g., triphenylphosphine selenide, pentafluorophenyl-triphenylphosphine selenide), selenophosphates (e.g., tri-p-tolylselenophosphate, tri-n-butylselenophosphate), selenoketones (e.g., selenobenzophenone), isoselenocyanates, selenocarboxylic acids, selenoesters and diacyl selenides. In addition, relatively stable selenium compounds (those described in JP-B-46-4553 and JP-B-52-34492) such as selenious acid, potassium selenocyanide, selenazoles and selenides may also be used as a selenium sensitizer.

In the tellurium sensitization, a labile tellurium compound is used as a sensitizer. The labile tellurium compound is described in Canadian Patent 800,958, British Patents 1,295,462 and 1,396,696, JP-A-4-204640, JP-A-4-271341, JP-A-4-333043 and JP-A-5-303157. Examples of the tellurium sensitizer include telluroureas (e.g., tetramethyltellurourea, N,N'-dimethylethylenetellurourea, N,N'-diphenylethylenetellurourea), phosphine tellurides (e.g., butyl-diisopropylphosphine telluride, tributyl-phosphine telluride, tributoxyphosphine telluride, ethoxy-diphenylphophine telluride), diacyl (di)tellurides (e.g., bis(diphenylcarbamoyl) ditelluride, bis(N-phenyl-N-methylcarbamoyl) ditelluride, bis(N-phenyl-N-methylcarbamoyl) telluride, bis(ethoxycarbonyl) telluride), isotellurocyanates (e.g., allylisotellurocyanate), telluroketones (e.g., telluroacetone, telluroacetophenone), telluroamides (e.g., telluroacetamide, N,N-dimethyltellurobenzamide), tellurohydrazides (e.g., N,N',N'-trimethyltelluro-benzohydrazide), telluroesters (e.g., tert-butyl-tert-hexyltelluroester), colloidal tellurium, (di)tellurides and other tellurium compounds (e.g., potassium telluride, telluropentathionate sodium salt).

In the noble metal sensitization, a salt of noble metals such as gold, platinum, palladium and iridium is used as a sensitizer. The noble metal salt is described in P. Glafkides, *Chemie et Phisique Photographique,* 5th Ed., Paul Montel (1987) and *Research Disclosure*, Vol. 307, No. 307105. The gold sensitization is particularly preferred. Examples of the gold sensitizer include chloroauric acid, potassium chloroaurate, potassium aurithicyanate, gold sulfide and gold selenide. In addition, the gold compounds described in U.S. Pat. Nos. 2,642,361, 5,049,484 and 5,049,485 may also be used.

In one embodiment of the gold sensitization, the gold complexes described in U.S. Pat. Nos. 5,700,631, 5,759,761 and 5,620,841, JP-A-3-266828, JP-A-4-67032 and JP-A-8-69074 may also be used.

In the present invention, reduction sensitization can be used in combination.

In the reduction sensitization, a reducing compound is used as a sensitizer. The reducing compound is described in P. Glafkides, *Chemie et Phisique Photographique,* 5th Ed., Paul Montel, (1987), and *Research Disclosure*, Vol. 307, No. 307105. Examples of the reducing sensitizer include aminoiminomethanesulfinic acid (thiourea dioxide), borane compounds (e.g., dimethylaminoborane), hydrazine compounds (e.g., hydrazine, p-tolylhydrazine), polyamine compounds (e.g., diethylenetriamine, triethylenetetramine), stannous chloride, silane compounds, reductones (e.g., ascorbic acid), sulfites, aldehyde compounds and hydrogen. The reduction sensitization may also be performed using an atmosphere of high pH or excess silver ion (so-called silver ripening).

The chemical sensitization may be performed by using the chemical sensitization treatments in combination of two or more thereof. A combination of sensitization by the compound of formula (1), chalcogen sensitization and gold sensitization is particularly preferred. The reduction sensitization is preferably applied during the formation of silver halide grains. The amount of the sensitizer used is generally determined according to the kind of silver halide grain and chemical sensitization conditions used. The amount of the chalcogen sensitizer used is from $10^{-8}$ to $10^{-2}$ mol, preferably from $10^{-7}$ to $5\times10^{-3}$ mol. per mol of silver halide. The amount of the noble metal sensitizer used is preferably from $10^{-7}$ to $10^{-2}$ mol per mol of silver halide. The chemical sensitization conditions are not particularly limited. The pAg is from 6 to 11, preferably from 7 to 10, the pH is preferably from 4 to 10, and the temperature is preferably from 40 to 95° C., more preferably from 45 to 85° C.

The layer structure of the silver halide photographic material is not particularly limited. However, in the case of a color photographic material, a multi-layer structure is used so as to separately record blue light, green light and red light. Each silver halide emulsion layer may consists of two layers of high-speed layer and low-speed layer. Examples of practical layer structures include the following (1) to (6).

(1) BH/BL/GH/GL/RH/RL/S (2) BH/BM/BL/GH/GM/GL/RH/RM/RL/S (3) BH/BL/GH/RH/GL/RL/S (4) BH/GH/RH/BL/GL/RL/S (5) BH/BL/CL/GH/GL/RH/RL/S (6) BH/BL/GH/GL/CL/RH/RL/S

In these layer structures, B denotes a blue-sensitive layer, G denotes a green-sensitive layer, R denotes a red-sensitive layer, H denotes a highest-speed layer, M denotes a medium-speed layer, L denotes a low-speed layer, S denotes a support and CL denotes an interlayer effect-imparting layer. Light-insensitive layers such as protective layer, filter layer, interlayer, antihalation layer and subbing layer are omitted. With the same color speed, the high-speed layer and the low-speed layer may be reversely disposed. The structure (3) is described in U.S. Pat. No. 4,184,876, (4) is described in *Research Disclosure*, Vol. 225, No. 22534, JP-A-59-177551 and JP-A-59-177552, and (5) and (6) are described in JP-A-61-34541. Of these, the layer structures (1), (2) and (4) are preferred. The silver halide photographic material of the present invention can be similarly applied, other than the color photographic material, to X-ray light-sensitive material, black-and-white light-sensitive material for photographing, light-sensitive material for photomechanical process, and printing paper.

Various additives (e.g., binder, chemical sensitizer, spectral sensitizer, stabilizer, gelatin, hardening agent, surfactant, antistatic agent, polymer latex, matting agent, color coupler, ultraviolet absorbent, discoloration inhibitor, dye) for the silver halide emulsion, the support for the photographic material, and the processing method (e.g., coating method, exposure method, development method) of the photographic material are described in *Research Disclosure*, Vol. 176, No. 17643 (RD-17643), ibid., Vol. 187, No. 18716 (RD-18716), and ibid., Vol. 225, No. 22534 (RD-22534). The pertinent portions in these *Research Disclosures* are summarized in Table below.

| | Kinds of Additives | RD-17643 | RD-18716 | RD-22534 |
|---|---|---|---|---|
| 1. | Chemical sensitizer | p. 23 | p. 648, right col. | p. 24 |
| 2. | Sensitivity increasing agent | | p. 648, right col. | |
| 3. | Spectral sensitizer, supersensitizer | pp. 23–24 | p. 648, right col. to p. 649, right col. | pp. 24–28 |
| 4. | Brightening agent | p. 24 | | |
| 5. | Antifoggant, stabilizer | pp. 24–25 | p. 649, right col. | p. 24 and p. 31 |
| 6. | Light absorbent, filter dye, UV absorbent | pp. 25–26 | p. 649, right col. to p. 650, left col. | |
| 7. | Stain inhibitor | p. 25, right col. | p. 650, left to right cols. | |
| 8. | Dye Image Stabilizer | p. 25 | | p. 32 |
| 9. | Hardening agent | p. 26 | p. 651, left col. | p. 32 |
| 10. | Binder | p. 26 | " | p. 28 |
| 11. | Plasticizer, lubricant | p. 27 | p. 650, right col. | |
| 12. | Coating aid, surfactant | pp. 26–27 | p. 650, right col. | |
| 13. | Antistatic agent | p. 27 | p. 650, right col. | |
| 14. | Color coupler | p. 25 | p. 649 | p. 31 |

As the gelatin hardening agent, for example, active halide compounds (e.g., 2,4-dichloro-6-hydroxy-1,3,5-triazine, a sodium salt thereof) and active vinyl compounds (e.g., 1,3-bisvinylsulfonyl-2-propanol, 1,2-bis(vinyl-sulfonylacetamido)ethane, vinyl polymer having a vinyl-sulfonyl group on the chain) are preferred because hydrophilic colloid such as gelatin can be rapidly hardened and stable photographic properties are obtained. Also, N-carbamoyl pyridinium salts (e.g., (1-morpholinocarbonyl-3-pyridinio) methanesulfonate) and haloamidinium salts (e.g., 1-(1-chloro-1-pyridinomethylene)pyrrolidinium 2-naphthalene-sulfonate) are preferred because of their high hardening rate.

The color photographic material can be developed by an ordinary method described in *Research Disclosure*, Vol. 176, No. 17643, and ibid., Vol. 187, No. 18716. The color photographic light-sensitive material is usually subjected to water washing or a treatment with a stabilizer after development and bleach-fixing or fixing. The water washing is generally performed in a countercurrent washing system using two or more tanks for the purpose of saving water. Representative examples of the stabilization include a multistage countercurrent stabilization described in JP-A-57-8543, which is performed in place of water washing.

In addition to those described above, color couplers for use in the present invention are described in JP-A-11-65007, paragraphs 0019 to 0024, chemical sensitization is described in ibid., paragraphs 0041 to 0053, antifoggant is described in ibid., paragraph 0057, sensitizing dyes and the like are described in ibid., paragraphs 0058 to 0060, development processing is described in ibid., paragraphs 0080 to 0099, and application to APS system is described in ibid., paragraphs 0100 to 0126.

The present invention can also be preferably applied to a color diffusion transfer light-sensitive material using an internal latent image-type direct positive silver halide emulsion. The internal latent image-type direct positive silver halide emulsion includes a type where the grain is fogged by light and a type where the grain is chemically fogged using a nucleating agent. Of these, an emulsion of a type where the grain is chemically fogged is preferred.

The nucleating agent is preferably a hydrazine, a hydrazide, a heterocyclic quaternary salt compound, a thiourea-bonded acylhydrazine compound, or a hydrazine-base compound having bonded thereto as the adsorbing group a thioamide ring or a heterocyclic group such as triazole or tetrazole.

Preferred examples of the internal latent image-type direct positive silver halide emulsion include the emulsions described in U.S. Pat. Nos. 3,206,313, 3,761,266, 4,035,185, 4,395,478, 4,504,570, 4,434,226, 4,414,310 and 4,439,520.

In the case of using the compound represented by formula (3) of the present invention for an internal latent image-type direct positive silver halide emulsion, the compound is preferably used in an amount of from $5\times10^{-5}$ to $1\times10^{-7}$ mol, more preferably from $1\times10^{-5}$ to $1\times10^{-6}$ mol, per mol of silver halide in the core grain. The chalcogen sensitizer, gold sensitizer and other chemical sensitizer which can be used in combination with the compound of formula (3) each is preferably used in a ratio of 100 to 1/100 times (by mol), more preferably from 10 to 1/10 times, to the compound of formula (I). Also in the case where the shell grain is chemically sensitized, the compound is preferably used in the above-described amount based on the silver halide in the shell grain.

The color diffusion transfer light-sensitive material to which the present invention can be preferably applied is described below. The dye image-forming substance for use in the present invention is a non-diffusible compound which releases a diffusible dye (or a dye precursor) in relation to the silver development, or a compound which changes in the diffusibility of the compound itself. These substances are described in *The Theory of the Photographic Process,* 4th ed., and can be represented by the following formula (3'):

$$(DYE\text{-}Y')_p\text{-}Z' \qquad (3')$$

wherein DYE represents a dye group, a dye group temporarily shifted to short wave or a dye precursor group, Y' represents a mere bond or a linking group, Z' represents a group having property of generating difference in the diffusibility of the compound represented by $(DYE\text{-}Y')_p\text{-}Z'$ in relation to the silver development (more specifically, in correspondence or counter-correspondence to the light-sensitive silver salt having imagewise a latent image), or releasing DYE to generate difference in the diffusibility between DYE released and $(DYE\text{-}Y')_p\text{-}Z'$, p represents 1 or 2, and when q is 2, two Dye-Y' moieties may be the same or different.

By the function of Z' in formula (3'), the compound is roughly classified into a negative compound which becomes diffusible in the silver developed area and a positive compound which diffusible in the undeveloped area.

Specific examples of the negative Z' include those which are oxidized as a result of development and cleaved to release a diffusible dye.

Specific examples of Z' are described in U.S. Pat. Nos. 3,928,312, 4,055,428, 4,179,291, 4,149,892, 4,183,753, 4,142,891, 4,199,355 and 4,135,929, JP-A-53-50736, JP-A-57-4043, JP-A-54-130927, JP-A-56-164342 and JP-A-57-119345.

Among Z' groups of the negative dye-releasing redox compound, preferred are N-substituted sulfamoyl groups (N-substituent is a group derived from an aromatic hydrocarbon ring or a heterocyclic ring).

Specific examples of the compound include a compound (dye developing agent) which is initially diffusible under alkali conditions but oxidized by the development to become non-diffusible. Representative examples of Z' effective for this type of compound include those described in U.S. Pat. No. 2,983,606.

Another type undergoes self-ring closure in alkali conditions to release a diffusible dye but when oxidized accompanying development, releases substantially no dye. Specific examples of Z' having such a function include those described in JP-A-53-69033, JP-A-54-130927 and U.S. Pat. Nos. 3,421,964 and 4,199,355.

Still another type does not release a dye by itself but when reduced, releases a dye. This type of compound is used together with an electron donor, whereby a diffusible dye can be imagewise released by the reaction with the remaining electron donor which is imagewise oxidized by the silver development. The atomic group having such a function is described, for example, in U.S. Pat. Nos. 4,183,753, 4,278,750, 4,218,368 and 4,358,535, JP-A-53-110827, JP-A-54-130927, JP-A-56-164342, JIII Journal of Technical Disclosure No. 87-6199 and EP-A-220746.

In the case of using this type of compound, the compound is preferably used in combination with a non-diffusible electron donating compound (well-known as ED compound) or a precursor thereof. Examples of the ED compound are described, for example, in U.S. Pat. Nos. 4,263,393 and 4,278,750 and JP-A-56-138736.

Specific examples of the another type dye image-forming substance are described in U.S. Pat. Nos. 3,719,489 and 4,098,783.

Specific examples of the dye represented by DYE in formula (3') are described in the following publications. Examples of Yellow Dye:

U.S. Pat. Nos. 4,148,641, 4,148,643 and 4,336,322, JP-A-51-114930, JP-A-56-71072, *Research Disclosure*, No. 17630 (1978) and ibid., No. 16475 (1977)

Examples of Magenta Dye:

U.S. Pat. Nos. 3,932,380, 4,233,237, 4,250,246, 4,207,104 and 4,287,292, JP-A-55-36804, JP-A-56-73057 and JP-A-55-134

Examples of Cyan Dye:

U.S. Pat. Nos. 3,482,972, 4,171,220, 4,142,891 and 4,148,642, British Patent 1,551,138, JP-A-52-8827, JP-A-53-47823, JP-A-56-71061, European Patents 53037 and 53040, *Research Disclosure*, No. 17, 630 (1978) and ibid., No. 16, 475 (1977).

The present invention is described in greater detail below by referring to the Examples.

EXAMPLE I-1

(Preparation of Emulsion A for Blue-Sensitive Emulsion Layer)

A 1:1 mixture (silver ratio by mol) of Large-Size Emulsion A1 having an average grain size of 0.70 μm and Small-Size Emulsion A2 having an average grain size of 0.50 μm, which were cubic, was prepared and designated as Emulsion A.

Emulsion A1 and Emulsion A2 had a coefficient of variation in the grain size distribution of 0.09 and 0.11, respectively. In each size emulsion, 0.5 mol % of silver bromide was incorporated locally on a part of the grain surface comprising a silver chloride mainly. In the portion corresponding to 10% by volume from the outermost surface layer of the grain, 0.1 mol % of iodide ion was allowed to be present based on all halides and $1\times10^{-6}$ mol of $K_4Ru(CN)_6$, $1.0\times10^{-7}$ mol of yellow prussiate of potash and $1\times10^{-8}$ mol of $K_2IrCl_5(H_2O)$ were allowed to be present per mol of silver halide.

This emulsion was subjected to spectral sensitization by adding the following Blue-Sensitive Sensitizing Dyes A and B each in an amount of $3.2\times10^{-4}$ mol based on Emulsion A1 and each in an amount of $4.4\times10^{-4}$ mol based on Emulsion A2, respectively.

Sensitizing Dye A:

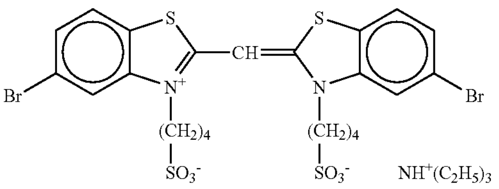

Sensitizing Dye B:

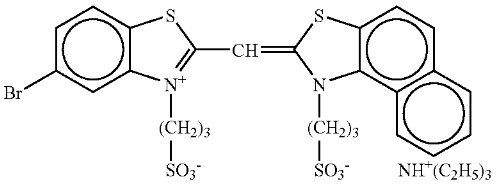

(Preparation of Emulsion B for Green-Sensitive Emulsion Layer)

Emulsion B having an average grain size of 0.40 μm, which was cubic, was prepared, where the coefficient of variation in the grain size distribution was 0.09, 0.1 mol % of silver iodide was incorporated into the vicinity of the grain surface and 0.4 mol % of silver bromide was incorporated and allowed to be locally present on the grain surface. In the emulsion grain, $K_4Ru(CN)_6$, yellow prussiate of potash and $K_2IrCl_5(H_2O)$ were allowed to be present in the same manner as in Emulsion A.

Thereto, $3.3\times10^{-4}$ mol of Sensitizing Dye D, $5\times10^{-5}$ mol of Sensitizing Dye E and $2.3\times10^{-4}$ mol of Sensitizing Dye F were added per mol of silver halide.

Sensitizing Dye D:

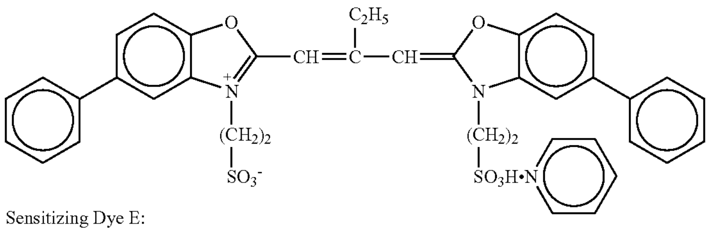

Sensitizing Dye E:

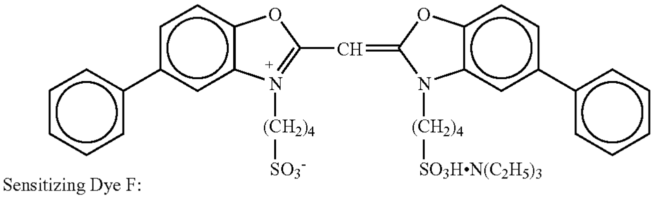

Sensitizing Dye F:

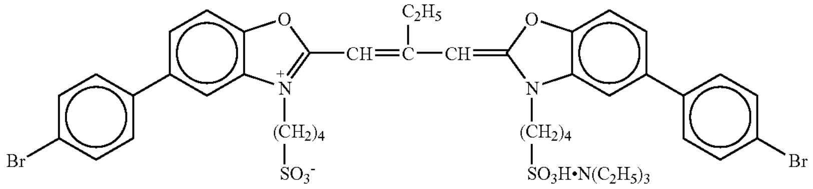

(Preparation of Emulsion C for Red-Sensitive Emulsion Layer)

A 1:1 mixture (silver ratio by mol) of Large-Size Emulsion C1 having an average grain size of 0.40 μm and Small-Size Emulsion C2 having an average grain size of 0.30 μm, which were cubic, was prepared. These emulsions had a coefficient of variation in the grain size distribution of 0.09 and 0.11, respectively. In each size emulsion, 0.1 mol % of silver iodide was incorporated into the vicinity of the grain surface and 0.8 mol % of silver bromide was incorporated and allowed to be locally present on the grain surface. In the emulsion grain, $K_4Ru(CN)_6$, yellow prussiate of potash and $K_2IrCl_5(H_2O)$ were allowed to be present in the same manner as in Emulsion A.

Thereto, Sensitizing Dyes G and H were added each in an amount of $8.0\times10^{-5}$ mol based on the large-size emulsion and each in an amount of $10.7\times10^{-5}$ mol based on the small-size emulsion. Furthermore, $3.0\times10^{-3}$ mol of Compound I shown below was added to the red-sensitive emulsion layer per mol of silver halide.

Sensitizing Dye G:

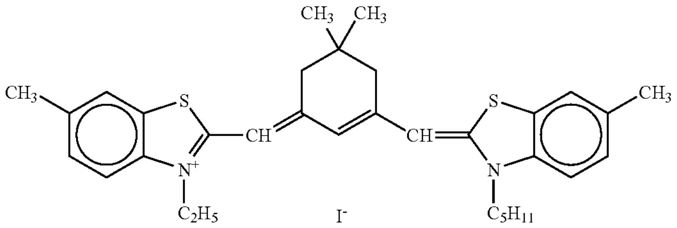

Sensitizing Dye: H

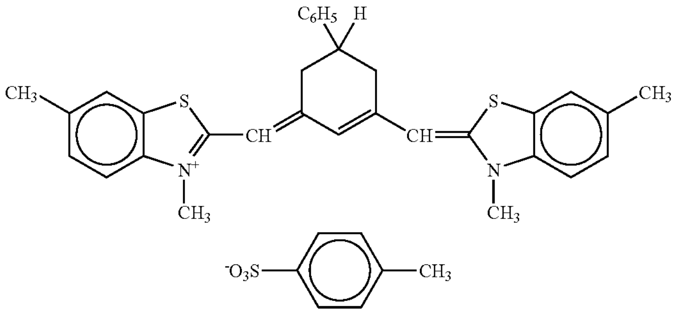

-continued (Compound 1)

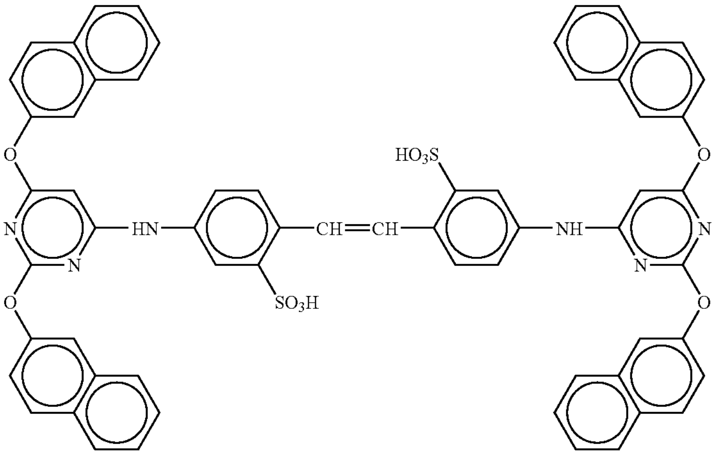

(Color Photographic Light-Sensitive Material, Preparation of Coated Sample)

The surface of a support obtained by coating polyethylene resin on both surfaces of paper was subjected to a corona discharge treatment and thereon, a gelatin undercoat layer containing sodium dodecylbenzenesulfonate was provided. Further thereon, first to seventh photographic constituent layers were coated in sequence to manufacture silver halide color photographic light-sensitive material Sample (101) having the layer structure shown below. The coating solution for each photographic constituent layer was prepared as follows. Preparation of Coating Solution for First Layer:

In 21 g of Solvent (Solv-1) and 80 ml of Ethyl acetate, 57 g of Yellow Coupler (ExY), 7 g of Dye Image Stabilizer (Cpd-1), 4 g of Dye Image Stabilizer (Cpd-2), 7 g of Dye Image Stabilizer (Cpd-3) and 2 g of Dye Image Stabilizer (Cpd-8) were dissolved. The resulting solution was emulsion-dispersed in 220 g of an aqueous 23.5% by mass (i.e., by weight) gelatin solution containing 4 g of sodium dodecylbenzenesulfonate by a high-speed stirring emulsifier (dissolver) and thereto, water was added to prepare 900 g of Emulsified Dispersion A.

Emulsified Dispersion A and Emulsion A were mixed and dissolved to prepare a coating solution for the first layer to have a composition shown later. The amount of emulsion coated is a coated amount in terms of silver amount.

The coating solutions for the second to seventh layers were prepared in the same manner as the coating solution for the first layer. In each layer, (H-1) (sodium (2,4-dichloro-6-oxide-1,3,5-triazine)), (H-2) and (H-3) were used as the gelatin hardening agent. Furthermore, in each layer, Ab-1, Ab-2, Ab-3 and Ab-4 were added each to give a total coverage of 15.0 $mg/m^2$, 60.0 $mg/m^2$, 5.0 $mg/m^2$ and 10.0 $mg/m^2$, respectively Hardening Agent (H-1)

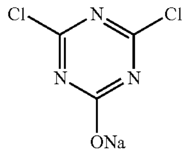

(1.4% by mass per gelatin)

-continued

Hardening Agent (H-2)

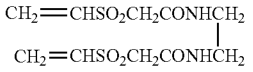

Hardening Agent (H-3)

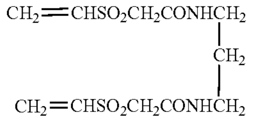

Antiseptic (Ab-1)

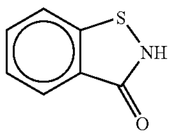

Antiseptic (Ab-2)

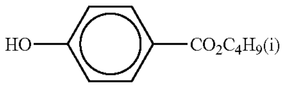

Antiseptic (Ab-3)

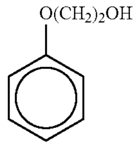

Antiseptic (Ab-4)

A 1:1:1:1 (by mol) mixture of a, b, c and d.

-continued

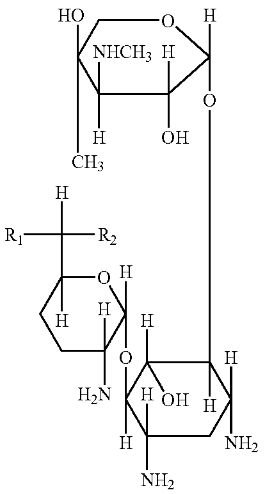

| | $R_1$ | $R_2$ |
|---|---|---|
| a | —$CH_3$ | —$NHCH_3$ |
| b | —$CH_3$ | —$NH_2$ |
| c | —H | —$NH_2$ |
| d | —H | —$NHCH_3$ |

The chemical sensitization step is described below. Each emulsion obtained above was heated to 40° C. and chloroauric acid and a optimal amount of sodium thiosulfate pentahydrate were added. The resulting emulsions each was heated at 60° C. for 40 minutes and thereto, sensitizing dyes shown above were added. After cooling to 40° C., 1-(3-methylureidophenyl)-5-mercaptotetrazole was added to each the above Emulsions A, B and C in an amount of $3.3\times10^{-4}$ mol, $1.0\times10^{-3}$ mol and $5.9\times10^{-4}$ mol, respectively. The emulsion according to the present invention was prepared by performing the chemical sensitization using the gold sensitizer shown in Table I-10.

The 1-(3-methylureidophenyl)-5-mercaptotetrazole was added also to the second layer, the fourth layer, the sixth layer and the seventh layer to give a coverage of 0.2 mg/$m^2$, 0.2 mg/$m^2$, 0.6 mg/$m^2$ and 0.1 mg/$m^2$, respectively.

Furthermore, 4-hydroxy-6-methyl-1,3,3a,7-tetraza-indene was added to the blue-sensitive emulsion layer and the green-sensitive emulsion layer in an amount of $1\times10^{-4}$ mol and $2\times10^{-4}$ mol, respectively, per mol of silver halide.

In the red-sensitive emulsion layer, 0.05 g/$m^2$ of a copolymer latex of methacrylic acid and butyl acrylate (mass ratio (i.e., weight ratio): 1:1, average molecular weight: 200,000 to 400,000) was added.

Also, disodium catechol-3,5-disulfonate was added to the second layer, the fourth layer and the sixth layer to give a coverage of 6 mg/$m^2$, 6 mg/$m^2$ and 18 mg/$m^2$, respectively.

For the purpose of preventing irradiation, the dyes shown below (in the parenthesis, the amount coated is shown) were added.

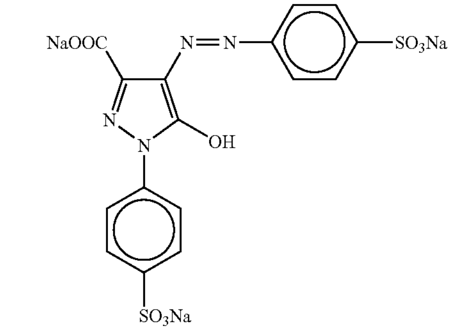

(2 mg/$m^2$)

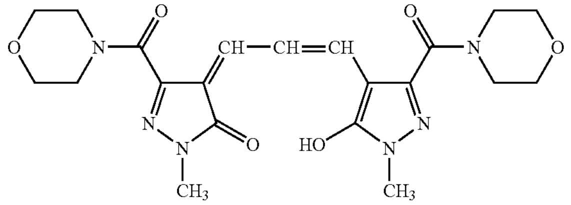

(2 mg/$m^2$)

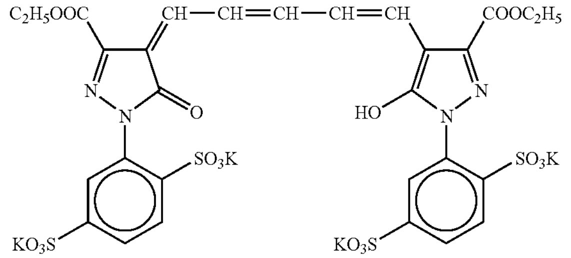

(3 mg/$m^2$)

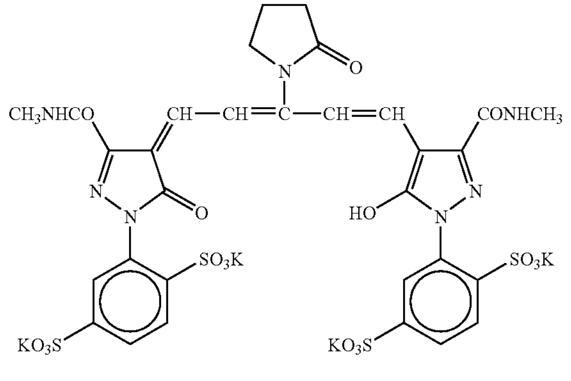

(7 mg/$m^2$)

(Layer Structure)

Each layer had a construction shown below. The numeral shows the amount coated (g/$m^2$). In the case of silver halide emulsion, the amount coated in terms of silver is shown.

Support (Polyethylene Resin-laminated Paper)

[The polyethylene resin in the first layer side contained white pigment ($TiO_2$ (content): 16% by mass (i.e., by weight), ZnO (content): 4% by mass), a fluorescent brightening agent (4,4'-bis(5-methylbenzoxazolyl)stilbene, content: 0.03% by mass) and a bluish dye (ultramarine).]

| First Layer (blue-sensitive emulsion layer): | |
|---|---|
| Emulsion A | 0.24 |
| Gelatin | 1.25 |
| Yellow Coupler (ExY) | 0.57 |
| Dye Image Stabilizer (Cpd-1) | 0.07 |
| Dye Image Stabilizer (Cpd-2) | 0.04 |
| Dye Image Stabilizer (Cpd-3) | 0.07 |
| Dye Image Stabilizer (Cpd-8) | 0.02 |
| Solvent (Solv-1) | 0.21 |

| Second Layer (color mixing inhibiting layer): | |
|---|---|
| Gelatin | 0.99 |
| Color Mixing Inhibitor (Cpd-4) | 0.09 |
| Dye Image Stabilizer (Cpd-5) | 0.018 |
| Dye Image Stabilizer (Cpd-6) | 0.13 |
| Dye Image Stabilizer (Cpd-7) | 0.01 |
| Solvent (Solv-1) | 0.06 |
| Solvent (Solv-2) | 0.22 |

| Third Layer (green-sensitive emulsion layer): | |
|---|---|
| Emulsion B | 0.14 |
| Gelatin | 1.36 |
| Magenta Coupler (ExM) | 0.15 |
| Ultraviolet Absorbent (UV-A) | 0.14 |
| Dye Image Stabilizer (Cpd-2) | 0.02 |
| Dye Image Stabilizer (Cpd-4) | 0.002 |
| Dye Image Stabilizer (Cpd-6) | 0.09 |
| Dye Image Stabilizer (Cpd-8) | 0.02 |
| Dye Image Stabilizer (Cpd-9) | 0.03 |
| Dye Image Stabilizer (Cpd-10) | 0.01 |
| Dye Image Stabilizer (Cpd-11) | 0.0001 |
| Solvent (Solv-3) | 0.11 |
| Solvent (Solv-4) | 0.22 |
| Solvent (Solv-5) | 0.20 |

| Fourth Layer (color mixing inhibiting layer): | |
|---|---|
| Gelatin | 0.71 |
| Color Mixing Inhibitor (Cpd-4) | 0.06 |
| Dye Image Stabilizer (Cpd-5) | 0.013 |
| Dye Image Stabilizer (Cpd-6) | 0.10 |
| Dye Image Stabilizer (Cpd-7) | 0.007 |
| Solvent (Solv-1) | 0.04 |
| Solvent (Solv-2) | 0.16 |

| Fifth Layer (red-sensitive emulsion layer): | |
|---|---|
| Emulsion C | 0.12 |
| Gelatin | 1.11 |
| Cyan Coupler (ExC-2) | 0.13 |
| Cyan Coupler (ExC-3) | 0.03 |
| Dye Image Stabilizer (Cpd-1) | 0.05 |
| Dye Image Stabilizer (Cpd-6) | 0.06 |

-continued

| Fifth Layer (red-sensitive emulsion layer): | |
|---|---|
| Dye Image Stabilizer (Cpd-7) | 0.02 |
| Dye Image Stabilizer (Cpd-9) | 0.04 |
| Dye Image Stabilizer (Cpd-10) | 0.01 |
| Dye Image Stabilizer (Cpd-14) | 0.01 |
| Dye Image Stabilizer (Cpd-15) | 0.12 |
| Dye Image Stabilizer (Cpd-16) | 0.03 |
| Dye Image Stabilizer (Cpd-17) | 0.09 |
| Dye Image Stabilizer (Cpd-18) | 0.07 |
| Solvent (Solv-5) | 0.15 |
| Solvent (Solv-8) | 0.05 |

| Sixth Layer (ultraviolet absorbing layer): | |
|---|---|
| Gelatin | 0.46 |
| Ultraviolet Absorbent (UV-B) | 0.45 |
| Compound (S1-4) | 0.0015 |
| Solvent (Solv-7) | 0.25 |

| Seventh Layer (protective layer): | |
|---|---|
| Gelatin | 1.00 |
| Acryl-modified polymer of polyvinyl alcohol (modification degree: 17%) | 0.04 |
| Liquid paraffin | 0.02 |
| Surfactant (Cpd-13) | 0.01 |

Yellow Coupler (ExY):

A 70:30 (by mol) mixture of

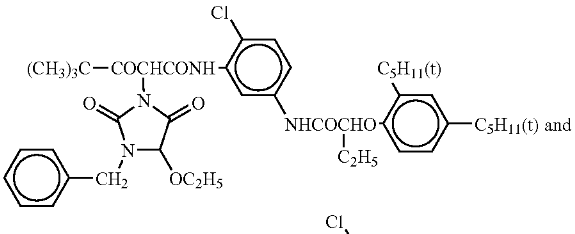

and

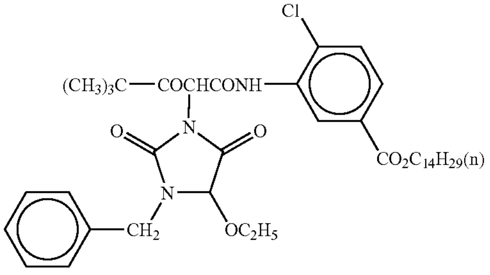

Magenta Coupler (ExM):
A 40:40:20 (by mol) mixture of
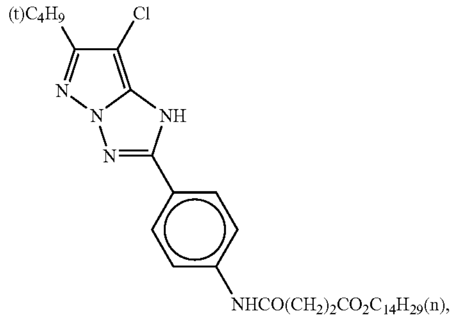
,
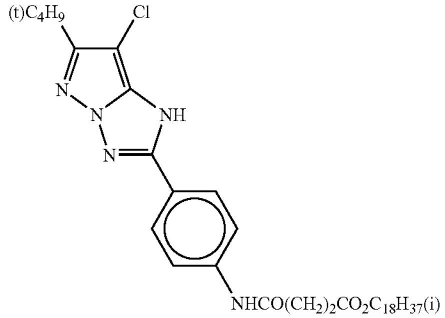
and
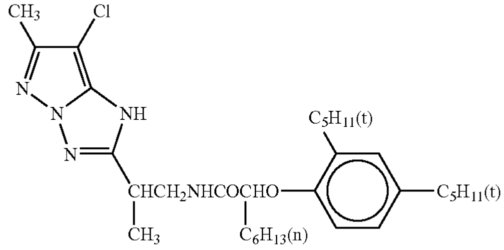
Cyan Coupler (ExC-2):
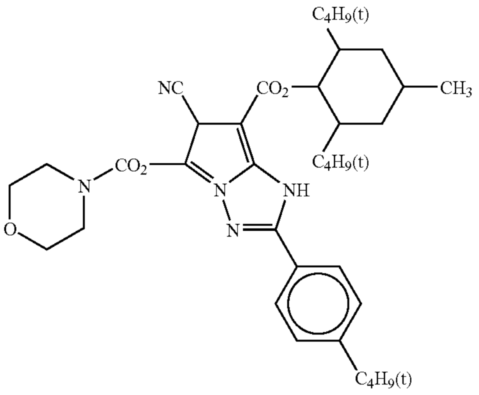
Cyan Coupler (ExC-3):
A 50:25:25 (by mol) mixture of
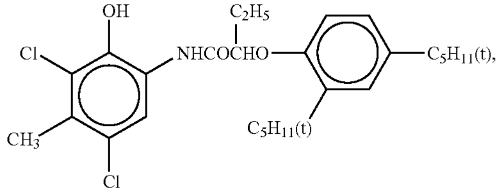
,
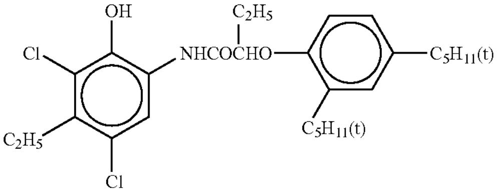
and
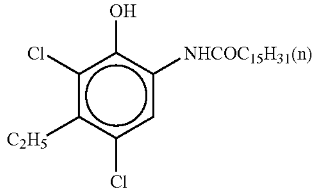
Dye Image Stabilizer (Cpd-1):
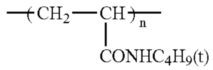
Number average molecular weight: 60,000
Dye Image Stabilizer (Cpd-2):
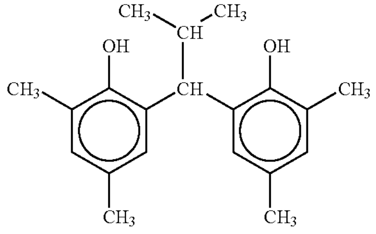
Dye Image Stabilizer (Cpd-3):
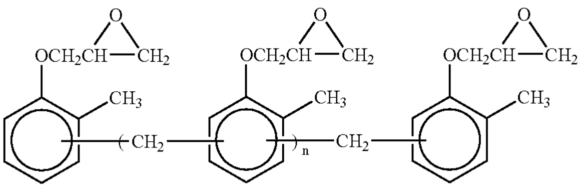
n: 7 to 8 (average)

Color Mixing Inhibitor (Cpd-4):
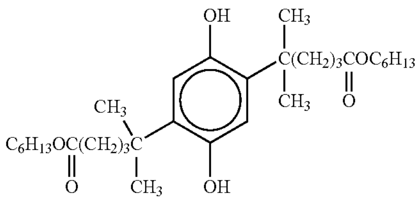
Dye Image Stabilizer (Cpd-5):
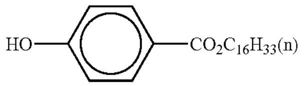
Dye Image Stabilizer (Cpd-6):
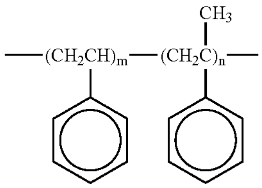
Number average molecular weight: 600 m/n = 10/90
Dye Image Stabilizer (Cpd-7):
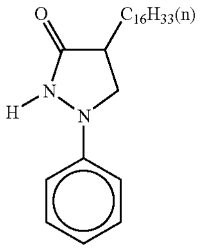
Dye Image Stabilizer (Cpd-8):
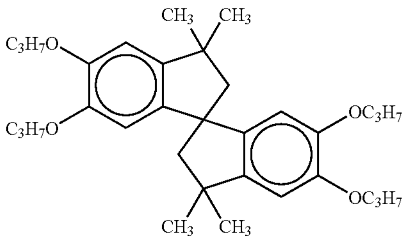
Dye Image Stabilizer (Cpd-9):
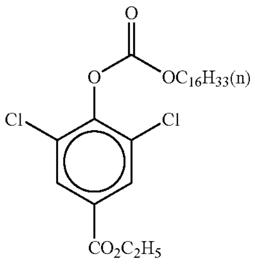
Dye Image Stabilizer (Cpd-10):
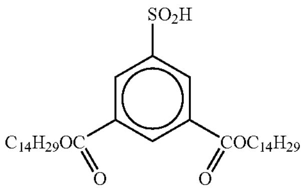
(Cpd-11)
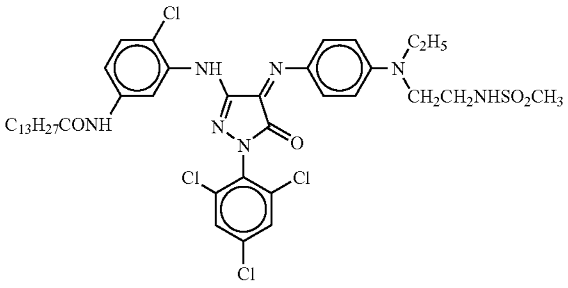
(Cpd-13)
A 7:3 (by mol) mixture of
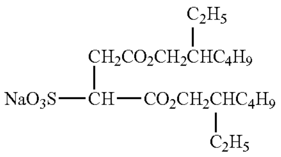
and
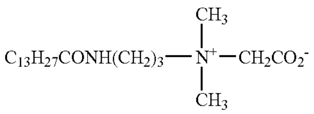
(Cpd-14)
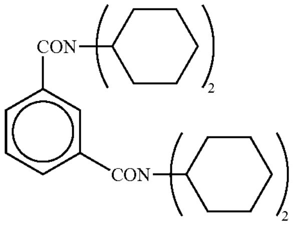

-continued
(Cpd-15)
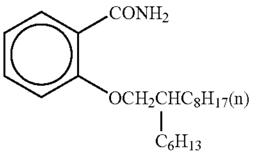
(Cpd-16)
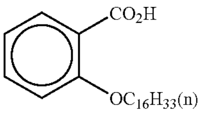
(Cpd-17)
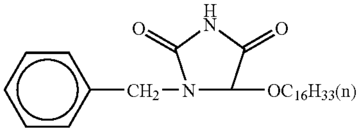
(Cpd-18)
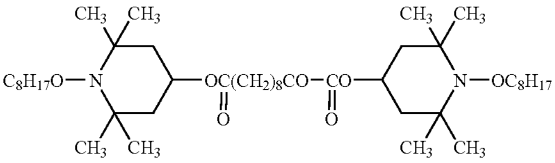
(Cpd-19)
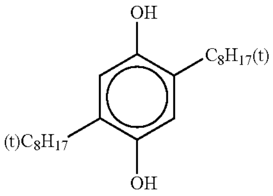
Color Mixing Inhibitor
Ultraviolet Absorbent (UV-1):
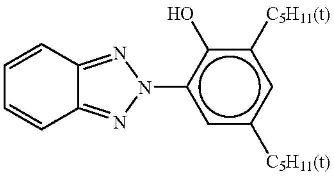
Ultraviolet Absorbent (UV-2):
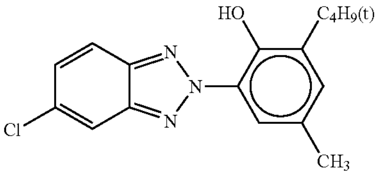
Ultraviolet Absorbent (UV-3):
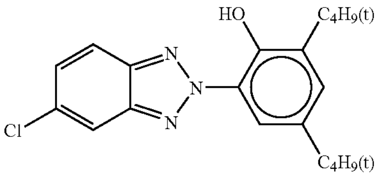
Ultraviolet Absorbent (UV-4):
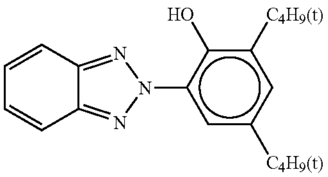
Ultraviolet Absorbent (UV-5):
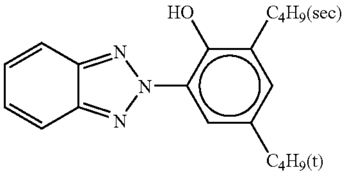
Ultraviolet Absorbent (UV-6):
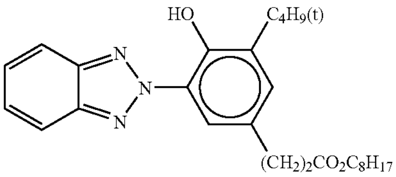
Ultraviolet Absorbent (UV-7):
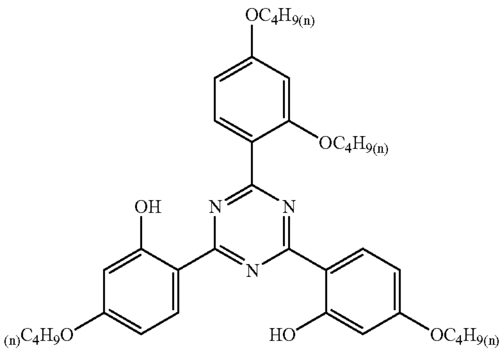

UV-A:

A 4/2/2/3 (by mass) mixture of UV-1/UV-2/UV-3/UV-4

UV-B:

A 9/3/3/4/5/3 (by mass) mixture of UV-1/UV-2/UV-3/UV-4/UV-5/UV-6

UV-C:

A 1/1/1/2 (by mass) mixture of UV-2/UV-3/UV-6/UV-7

(Solv-1)

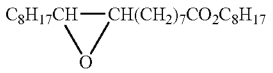

(Solv-2)

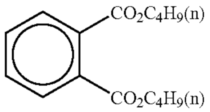

(Solv-3)

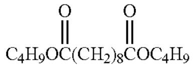

(Solv-4)

$O{=}P(OC_6H_{13}(n))_3$ (Solv-5)

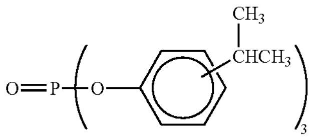

(Solv-7)

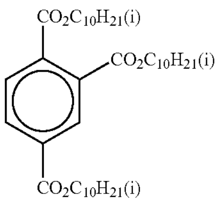

(Solv-8)

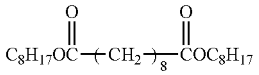

(S1-4)

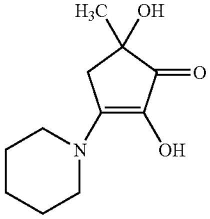

The remaining samples were prepared in the same manner as Sample (101) except for using the compound shown in Table I-10 in place of Emulsion B of Sample (101).

For examining the photographic properties of these samples, the following tests were performed.

Test 1: Sensitometry (Low Illuminance and High Illuminance)

Each coated sample was subjected to gradation exposure for sensitometry using a sensitometer (Model FWH, manufactured by Fuji Photo Film Co., Ltd.). The exposure was performed through fixed SP-2 filter at an exposure amount of 200 lx ·sec (lux·second) with low illumination intensity for 10 seconds.

Also, each coated sample was subjected to gradation exposure for sensitometry using a sensitometer for high illuminance exposure (Model HIE, manufactured by Yamashita Denso). The exposure was performed through fixed SP-2 Filter with high illumination intensity for $10^{-4}$ seconds.

After the exposure, each sample was subjected to Color Development Processing A which is described later.

After the processing, the magenta color density of each sample was measured to determine the 10-second exposure low-illuminance sensitivity and the $10^{-4}$-second exposure high illuminance sensitivity. The sensitivity was prescribed by the reciprocal of an exposure amount necessary for giving a color density 1.5 higher than the minimum color density and the relative value to the sensitivity of Sample (101) which was taken as 100 was used as the relative sensitivity. Furthermore, the gradation was determined from the gradient of a straight line between the sensitivity measured and the sensitivity 1.5.

Test 2: Dependency of Sensitivity on Exposure Humidity

The relative humidity on exposing each sample was set to 55% and 80%. After the 1/10-second exposure above, Processing A was performed and the magenta color density of each sample was measured. The sensitivity was expressed by the reciprocal of an exposure amount necessary for giving a color density 0.5 higher than the minimum color density and the relative value to the sensitivity of Sample (101) which was taken as 100 was used as the relative sensitivity. The difference in sensitivity (hereinafter shown as "dS") was determined by subtracting the relative sensitivity on exposure at a humidity of 80% from the relative sensitivity on exposure at a humidity of 55%.

The results in Tests 1 and 2 are shown together in Table I-10 below.

TABLE I-10

| Sample No. | Name of Emulsion | Gold Sensitizer | Amount Added of Gold of Gold Sensitizer Shown Left | Sensitivity (10 sec) | Sensitivity ($10^{-4}$ sec) | dS (difference in sensitivity due to Rh) | Remarks |
|---|---|---|---|---|---|---|---|
| 101 | B | chloroauric acid | 17 | 100 | 100 | 12 | Comparison |
| 102 | D | Comparative Compound A | " | 107 | 110 | 10 | Comparison |
| 103 | E | 2-1 | " | 106 | 110 | 10 | Invention |
| 104 | F | 2-8 | " | 106 | 110 | 10 | Invention |
| 105 | G | 2-21 | " | 107 | 111 | 10 | Invention |
| 106 | H | 2-31 | " | 107 | 111 | 10 | Invention |

TABLE I-10-continued

| Sample No. | Name of Emulsion | Gold Sensitizer | Amount Added of Gold of Gold Sensitizer Shown Left | Sensitivity (10 sec) | Sensitivity ($10^{-4}$ sec) | dS (difference in sensitivity due to Rh) | Remarks |
|---|---|---|---|---|---|---|---|
| 107 | I | Colloidal Gold Sulfide A | 80 | 110 | 114 | 6 | Comparison |
| 108 | J | Colloidal Gold Sulfide B | 80 | 109 | 113 | 8 | Comparison |
| 109 | K | Colloidal Gold Sulfide S | 80 | 119 | 125 | 3 | Invention |
| 110 | L | Colloidal Gold Sulfide T | 80 | 120 | 123 | 3 | Invention |
| 111 | M | Colloidal Gold Sulfide U | 80 | 118 | 125 | 3 | Invention |
| 112 | N | Colloidal Gold Sulfide V | 80 | 117 | 126 | 3 | Invention |
| 113 | O | Colloidal Gold Sulfide W | 80 | 119 | 124 | 3 | Invention |

Comparative Compound A: Compound No. 1 described in JP-A-4-267249.

From Table I-10, the followings are seen.

When Comparative Compound A or the gold complex of the present invention is used, high sensitivity can be obtained and good results can be attained also in view of toughness against fluctuation in the exposure humidity as compared with the case where chloroauric acid is used. Between Comparative Compound A and the gold complex of the present invention, there is not found any outstanding difference in the photographic properties. As described above in "Background of Invention", Comparative Compound A has a problem in the production thereof and therefore, use of the gold complex of the present invention is valuable.

Colloidal Gold Sulfides A and B were prepared by the method described in *Research Disclosure*, Item 37154, page 227 (1995). Colloidal Gold Sulfide A was prepared by the method using ammonium thiocyanate and Colloidal Gold Sulfide B was prepared by the method using sodium aurous dithiosulfate free from a problem of producing cyanide ion as a by-product.

As described in "Background of Invention", the method used for preparing Colloidal Gold Sulfide A has a problem of producing environmental harmful cyanide ion as a by-product. From Table I-10, this compound is revealed to be a suitable gold sensitizer in view of the photographic properties, however, the colloidal gold sulfide of the present invention is free of a problem of producing cyanide ion as a by-product and as seen from Table I-10, the toughness against fluctuation in sensitivity and exposure humidity is equal to or greater than that of Colloidal Gold Sulfide A.

Colloidal Gold Sulfide B has no problem of producing cyanide ion as a by-product similarly to the colloidal gold sulfide of the present invention, however, when the colloidal gold sulfide of the present invention is used, good results are obtained in view of photographic properties, particularly, toughness against fluctuation in the exposure humidity.

The processing steps are described below.

[Processing A]

Light-Sensitive Material 101 obtained above was worked into a 127 mm-width roll and after imagewise exposure using Mini-Lab Printer Processor PP1258AR manufactured by Fuji Photo Film Co., Ltd., subjected to a continuous processing (running test) through the following processing steps until the replenishing amount of color developer reached 2 times the volume of the color development tank. The processing using the thus-obtained running solution was designated as Processing A.

| Processing Step | Temperature (° C.) | Time (sec) | Replenishing Amount* (ml) |
|---|---|---|---|
| Color development | 38.5 | 45 | 45 |
| Bleach-fixing | 38.0 | 45 | 35 |
| Rinsing (1) | 38.0 | 20 | — |
| Rinsing (2) | 38.0 | 20 | — |
| Rinsing (3)** | 38.0 | 20 | — |
| Rinsing (4)** | 38.0 | 30 | 121 |

*Replenishing amount per 1 $m^2$ of the light-sensitive material.

**Rinse Cleaning System RC50D manufactured by Fuji Photo Film Co., Ltd. was installed to Rinsing (3) and the rinsing solution was taken out from Rinsing (3) and transferred by a pump to a reverse osmosis membrane module (RC50D). The permeated water obtained in the tank was fed to Rinsing (4) and the concentrated water was returned to Rinsing (3). The pump pressure was adjusted such that the amount of water permeated to the reverse osmosis module was kept to 50 to 300 ml/min.The rinsing solution was circulated under control of temperature for 10 hours per day. (The rinsing was performed in a countercurrent system in tanks from (1) to (4).)

Each processing solution had the following composition.

| Color Developer | Tank Solution | Replenisher |
|---|---|---|
| Water | 800 ml | 800 ml |
| Dimethylpolysiloxane-base surfactant (Silicone KF351A, produced by Shin-Etsu Chemical Co., Ltd.) | 0.1 g | 0.1 g |
| Tri (isopropanol) amine | 8.8 g | 8.8 g |
| Ethylenediaminetetraacetic acid | 4.0 g | 4.0 g |
| Polyethylene glycol (molecular weight: 300) | 10.0 g | 10.0 g |
| Sodium 4,5-dihydroxybenzene-1,3-disulfonate | 0.5 g | 0.5 g |
| Potassium chloride | 10.0 g | — |
| Potassium bromide | 0.040 g | 0.010 g |
| Triazinylaminostilbene-base fluorescent brightening agent (Hakkol FWA-SF, produced by Showa Kagaku K.K.) | 2.5 g | 5.0 g |

-continued

| Color Developer | Tank Solution | Replenisher |
|---|---|---|
| Sodium sulfite | 0.1 g | 0.1 g |
| Disodium N,N-bis (sulfonato-ethyl) hydroxylamine | 8.5 g | 11.1 g |
| N-Ethyl-N-(β-methanesulfon-amidoethyl)-3-methyl-4-amino-4-aminoaniline 3/2-sulfate monohydrate | 5.0 g | 15.7 g |
| Potassium carbonate | 26.3 g | 26.3 g |
| Water to make | 1,000 ml | 1,000 ml |
| pH (at 25° C., adjusted by potassium hydroxide and sulfuric acid) | 10.15 | 12.50 |

| Bleach-Fixing Solution | Tank Solution | Replenisher |
|---|---|---|
| Water | 700 ml | 600 ml |
| Ammonium ethylenediamine-tetraacetato ferrate (III) | 47.0 g | 94.0 g |
| Ethylenediaminetetraacetic acid | 1.4 g | 2.8 g |
| m-Carboxybenzenesulfinic acid | 8.3 g | 16.5 g |
| Nitric acid (67%) | 16.5 g | 33.0 g |
| Imidazole | 14.6 g | 29.2 g |
| Ammonium thiosulfate (750 g/liter) | 107.0 ml | 214.0 ml |
| Ammonium sulfite | 16.0 g | 32.0 g |
| Ammonium bisulfite | 23.1 g | 46.2 g |
| Water to make | 1,000 ml | 1,000 ml |
| pH (at 25° C., adjusted by acetic acid and ammonia) | 6.0 | 6.0 |

| Rinsing Solution | Tank Solution | Replenisher |
|---|---|---|
| Chlorinated sodium isocyanurate | 0.02 g | 0.02 g |
| Deionized water (electrical conductivity: 5 μs/cm or less) | 1,000 ml | 1,000 ml |
| PH | 6.5 | 6.5 |

EXAMPLE I-2

Using the emulsions prepared in Example I-1, a sample reduced in the layer thickness was prepared by changing the layer structure as follows from Sample (101). Furthermore, samples where Emulsion B in the third layer was changed to the emulsion shown in Table I-10, obtained in Example I-1 were prepared. These samples were subjected to Tests 1 and 2 of Example I-1.

The layer structure is shown by Sample (201).

The results are the same as the results in Example I-1 and the effect of the present invention is verified also in the ultrahigh speed processing of samples reduced in the layer thickness.

Manufacture of Sample 301

| First Layer (blue-sensitive emulsion layer): | |
|---|---|
| Emulsion A | 0.24 |
| Gelatin | 1.25 |
| Yellow Coupler (ExY) | 0.57 |
| Dye Image Stabilizer (Cpd-1) | 0.07 |

-continued

| First Layer (blue-sensitive emulsion layer): | |
|---|---|
| Dye Image Stabilizer (Cpd-2) | 0.04 |
| Dye Image Stabilizer (Cpd-3) | 0.07 |
| Dye Image Stabilizer (Cpd-8) | 0.02 |
| Solvent (Solv-1) | 0.21 |

Second Layer (Color Mixing Inhibiting Layer):

| | |
|---|---|
| Gelatin | 0.60 |
| Color Mixing Inhibitor (Cpd-19) | 0.09 |
| Dye Image Stabilizer (Cpd-5) | 0.007 |
| Dye Image Stabilizer (Cpd-7) | 0.007 |
| Ultraviolet Absorbent (UV-C) | 0.05 |
| Solvent (Solv-5) | 0.11 |

Third Layer (Green-sensitive Emulsion Layer):

| | |
|---|---|
| Silver Chlorobromide Emulsion B (same emulsion as in Sample 201) | 0.14 |
| Gelatin | 0.73 |
| Magenta Coupler (ExM) | 0.15 |
| Ultraviolet Absorbent (UV-A) | 0.05 |
| Dye Image Stabilizer (Cpd-2) | 0.02 |
| Dye Image Stabilizer (Cpd-7) | 0.008 |
| Dye Image Stabilizer (Cpd-8) | 0.07 |
| Dye Image Stabilizer (Cpd-9) | 0.03 |
| Dye Image Stabilizer (Cpd-10) | 0.009 |
| Dye Image Stabilizer (Cpd-11) | 0.0001 |
| Solvent (Solv-3) | 0.06 |
| Solvent (Solv-4) | 0.11 |
| Solvent (Solv-5) | 0.06 |

Fourth Layer (Color Mixing Inhibiting Layer):

| | |
|---|---|
| Gelatin | 0.48 |
| Color Mixing Inhibitor (Cpd-4) | 0.07 |
| Dye Image Stabilizer (Cpd-5) | 0.006 |
| Dye Image Stabilizer (Cpd-7) | 0.006 |
| Ultraviolet Absorbent (UV-c) | 0.04 |
| Solvent (Solv-5) | 0.09 |

Fifth Layer (Red-sensitive Emulsion Layer):

| | |
|---|---|
| Silver Chlorobromide Emulsion C (same emulsion as in Sample 201) | 0.12 |
| Gelatin | 0.59 |
| Cyan Coupler (ExC-2) | 0.13 |
| Cyan Coupler (ExC-3) | 0.03 |
| Dye Image Stabilizer (Cpd-7) | 0.01 |
| Dye Image Stabilizer (Cpd-9) | 0.04 |
| Dye Image Stabilizer (Cpd-15) | 0.19 |
| Dye Image Stabilizer (Cpd-18) | 0.04 |
| Ultraviolet Absorbent (UV-7) | 0.02 |
| Solvent (Solv-5) | 0.09 |

Sixth Layer (Ultraviolet Absorbing Layer):

| | |
|---|---|
| Gelatin | 0.32 |
| Ultraviolet Absorbent (UV-C) | 0.42 |
| Solvent (Solv-7) | 0.08 |

Seventh Layer (Protective Layer):

| | |
|---|---|
| Gelatin | 0.70 |
| Acryl-modified polymer of polyvinyl alcohol (modification degree: 17%) | 0.04 |
| Liquid paraffin | 0.01 |
| Surfactant (Cpd-13) | 0.01 |
| Polydimethylsiloxane | 0.01 |
| Silicon dioxide | 0.003 |

The manufactured samples each was exposed in the same manner as in Tests 1 and 2 of Example I-1 and subjected to color development. The color development was ultrahigh speed processing according to Development Processing B shown below.

[Processing B]

The light-sensitive material prepared above was worked into a 127 mm-width roll and using a test processing apparatus obtained by modifying Mini-Lab Printer Processor PP350 manufactured by Fuji Photo Film Co., Ltd. so that the processing time and the processing temperature could be changed, the light-sensitive sample was imagewise exposed from a negative film having an average density and then subjected to a continuous processing (running test) through the following processing steps until the amount of replenisher used for color developer reached 0.5 times the volume of the color development tank.

| Processing Step | Temperature (° C.) | Time (sec) | Replenishing Amount* (ml) |
|---|---|---|---|
| Color development | 45.0 | 15 | 45 |
| Bleach-fixing | 40.0 | 15 | 35 |
| Rinsing 1 | 40.0 | 8 | — |
| Rinsing 2 | 40.0 | 8 | — |
| Rinsing 3 | 40.0 | 8 | — |
| Rinsing 4 | 38.0 | 8 | 121 |
| Drying | 80 | 15 | |

(Note)
*Replenishing amount per 1 $m^2$ of the light-sensitive material.
**Rinse Cleaning System RC50D manufactured by Fuji Photo Film Co., Ltd. was installed to Rinsing (3) and the rinsing solution was taken out from Rinsing (3) and transferred by a pump to a reverse osmosis membrane module (RC50D). The permeated water obtained in the tank was fed to Rinsing (4) and the concentrated water was returned to Rinsing (3). The pump pressure was adjusted such that the amount of water permeated to the reverse osmosis module was kept to 50 to 300 ml/min.The rinsing solution was circulated under control of temperature for 10 hours per day. The rinsing was performed in a four tank counter current system from (1) to (4).

Each processing solution had the following composition.

| Color Developer | Tank Solution | Replenisher |
|---|---|---|
| Water | 800 ml | 800 ml |
| Fluorescent brightening agent (FL-1) | 5.0 g | 8.5 g |
| Triisopropanolamine | 8.8 g | 8.8 g |
| Sodium p-toluenesulfonate | 20.0 g | 20.0 g |
| Ethylenediaminetetraacetic acid | 4.0 g | 4.0 g |
| Sodium sulfite | 0.10 g | 0.50 g |
| Potassium chloride | 10.0 g | — |
| Sodium 4,5-dihydroxybenzene-1,3-disulfonate | 0.50 g | 0.50 g |
| Disodium N,N-bis(sulfonato-ethyl)hydroxylamine | 8.5 g | 14.5 g |
| 4-Amino-3-methyl-N-ethyl-N-(β-methanesulfonamidoethyl) aniline 3/2-sulfate monohydrate | 10.0 g | 22.0 g |
| Potassium carbonate | 26.3 g | 26.3 g |
| Water to make in total | 1,000 ml | 1,000 ml |
| pH (at 25° C., adjusted by sulfuric acid and KOH) | 10.35 | 12.6 |

| Bleach-Fixing Solution | Tank Solution | Replenisher |
|---|---|---|
| Water | 800 ml | 800 ml |
| Ammonium thiosulfate (750 g/ml) | 107 ml | 214 ml |
| Succinic acid | 29.5 g | 59.0 g |
| Ammonium ethylenediamine-tetraacetato ferrate (III) | 47.0 g | 94.0 g |
| Ethylenediaminetetraacetic acid | 1.4 g | 2.8 g |
| Nitric acid (67%) | 17.5 g | 35.0 g |
| Imidazole | 14.6 g | 29.2 g |
| Ammonium sulfite | 16.0 g | 32.0 g |
| Potassium metabisulfite | 23.1 g | 46.2 g |
| Water to make in total | 1,000 ml | 1,000 ml |
| pH (at 25° C., adjusted by nitric acid and aqueous ammonia) | 6.00 | 6.00 |

| Rinsing Solution | Tank Solution | Replenisher |
|---|---|---|
| Chlorinated sodium isocyanurate | 0.02 g | 0.02 g |
| Deionized water (electrical conductivity: 5 μS/cm or less) | 1,000 ml | 1,000 ml |
| pH (25° C.) | 6.5 | 6.5 |

FL-1

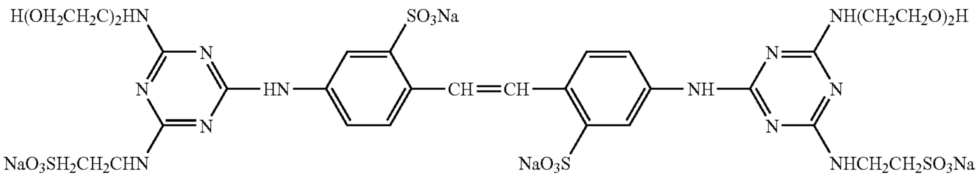

EXAMPLE I-3

Using the samples prepared in Example I-2, image formation was performed by laser scanning exposure.

The laser light sources used were a YAG solid laser (oscillation wavelength: 946 nm) with an excitation light source of semiconductor GaAlAl (oscillation wavelength: 808.5 nm), which was taken out as 473 nm by the wavelength conversion through an SHG crystal of $LiNbO_3$ having an inversion domain structure, a $YVO_4$ solid laser (oscillation wavelength: 1,064 nm) with an excitation light source of semiconductor laser GaAlAs (oscillation wavelength: 808.7 nm), which was taken out as 532 nm by the wavelength conversion through an SHG crystal of $LiNbO_3$ having an inversion domain structure, and AlGaInP (oscillation wavelength: about 680 nm, Type No. LN9R20 manufactured by Matsushita Electric Industrial Co., Ltd.). Respective laser rays of three colors were moved using a polygon mirror in the perpendicular direction to the scanning direction so that the sample could be sequentially scan-exposed. The fluctuation in the intensity of light due to temperature of semiconductor lasers was suppressed by keeping constant the temperature using Peltier element. The effective beam diameter was 80 μm, the scanning pitch was 42.3 μm (600 dpi), and the average exposure time per one picture element was $1.7 \times 10^{-7}$ seconds.

After the exposure, the samples were processed by Color Development Processing B. As a result, the same results as in the high-illuminance exposure of Examples I-1 and I-2 were obtained and it is verified that the present invention is suitable also for the image formation using laser scanning exposure.

The emulsion of the present invention ensures high sensitivity and high contrast, less fluctuates in the sensitivity due to difference in the humidity condition at the exposure and exhibits excellent high-illuminance reciprocity law characteristics.

EXAMPLE II-1

(Preparation of Em-1)

1,200 ml of an aqueous solution containing 1.0 g of low molecular weight gelatin having a molecular weight of 15,000 and 1.0 g of KBr was vigorously stirred while keeping at 35° C. Thereto, 30 ml of an aqueous solution containing 1.9 g of $AgNO_3$ and 30 ml of an aqueous solution containing 1.5 g of KBr and 0.7 g of low molecular weight gelatin having a molecular weight of 15,000 were added by a double jet method over 30 seconds to perform nucleation. At this time, the excess KBr concentration was kept constant. Then, 50 g of KBr was added and the temperature was elevated to 75° C. to perform ripening. After the completion of ripening, 35 g of phthalated gelatin containing 35 μmol/g of methionine and having a molecular weight of 100,000 and a phthalation ratio of 97% was added, the pH was adjusted to 5.6, and thereto 150 ml of an aqueous solution containing 30 g of $AgNO_3$ and an aqueous KBr solution were added by a double jet method over 16 minutes (Growth Step 1). At this time, the silver potential was kept at −20 mV based on the saturated calomel electrode. Thereto, an aqueous solution containing 110 g of $AgNO_3$ and an aqueous KBr solution (15% by mass) containing 3.8 mol % of KI were added by a double jet method over 15 minutes while accelerating the flow rate such that the final flow rate became 1.2 times the initial flow rate (Growth Step 2). At this time, the silver potential was kept at −20 mV. After returning the number of rotation for stirring, 132 ml of an aqueous solution containing 35 g of $AgNO_3$ and an aqueous KBr solution were added by a double jet method over 7 minutes. At this time, the addition of the aqueous KBr solution was controlled such that the electric potential became +20 mV at the completion of addition. Thereto, 2 mg of sodium benzenethiosulfonate was added, KBr was added to adjust the silver potential to −20 mV, and 100 ml of an aqueous solution containing 6.8 g of $AgNO_3$ and 900 ml of an aqueous solution containing 7.1 g of KI were added by a double jet method over 10 minutes. Immediately after the completion of addition, 250 ml of an aqueous solution containing 70 g of $AgNO_3$ and 170 ml of an aqueous solution containing 50 g of KBr were added over 20 minutes. The emulsion obtained was washed with water, then 45 g of gelatin was added thereto, and the pH and the pAg were adjusted at 40° C. to 5.8 and 8.7, respectively.

This emulsion Em-1 was observed at a liquid nitrogen temperature through a transmission-type electron microscope, as a result, dislocation lines were found to be present in a high density at the fringe portion of a grain. Apparently, 20 or more dislocation lines were present per one grain. In Em-1, the grains having an aspect ratio of 8 or more occupied 61%, the average aspect ratio was 9.0, the coefficient of variation in the iodide distribution among grains was 17, and the average iodide content was 4.3 mol %.

(Chemical Sensitization and Spectral Sensitization)

(Preparation of Solid Fine Dispersion of Sensitizing Dye)

Solid fine dispersions of Sensitizing Dyes 1 to 3 were prepared as follows. The preparation conditions are shown in Table II-2. More specifically, after dissolving an inorganic salt in ion exchange water, the sensitizing dye was added and dispersed under the condition of 60° C. using a dissolver blade at 2,000 rpm for 20 minutes, thereby preparing respective solid fine dispersions of Sensitizing Dyes 1 to 3.

TABLE 1

| Sensitizing Dye | Amount of Sensitizing Dye | $NaNO_3/NaSO_4$ | Water | Dispersing Time | Dispersing Temperature |
|---|---|---|---|---|---|
| 1 | 3 parts by weight | 0.8 parts by weight/ 3.2 parts by weight | 43 parts by weight | 20 min. | 60° C. |
| 2 | 4 parts by weight | 0.6 parts by weight/ | 42.8 parts by weight | 20 min. | 60° C. |
| 3 | 0.12 parts by weight | 2.4 parts by weight | | | |

TABLE 1-continued

| Sensitizing Dye | Amount of Sensitizing Dye | $NaNO_3/NaSO_4$ | Water | Dispersing Time | Dispersing Temperature |
|---|---|---|---|---|---|

Sensitizing Dye 1

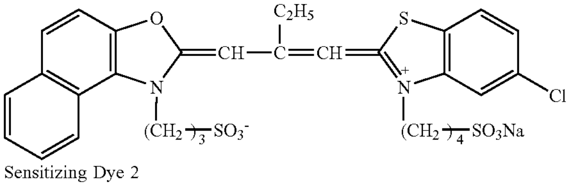

Sensitizing Dye 2

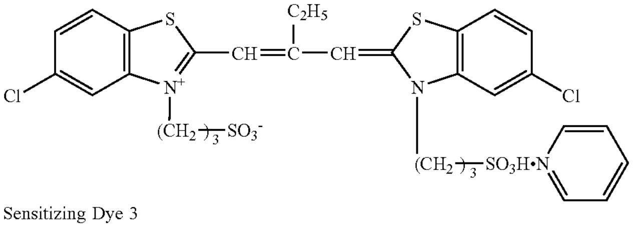

Sensitizing Dye 3

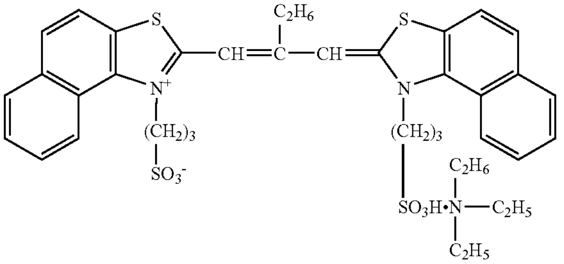

(Preparation of Em-1AR to Em-12AR)

The temperature of Em-1 was elevated to 56° C. and thereto, Sensitizing Dyes 1, 2 and 3 were added at a molar ratio of 58:36:1 and each in the form of solid fine dispersion. Subsequently, calcium nitrate was added in an amount of 1,800 ppm based on the emulsion. Thereafter, the gold compound of the present invention and the sulfur sensitizer shown in Table II-3, and further, potassium thiosulfate ($1.5\times10^{-3}$ mol/mol-Ag), chloroauric acid and N,N-dimethylselenourea were added and ripened to optimally perform the chemical sensitization. At the completion of chemical sensitization, disodium salt of 1-(p-carboxyphenyl)-5-mercaptotetrazole was added. Thus, Em-1AR to Em-12AR were prepared.

TABLE II-3

| Sample No. | Gold Sensitizer (mol/mol-Ag) | Sulfur Sensitizer (mol/mol-Ag) | N,N-Dimethyl-selenourea (mol/mol-Ag) | Fog | Relative Sensitivity | Δfog | Remarks |
|---|---|---|---|---|---|---|---|
| Em-1AR | chloroauric acid ($3 \times 10^{-6}$) | $Na_2S_2O_3$ ($6 \times 10^{-6}$) | ($3 \times 10^{-6}$) | 0.38 | 100 | 0.51 | Comparison |
| Em-2AR | HK-1 ($3 \times 10^{-6}$) | $Na_2S_2O_3$ ($6 \times 10^{-6}$) | ($3 \times 10^{-6}$) | 0.36 | 106 | 0.53 | Comparison |
| Em-3AR | 3 ($1.5 \times 10^{-6}$) | — | ($3 \times 10^{-6}$) | 0.26 | 117 | 0.33 | Invention |
| Em-4AR | 5 ($2.5 \times 10^{-7}$) | — | ($3 \times 10^{-6}$) | 0.25 | 116 | 0.35 | Invention |
| Em-5AR | 16 ($1.5 \times 10^{-6}$) | — | — | 0.27 | 112 | 0.35 | Invention |
| Em-6AR | 18 ($2.5 \times 10^{-7}$) | $Na_2S_2O_3$ ($6 \times 10^{-6}$) | — | 0.28 | 110 | 0.36 | Invention |
| Em-7AR | 34 ($7.5 \times 10^{-7}$) | $Na_2S_2O_3$ ($6 \times 10^{-6}$) | — | 0.30 | 110 | 0.37 | Invention |
| Em-8AR | 3 ($1.5 \times 10^{-6}$) | $Na_2S_2O_3$ ($6 \times 10^{-6}$) | — | 0.28 | 117 | 0.34 | Invention |
| Em-9AR | 5 ($2.5 \times 10^{-7}$) | $Na_2S_2O_3$ ($6 \times 10^{-6}$) | — | 0.27 | 117 | 0.36 | Invention |
| Em-10AR | 16 ($1.5 \times 10^{-6}$) | $Na_2S_2O_3$ ($6 \times 10^{-6}$) | ($3 \times 10^{-6}$) | 0.28 | 115 | 0.36 | Invention |
| Em-11AR | 18 ($2.5 \times 10^{-7}$) | $Na_2S_2O_3$ ($6 \times 10^{-6}$) | ($3 \times 10^{-6}$) | 0.29 | 116 | 0.36 | Invention |
| Em-12AR | 34 ($7.5 \times 10^{-7}$) | $Na_2S_2O_3$ ($6 \times 10^{-6}$) | ($3 \times 10^{-6}$) | 0.30 | 114 | 0.38 | Invention |

Comparative Compound (HK-1)

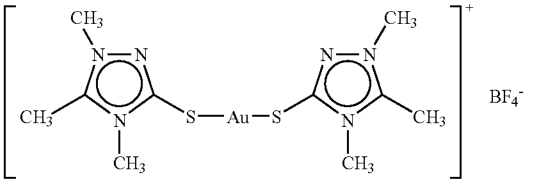

On a cellulose triacetate film support having provided thereon an undercoat layer, each of the emulsions subjected to chemical sensitization as above was coated with a protective layer under the coating conditions shown in Table II-4 below to prepare samples.

TABLE II-4

| Emulsion Coating Conditions | |
|---|---|
| (1) Emulsion Layer | |
| Emulsion: | |
| respective emulsions (as silver $2.1 \times 10^{-2}$ mol/$m^2$) | |
| Coupler ($1.5 \times 10^{-3}$ mol/$m^2$): | |
| 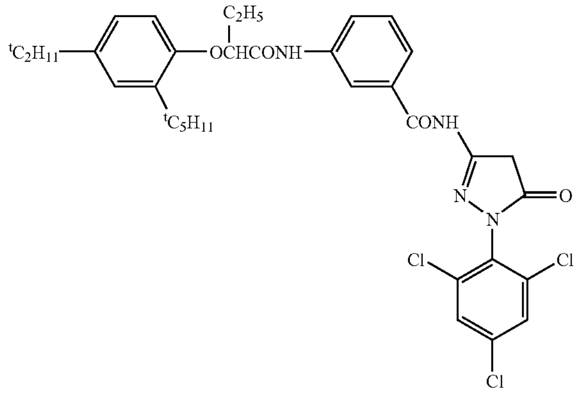 | |
| 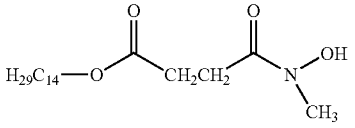 | ($1.1 \times 10^{-4}$ mol/$m^2$) |
| Tricresyl phosphate | (1.10 g/$m^2$) |
| Gelatin | (2.30 g/$m^2$) |
| (2) Protective Layer | |
| 2,4-Dichloro-6-hydroxy-s-triazine sodium salt | (0.08 g/$m^2$) |
| Gelatin | (1.80 g/$m^2$) |

The thus-obtained samples were left standing under the conditions of 40° C. and a relative humidity of 70% for 14 hours and then exposed for 1/100 seconds through gelatin filter SC-50 produced by Fuji Photo Film Co., Ltd. and a continuous wedge.

Thereafter, each sample was processed by the method described below (until the accumulative replenishing amount of the solution reached 3 times the mother solution tank volume) using negative processor FP-350 manufactured by Fuji Photo Film Co., Ltd.

(Processing Method)

| Step | Processing Time | Processing Temperature (° C.) | Replenishing Amount (ml) |
|---|---|---|---|
| Color development | 3 min 15 sec | 38 | 45 |
| Bleaching | 1 min 00 sec | 38 | 20 The overflow of bleaching solution was all introduced into the bleach-fixing tank. |
| Bleach-fixing | 3 min 15 sec | 38 | 30 |
| Water washing (1) | 40 sec | 35 | countercurrent piping system from (2) to (1) |
| Water washing (2) | 1 min 00 sec | 35 | 30 |
| Stabilization | 40 sec | 38 | 20 |
| Drying | 1 min 15 sec | 55 | |

*Replenishing amount was per 1.1 m of a 35 mm-width light-sensitive material (corresponding to 1 roll of 24 Ex.).

The composition of each processing solution is shown below.

(Color Developer)

| | Tank Solution (g) | Replenisher (g) |
|---|---|---|
| Diethylenetriaminepentaacetic acid | 1.0 | 1.1 |
| 1-Hydroxyethylidene-1,1-diphosphonic acid | 2.0 | 2.0 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-Ethyl-N-(β-hydroxyethyl)-amino]-2-methylaniline sulfate | 4.5 | 5.5 |
| Water to make | 1.0 liter | 1.0 liter |
| pH (adjusted by potassium hydroxide and sulfuric acid) | 10.05 | 10.10 |

(Bleaching Solution)

The tank solution and the replenisher were common.

| | (unit: g) |
|---|---|
| Ammonium ethylenediaminetetraacetato ferrate dihydrate | 20.0 |
| Ethylenediaminetetraacetate disodium salt | 10.0 |
| Ammonium bromide | 100.0 |
| Ammonium nitrate | 10.0 |
| Bleaching accelerator $(CH_3)_2N—CH_2—CH_2—S—S—CH_2—CH_2—N(CH_3)_2.2HCl$ | 0.005 mol |
| Aqueous ammonia (27%) | 15.0 ml |
| Water to make | 1.0 liter |
| pH (adjusted by aqueous ammonia and nitric acid) | 6.3 |

(Bleach-Fixing Solution)

| | Tank Solution (g) | Replenisher (g) |
|---|---|---|
| Ammonium ethylenediamine-tetraacetato ferrate dihydrate | 50.0 | — |
| Ethylenediaminetetraacetate disodium salt | 5.0 | 2.0 |
| Sodium sulfite | 12.0 | 20.0 |
| Aqueous solution of ammonium thiosulfate (700 g/liter) | 240.0 ml | 400.0 ml |
| Aqueous ammonia (27%) | 6.0 ml | — |
| Water to make | 1.0 liter | 1.0 liter |
| pH (adjusted by aqueous ammonia and acetic acid) | 7.2 | 7.3 |

(Washing Water)

The tank solution and the replenisher were common.

Tap water was passed through a mixed bed column filled with an H-type strongly acidic cation exchange resin (Amberlite IR-120B, produced by Rhom and Haas) and an OH-type anion exchange resin (Amberlite IR-400, produced by the same company) to reduce the calcium and magnesium ion concentrations each to 3 mg/liter or less and then thereto 20 mg/liter of sodium isocyanurate dichloride and 0.15 g/liter of sodium sulfate were added. The resulting solution had a pH of from 6.5 to 7.5.

(Stabilizing Solution)

The tank solution and the replenisher were common.

| | (unit: g) |
|---|---|
| Sodium p-toluenesulfinate | 0.03 |
| Polyoxyethylene-p-monononylphenyl ether (average polymerization degree: 10) | 0.2 |
| Disodium ethylenediaminetetraacetate | 0.05 |
| 1,2,4-Triazole | 1.3 |
| 1,4-Bis(1,2,4-triazol-1-ylmethyl)-piperazine | 0.75 |
| Water to make | 1.0 liter |
| PH | 8.5 |

The processed samples each was measured on the density using a green filter. The sensitivity was shown by a relative value of the reciprocal of the exposure amount necessary for giving a density of (fog density+0.2).

For evaluating the storability, the following test was performed.

An unexposed sample was stored at 50° C. and a relative humidity of 60% for 2 weeks. This sample and the same sample but stored at 5° C. for 2 weeks were exposed for sensitometry at a color temperature of 4,800° K. through a continuous wedge for 1/100 seconds, then subjected to the above-described color development processing, and subsequently measured on the density. The difference (Δfog) between the fog value of the sample stored at 50° C. and the fog value of the sample stored at 5° C. was determined. A larger plus value reveals a higher density.

The results are shown together in Table II-3.

Respective samples were prepared and tested as above by controlling the samples to have the same gold atom content.

As apparently seen from Table II-3, when the compound represented by formula (3) of the present invention is used, higher sensitivity and lower fogging than in the case of using chloroauric acid are liable to result and surprisingly, the increase of fog during the storage is remarkably reduced. Furthermore, when the compound represented by formula (3) of the present invention and a chalcogen sensitizer, particularly a labile selenium compound are used together, the sensitivity is elevated while keeping the fogging on the same level.

In comparison with the present invention, when Compound HK-1 described in JP-A-4-267249 was used, the increase of fog during storage could not be prevented.

EXAMPLE II-2

Layers each having the following composition were coated one on another on an undercoated cellulose triacetate cellulose film support to manufacture multi-layer color light-sensitive material Sample 101.

(Composition of Light-Sensitive Layer)

Main materials used for each layer are classified as follows.

ExC: cyan coupler
ExM: magenta coupler
ExY: yellow coupler
ExS: sensitizing dye
UV: ultraviolet absorbent
HBS: high boiling point organic solvent
H: gelatin hardener
ExF: dye The numerals corresponding to respective components show coated amounts expressed by the unit of $g/m^2$. In the case of silver halide, a coated amount calculated in terms of silver is shown. Furthermore, the coated amount of sensitizing dye is shown by mol per mol of silver halide in the same layer.

(Sample 101)

| | | |
|---|---|---|
| First Layer (first antihalation layer) | | |
| Black Colloidal Silver | as silver | 0.155 |
| Silver Iodobromide Emulsion P | as silver | 0.01 |
| Gelatin | | 0.87 |
| ExC-1 | | 0.002 |
| ExC-3 | | 0.002 |
| Cpd-2 | | 0.001 |
| HBS-1 | | 0.004 |
| HBS-2 | | 0.002 |
| Second Layer (second antihalation layer) | | |
| Black Colloidal Silver | as silver | 0.066 |
| Gelatin | | 0.407 |
| ExM-1 | | 0.050 |
| ExF-1 | | $2.0 \times 10^{-3}$ |
| HBS-1 | | 0.074 |
| Solid Disperse Dye ExF-2 | | 0.015 |
| Solid Disperse Dye ExF-3 | | 0.020 |
| Third Layer (interlayer) | | |
| Silver Iodobromide Emulsion O | as silver | 0.020 |
| ExC-2 | | 0.022 |
| Polyethyl acrylate latex | | 0.085 |
| Gelatin | | 0.294 |
| Fourth Layer (low-speed red-sensitive emulsion layer) | | |
| Silver Iodobromide Emulsion A | as silver | 0.323 |
| ExS-1 | | $5.5 \times 10^{-4}$ |
| ExS-2 | | $1.0 \times 10^{-5}$ |
| ExS-3 | | $2.4 \times 10^{-4}$ |

-continued

| | | |
|---|---|---|
| ExC-1 | | 0.109 |
| ExC-3 | | 0.044 |
| ExC-4 | | 0.072 |
| ExC-5 | | 0.011 |
| ExC-6 | | 0.003 |
| Cpd-2 | | 0.025 |
| Cpd-4 | | 0.025 |
| HBS-1 | | 0.17 |
| Gelatin | | 0.80 |
| Fifth Layer (medium-speed red-sensitive emulsion layer) | | |
| Silver Iodobromide Emulsion B | as silver | 0.28 |
| Silver Iodobromide Emulsion C | as silver | 0.54 |
| ExS-1 | | $5.0 \times 10^{-4}$ |
| ExS-2 | | $1.0 \times 10^{-5}$ |
| ExS-3 | | $2.0 \times 10^{-4}$ |
| ExC-1 | | 0.14 |
| ExC-2 | | 0.026 |
| ExC-3 | | 0.020 |
| ExC-4 | | 0.12 |
| ExC-5 | | 0.016 |
| ExC-6 | | 0.007 |
| Cpd-2 | | 0.036 |
| Cpd-4 | | 0.028 |
| HBS-1 | | 0.16 |
| Gelatin | | 1.18 |
| Sixth Layer (high-speed red-sensitive emulsion layer) | | |
| Silver Iodobromide Emulsion D | as silver | 1.47 |
| ExS-1 | | $3.7 \times 10^{-4}$ |
| ExS-2 | | $1 \times 10^{-5}$ |
| ExS-3 | | $1.8 \times 10^{-4}$ |
| ExC-1 | | 0.18 |
| ExC-3 | | 0.07 |
| ExC-6 | | 0.029 |
| ExC-7 | | 0.010 |
| ExY-5 | | 0.008 |
| Cpd-2 | | 0.046 |
| Cpd-4 | | 0.077 |
| HBS-1 | | 0.25 |
| HBS-2 | | 0.12 |
| Gelatin | | 2.12 |
| Seventh Layer (interlayer) | | |
| Cpd-1 | | 0.089 |
| Solid Disperse Dye ExF-4 | | 0.030 |
| HBS-1 | | 0.050 |
| Polyethyl acrylate latex | | 0.83 |
| Gelatin | | 0.84 |
| Eighth Layer (layer for imparting interlayer effect to red-sensitive layer): | | |
| Silver Iodobromide Emulsion E | as silver | 0.560 |
| ExS-6 | | $1.7 \times 10^{-4}$ |
| ExS-10 | | $4.6 \times 10^{-4}$ |
| Cpd-4 | | 0.030 |
| ExM-2 | | 0.096 |
| ExM-3 | | 0.028 |
| ExY-1 | | 0.031 |
| HBS-1 | | 0.085 |
| HBS-3 | | 0.003 |
| Gelatin | | 0.58 |
| Ninth Layer (low-speed green-sensitive emulsion layer): | | |
| Silver Iodobromide Emulsion F | as silver | 0.39 |
| Silver Iodobromide Emulsion G | as silver | 0.28 |
| Silver Iodobromide Emulsion H | as silver | 0.35 |
| ExS-4 | | $2.4 \times 10^{-5}$ |
| ExS-5 | | $1.0 \times 10^{-4}$ |
| ExS-6 | | $3.9 \times 10^{-4}$ |
| ExS-7 | | $7.7 \times 10^{-5}$ |
| ExS-8 | | $3.3 \times 10^{-4}$ |
| ExM-2 | | 0.36 |
| ExM-3 | | 0.045 |
| HBS-1 | | 0.28 |
| HBS-3 | | 0.01 |

-continued

| | | |
|---|---|---|
| HBS-4 | | 0.27 |
| Gelatin | | 1.39 |
| Tenth Layer (medium-speed green-sensitive emulsion layer): | | |
| Silver Iodobromide Emulsion I | as silver | 0.45 |
| ExS-4 | | $5.3 \times 10^{-5}$ |
| ExS-7 | | $1.5 \times 10^{-4}$ |
| ExS-8 | | $6.3 \times 10^{-4}$ |
| ExC-6 | | 0.009 |
| ExM-2 | | 0.031 |
| ExM-3 | | 0.029 |
| ExY-1 | | 0.006 |
| ExM-4 | | 0.028 |
| HBS-1 | | 0.064 |
| HBS-3 | | $2.1 \times 10^{-3}$ |
| Gelatin | | 0.44 |
| Eleventh Layer (high-speed green-sensitive layer): | | |
| Silver Iodobromide Emulsion I | as silver | 0.19 |
| Silver Iodobromide Emulsion J | as silver | 0.80 |
| ExS-4 | | $4.1 \times 10^{-5}$ |
| ExS-7 | | $1.1 \times 10^{-4}$ |
| ExS-8 | | $4.9 \times 10^{-4}$ |
| ExC-6 | | 0.004 |
| ExM-1 | | 0.016 |
| ExM-3 | | 0.036 |
| ExM-4 | | 0.020 |
| ExM-5 | | 0.004 |
| ExY-5 | | 0.003 |
| ExM-2 | | 0.013 |
| Cpd-3 | | 0.004 |
| Cpd-4 | | 0.007 |
| HBS-1 | | 0.18 |
| Polyethyl acrylate latex | | 0.099 |
| Gelatin | | 1.11 |
| Twelfth Layer (yellow filter layer) | | |
| Yellow colloidal silver | as silver | 0.047 |
| Cpd-1 | | 0.16 |
| Solid Disperse Dye ExF-5 | | 0.020 |
| Solid Disperse Dye ExF-6 | | 0.020 |
| Oil-Soluble Dye ExF-7 | | 0.010 |
| HBS-1 | | 0.082 |
| Gelatin | | 1.057 |
| Thirteenth Layer (low-speed blue-sensitive emulsion layer): | | |
| Silver Iodobromide Emulsion K | as silver | 0.18 |
| Silver Iodobromide Emulsion L | as silver | 0.20 |
| Silver Iodobromide Emulsion M | as silver | 0.07 |
| ExS-9 | | $4.4 \times 10^{-4}$ |
| ExS-10 | | $4.0 \times 10^{-4}$ |
| ExC-1 | | 0.041 |
| ExC-8 | | 0.012 |
| ExY-1 | | 0.035 |
| ExY-2 | | 0.71 |
| ExY-3 | | 0.10 |
| ExY-4 | | 0.005 |
| Cpd-2 | | 0.10 |
| Cpd-3 | | $4.0 \times 10^{-3}$ |
| HBS-1 | | 0.24 |
| Gelatin | | 1.41 |
| Fourteenth Layer (high-speed blue-sensitive emulsion layer): | | |
| Silver Iodobromide Emulsion N | as silver | 0.75 |
| ExS-9 | | $3.6 \times 10^{-4}$ |
| ExC-1 | | 0.013 |
| ExY-2 | | 0.31 |
| ExY-3 | | 0.05 |
| ExY-6 | | 0.062 |
| Cpd-2 | | 0.075 |
| Cpd-3 | | $1.0 \times 10^{-3}$ |
| HBS-1 | | 0.10 |
| Gelatin | | 0.91 |

-continued

| Fifteenth Layer (first protective layer) | | |
|---|---|---|
| Silver Iodobromide Emulsion O | as silver | 0.30 |
| UV-1 | | 0.21 |
| UV-2 | | 0.13 |
| UV-3 | | 0.20 |
| UV-4 | | 0.025 |
| F-18 | | 0.009 |
| HBS-1 | | 0.12 |
| HBS-4 | | $5.0 \times 10^{-2}$ |
| Gelatin | | 2.3 |
| Sixteenth Layer (second protective layer) | | |
| H-1 | | 0.40 |

-continued

| | |
|---|---|
| B-1 (Diameter: 1.7 μm) | $5.0 \times 10^{-2}$ |
| B-2 (Diameter: 1.7 μm) | 0.15 |
| B-3 | 0.05 |
| S-1 | 0.20 |
| Gelatin | 0.75 |

Furthermore, in each layer, W-1 to W-5, B-4 to B-6, F-1 to F-18, iron salt, lead salt, gold salt, platinum salt, palladium salt, iridium salt, ruthenium salt and rhodium salt were appropriately added so as to improve storability, processability, pressure resistance, antifungal/micro-bicidal property, antistatic property and coatability. Also, in the preparation of the samples, calcium in the form of an aqueous calcium nitrate solution was added to the coating solution for the eighth layer in an amount of $8.5\times10^{-3}$ g per mol of silver halide and to the coating solution for the eleventh layer in an amount of $7.9\times10^{-3}$ g per mol of silver halide.

The AgI content, the grain size, the surface iodide content and the like of the emulsions shown above using abbreviations are shown in Table II-5 below. The surface iodide content can be measured by XPS as follows. A sample is cooled to −115° C. in vacuum of 1×10 torr and MgKa as a probe X ray is irradiated at an X-ray source voltage of 8 kV and an X-ray current of 20 mA. The measurement is performed for Ag3d5/2, Br3d and I3d5/2 electrons and the integrated intensity of peaks measured is corrected by the sensitivity factor. From the intensity ratio obtained, the surface iodide content is determined.

TABLE II-5

| Name of Emulsion | Average Iodide Content (mol %) | Coefficient of Variation in Iodide Distribution Among Grains | Average Grain Size (equivalent-sphere diameter: μm) | Coefficient of Variation in Equivalent-Sphere Diameter (%) | Projected Area Diameter (equivalent-circle diameter: μm) | Diameter/Thickness Ratio | Surface Iodide Content (mol %) | Shape of Grain |
|---|---|---|---|---|---|---|---|---|
| A | 3.9 | 20 | 0.37 | 19 | 0.40 | 2.7 | 2.3 | tabular grain |
| B | 5.1 | 17 | 0.52 | 21 | 0.67 | 5.2 | 3.5 | tabular grain |
| C | 7.0 | 18 | 0.86 | 22 | 1.27 | 5.9 | 5.2 | tabular grain |
| D | 4.2 | 17 | 1.00 | 18 | 1.53 | 6.5 | 2.8 | tabular grain |
| E | 7.2 | 22 | 0.87 | 22 | 1.27 | 5.7 | 5.3 | tabular grain |
| F | 2.6 | 18 | 0.28 | 19 | 0.28 | 1.3 | 1.7 | tabular grain |
| G | 4.0 | 17 | 0.43 | 19 | 0.58 | 3.3 | 2.3 | tabular grain |
| H | 5.3 | 18 | 0.52 | 17 | 0.79 | 6.5 | 4.7 | tabular grain |
| I | 5.5 | 16 | 0.73 | 15 | 1.03 | 5.5 | 3.1 | tabular grain |
| J | 7.2 | 19 | 0.93 | 18 | 1.45 | 5.5 | 5.4 | tabular grain |
| K | 1.7 | 18 | 0.40 | 16 | 0.52 | 6.0 | 2.1 | tabular grain |
| L | 8.7 | 22 | 0.64 | 18 | 0.86 | 6.3 | 5.8 | tabular grain |
| M | 7.0 | 20 | 0.51 | 19 | 0.82 | 5.0 | 4.9 | tabular grain |
| N | 6.5 | 22 | 1.07 | 24 | 1.52 | 7.3 | 3.2 | tabular grain |
| O | 1.0 | — | 0.07 | — | 0.07 | 1.0 | — | uniform structure |
| P | 0.9 | — | 0.07 | — | 0.07 | 1.0 | — | uniform structure |

In Table II-5, (1) Emulsions L to O were subjected to reduction sensitization using thiourea dioxide and thiosulfonic acid at the preparation of grains according to Example of JP-A-2-191938, (2) Emulsions A to O were subjected to gold sensitization, sulfur sensitization and selenium sensitization in the presence of sodium thiocyanate and spectral sensitizing dyes described in respective light-sensitive layers according to Example of JP-A-3-237450, (3) a low molecular weight gelatin was used in the preparation of tabular grains, according to Example of JP-A-1-158426, and (4) dislocation lines as described in JP-A-3-237450 were observed on tabular grains through a high-pressure electron microscope.

Preparation of Dispersion of Organic Solid Disperse Dye:

ExF-2 was dispersed by the following method. That is, 21.7 ml of water, 3 ml of a 5% aqueous solution of sodium p-octylphenoxyethoxyethoxyethanesulfonate and 0.5 g of a 5% aqueous solution of p-octylphenoxypolyoxyethylene ether (polymerization degree: 10) were placed in a 700-ml pot mill and thereto 5.0 g of Dye ExF-2 and 500 ml of zirconium oxide beads (diameter: 1 mm) were added. The contents were dispersed for 2 hours using a BO-Type vibration ball mill manufactured by Chuo Koki K. K. After the dispersion, the contents were taken out and added to 8 g of a 12.5% aqueous gelatin solution and thereafter, beads were removed by filtration to obtain a gelatin dispersion of the dye. The obtained fine dye particles had an average particle diameter of 0.44 μm.

Solid dispersions of ExF-3, ExF-4 and ExF-6 were obtained in the same manner and the obtained fine dye particles had an average particle diameter of 0.24 μm. 0.45 μm, and 0.52 μm, respectively. ExF-5 was dispersed by the microprecipitation dispersing method described in Example 1 of EP-A-549489. The average particle diameter was 0.06 μm.

The compounds used for forming each layer are shown below.

ExC-1

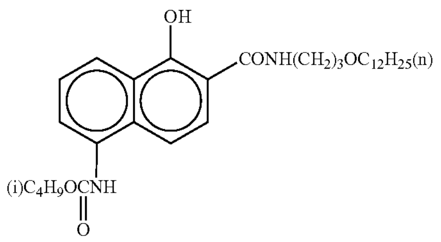

ExC-2

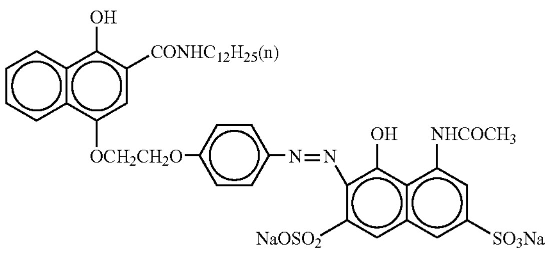

ExC-3

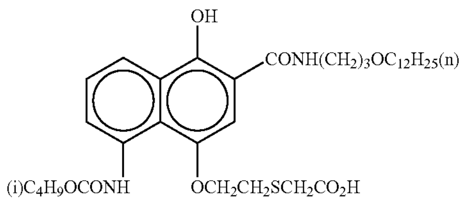

ExC-4

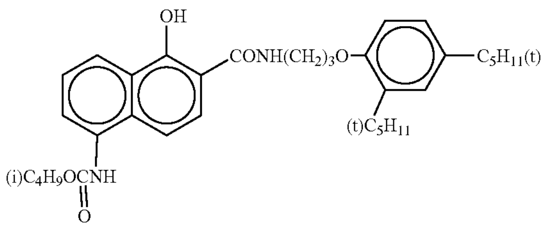

ExC-5

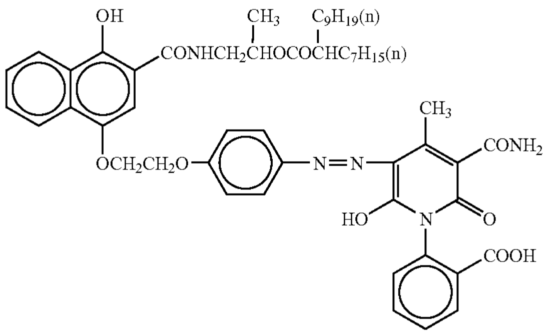

ExC-6

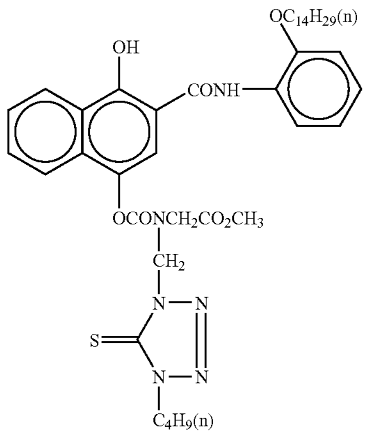

-continued
ExC-7
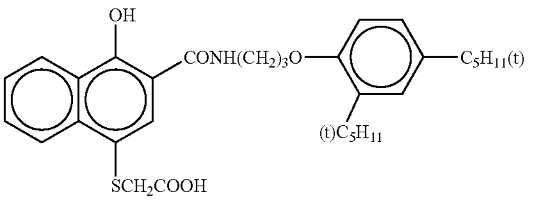
ExC-8
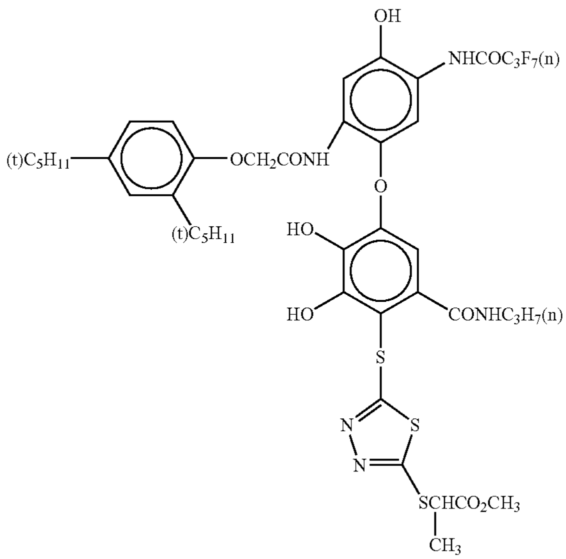
ExM-1
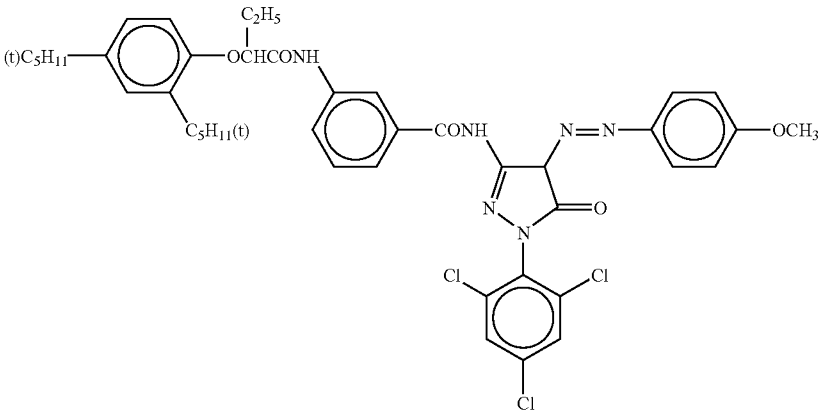
ExM-2
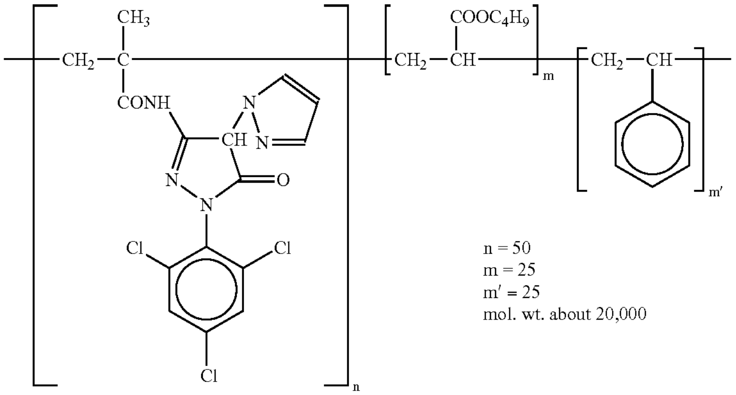
n = 50
m = 25
m' = 25
mol. wt. about 20,000

-continued
ExM-3
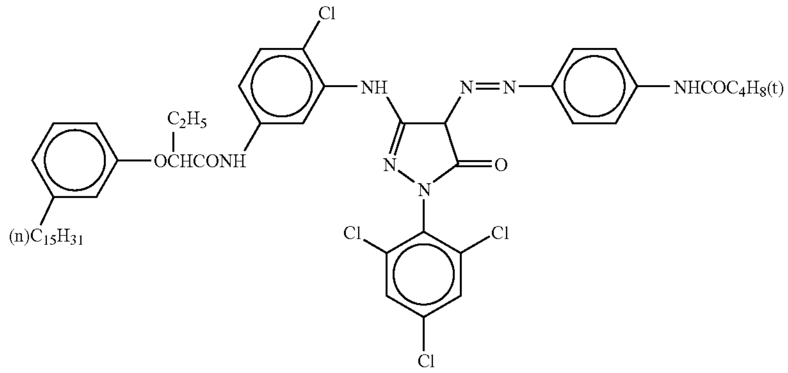
ExM-4
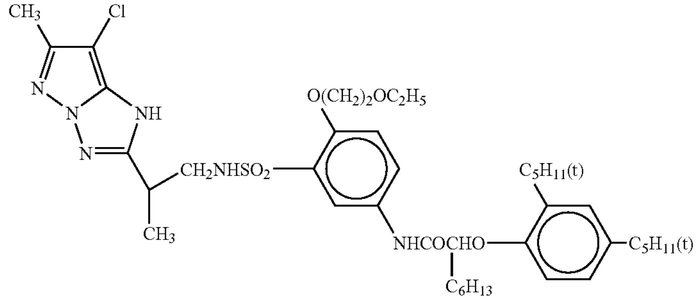
ExM-5
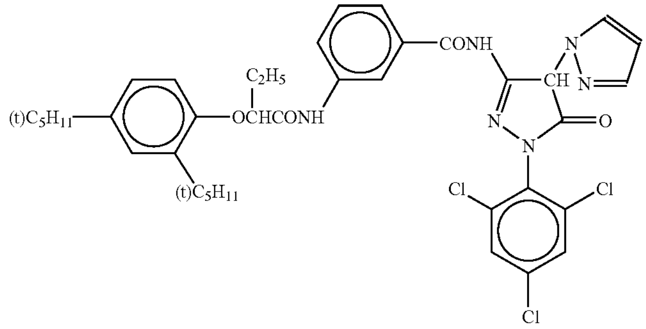
ExY-1
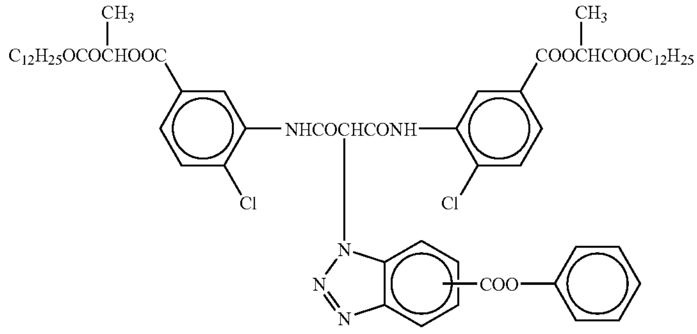

-continued
ExY-2
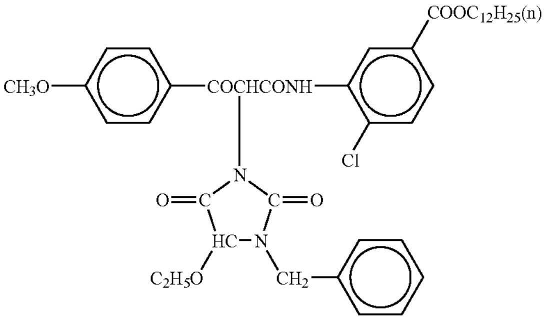
ExY-3
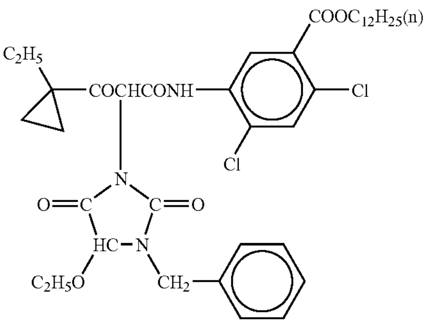
ExY-4
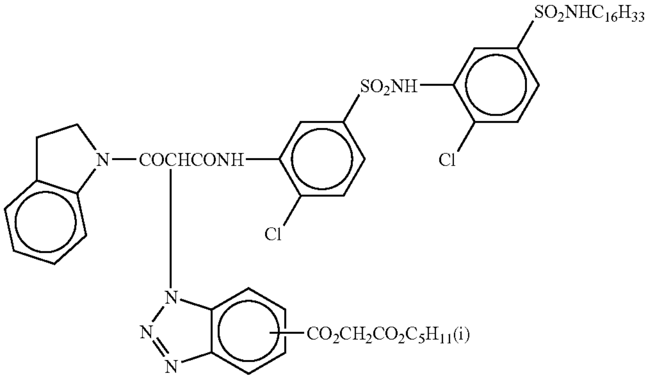
ExY-5
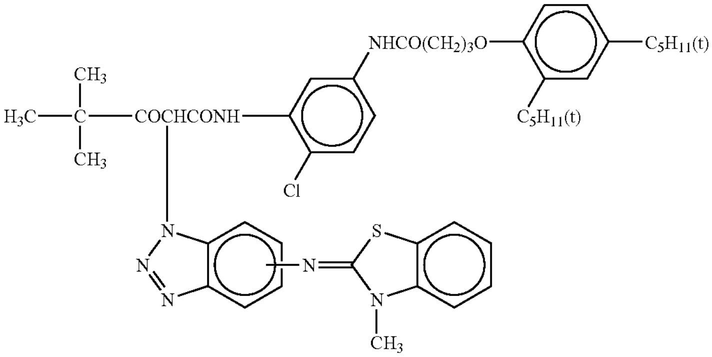
ExY-6
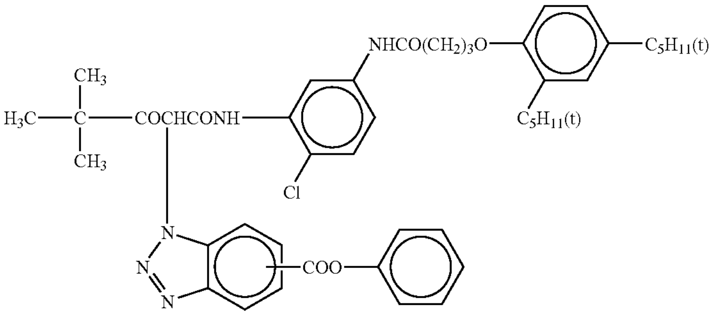

-continued
ExF-1
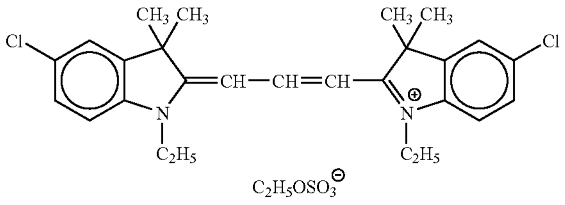
ExF-2
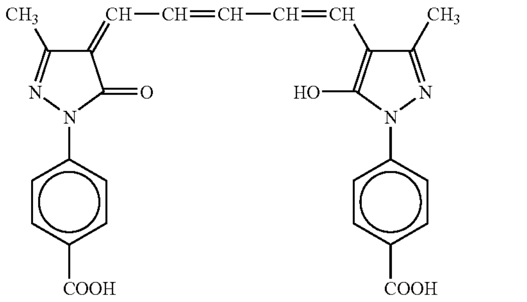
ExF-3
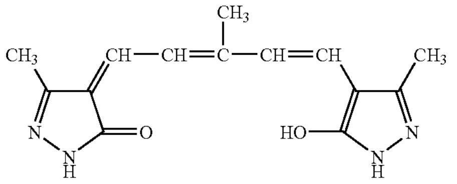
ExF-4
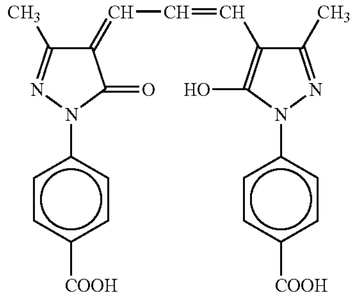
ExF-5
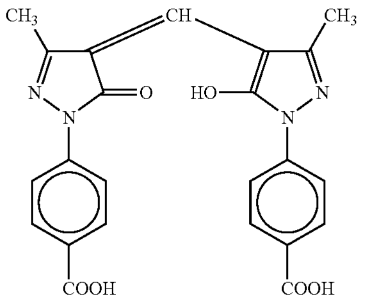
ExF-6
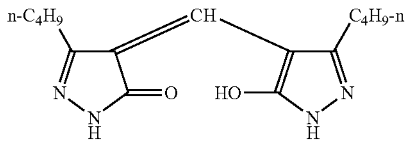
ExF-7
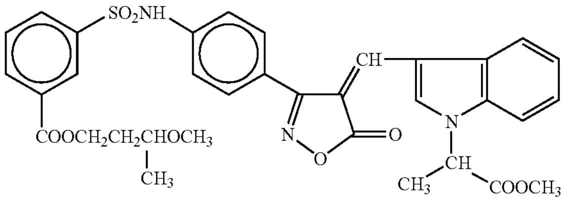
Cpd-3
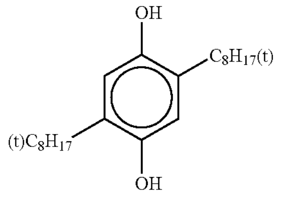
Cpd-4
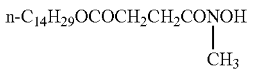
UV-1
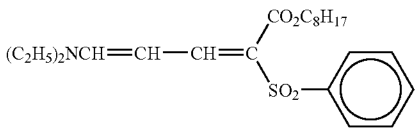
UV-2
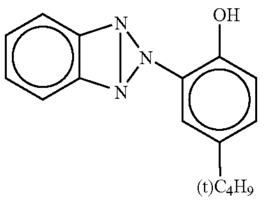
UV-3
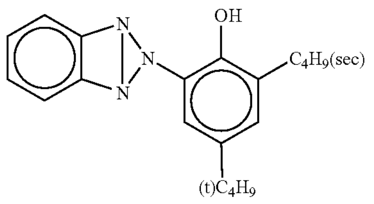

-continued
UV-4
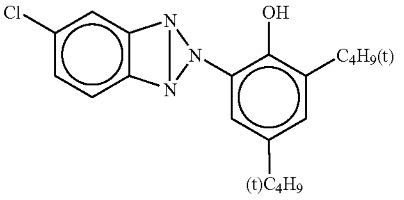
Cpd-1
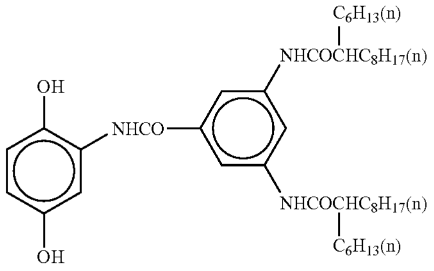
Cpd-2
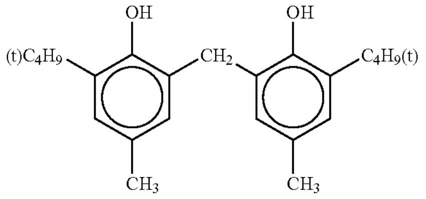
HBS-1
Tricresyl phosphate
HBS-2
Di-n-Butyl phthalate
HBS-3
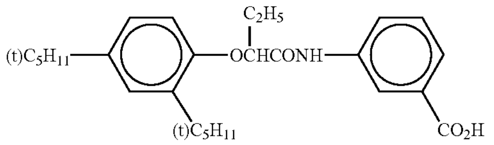
HBS-4
Tri (2-ethylhexyl) phosphate
ExS-1
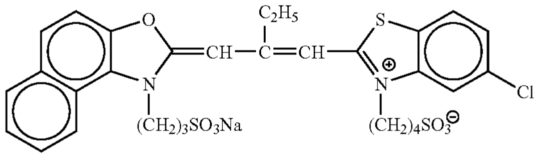
ExS-2
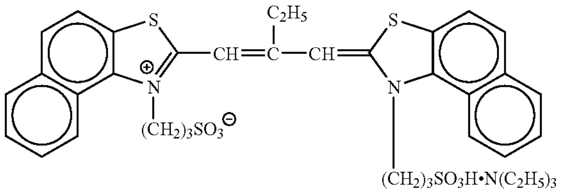
ExS-3
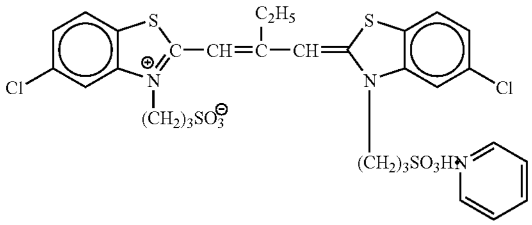
ExS-4
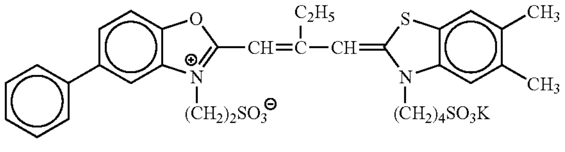
ExS-5
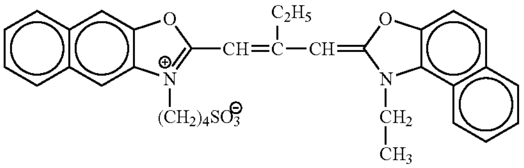
ExS-6
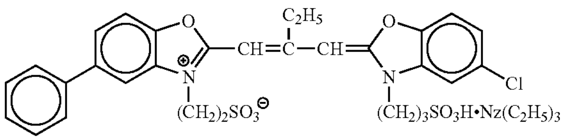
ExS-7
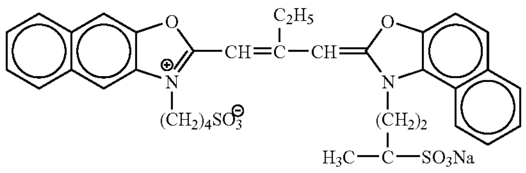

-continued
ExS-8
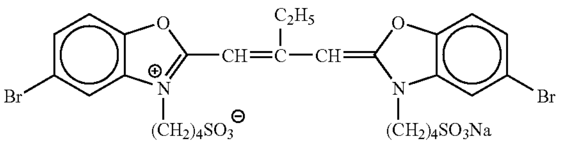
ExS-9
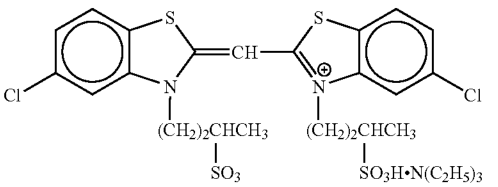
ExS-10
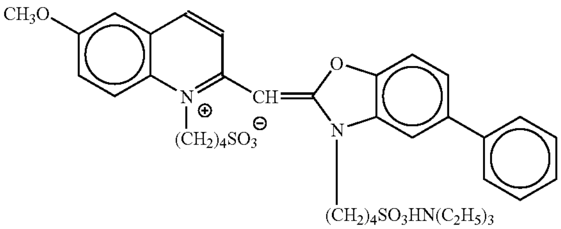
S-1
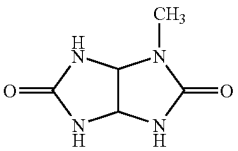
H-1
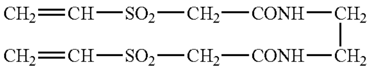
B-1
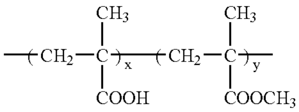
x/y = 10/90 (by weight)
average molecular weight:
about 35,000
B-2
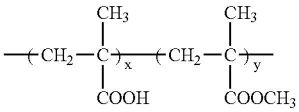
x/y = 40/60 (by weight)
average molecular weight:
about 20,000
B-3
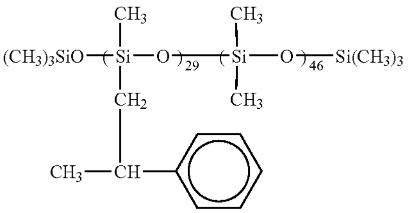
average molecular weight:
about 8,000
B-4
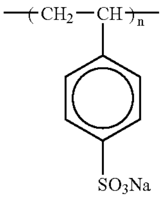
average molecular weight:
about 750,000
B-5
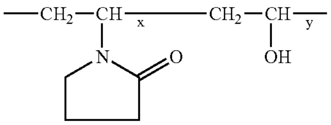
x/y =70/30 (by weight)
average molecular weight:
about 17,000
B-6
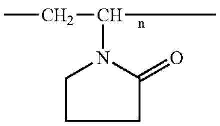
average molecular weight:
about 10,000
W-1
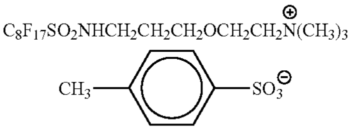
W-2
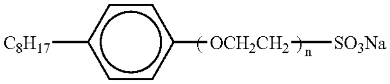
n = 2 ~ 4
W-3
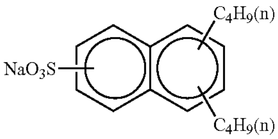

-continued
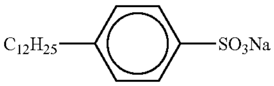
W-4
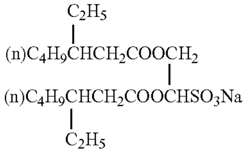
W-5
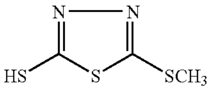
F-1
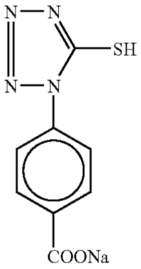
F-2
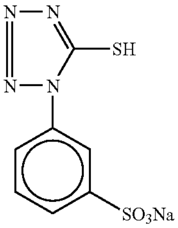
F-3
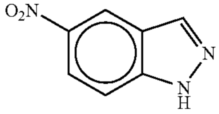
F-4
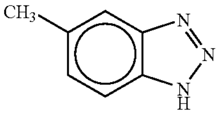
F-5
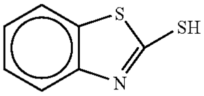
F-6
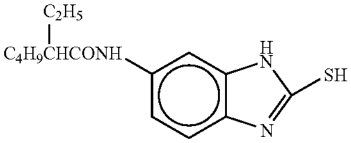
F-7
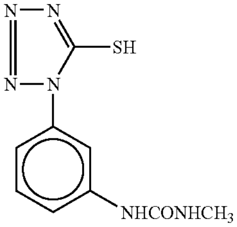
F-8
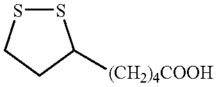
F-9
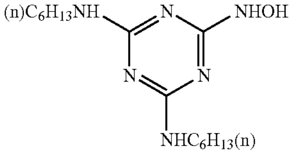
F-10
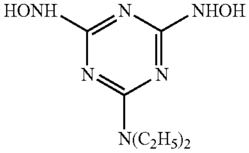
F-11
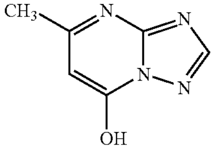
F-12
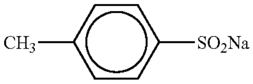
F-13
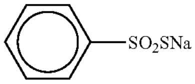
F-14

-continued

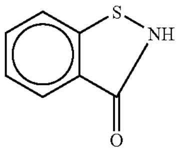

F-15

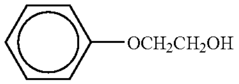

F-16

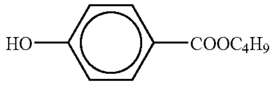

F-17

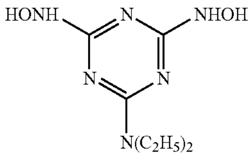

F-18

(Preparation of Samples 102 to 105)

Samples 102, 103, 104 and 105 were prepared using Em-1AR, Em-2AR, Em-3AR and Em-4AR, respectively, prepared in Example II-1 in place of Silver Iodobromide Emulsion D in the sixth layer.

Each sample was developed by the following processing method.

(Processing Method)

| Step | Processing Time | Processing Temperature |
|---|---|---|
| Color development | 3 min 15 sec | 38° C. |
| Bleaching | 3 min 00 sec | 38° C. |
| Water washing | 30 sec | 24° C. |
| Fixing | 3 min 00 sec | 38° C. |
| Water washing (1) | 30 sec | 24° C. |
| Water washing (2) | 30 sec | 24° C. |
| Stabilization | 30 sec | 38° C. |
| Drying | 4 min 20 sec | 55° C. |

The composition of each processing solution is shown below.

| | (unit: g) |
|---|---|
| (Color Developer) | |
| Diethylenetriaminepentaacetic acid | 1.0 |
| 1-Hydroxyethylidene-1,1-diphosphonic acid | 2.0 |
| Sodium sulfite | 4.0 |
| Potassium carbonate | 30.0 |
| Potassium bromide | 1.4 |
| Potassium iodide | 1.5 mg |
| Hydroxylamine sulfate | 2.4 |
| 4-[N-Ethyl-N-(β-hydroxyethyl)amino]-2-methylaniline sulfate | 4.5 |
| Water to make | 1.0 liter |
| pH (adjusted by potassium hydroxide and sulfuric acid) | 10.05 |
| (Bleaching Solution) | |
| Sodium ethylenediaminetetraacetato ferrate trihydrate | 100.0 |
| Ethylenediaminetetraacetate disodium salt | 10.0 |
| 3-Mercapto-1,2,4-triazole | 0.03 |
| Ammonium bromide | 140.0 |
| Ammonium nitrate | 30.0 |
| Aqueous ammonia (27%) | 6.5 ml |

-continued

| | (unit: g) |
|---|---|
| Water to make | 1.0 liter |
| pH (adjusted by aqueous ammonia and nitric acid) | 6.0 |
| (Fixing Solution) | |
| Ethylenediaminetetraacetic acid disodium salt | 0.5 |
| Ammonium sulfite | 20.0 |
| Aqueous solution of ammonium thiosulfate (700 g/liter) | 295.0 ml |
| Acetic acid (90%) | 3.3 |
| Water to make | 1.0 liter |
| pH (adjusted by aqueous ammonia and acetic acid) | 6.7 |
| (Stabilizing Solution) | |
| p-Nonylphenoxypolyglycidol (average polymerization degree of glycidol: 10) | 0.2 |
| Ethylenediaminetetraacetic acid | 0.05 |
| 1,2,4-Triazole | 1.3 |
| 1,4-Bis (1,2,4-triazol-1-ylmethyl)-piperazine | 0.75 |
| Hydroxyacetic acid | 0.02 |
| Hydroxyethyl cellulose (HEC SP-2000, produced by Dicel Kagaku) | 0.1 |
| 1,2-Benzisothiazolin-3-one | 0.05 |
| Water to make | 1.0 liter |
| pH | 8.5 |

These processed samples each was measured on the density using a red filter, and the fog value, sensitivity and increase in fog during storage were evaluated in the same manner as in Example II-1. The results are shown in Table II-6 below. By the emulsion of the present invention (Em-3AR and Em-4AR), even in the case of a multi-layer color light-sensitive material, high sensitivity and low fog were achieved and small increase of fog during storage was verified.

TABLE II-6

| Sample No. | Gold Sensitizer (mol/mol-Ag) | Sulfur Sensitizer (mol/mol-Ag) | Relative Sensitivity | Δfog | Remarks |
|---|---|---|---|---|---|
| 102 | chloroauric acid ($3 \times 10^{-6}$) | $Na_2S_2O_3$ ($6 \times 10^{-6}$) | 100 | 0.17 | Comparison |
| 103 | HK-1 ($3 \times 10^{-6}$) | $Na_2S_2O_3$ ($6 \times 10^{-6}$) | 103 | 0.18 | Comparison |

TABLE II-6-continued

| Sample No. | Gold Sensitizer (mol/mol-Ag) | Sulfur Sensitizer (mol/mol-Ag) | Relative Sensitivity | Δfog | Remarks |
|---|---|---|---|---|---|
| 104 | 3 ($3 \times 10^{-6}$) | $Na_2S_2O_3$ ($6 \times 10^{-6}$) | 110 | 0.14 | Invention |
| 105 | 5 ($3 \times 10^{-6}$) | $Na_2S_2O_3$ ($6 \times 10^{-6}$) | 109 | 0.13 | Invention |

EXAMPLE II-3

In Samples of Example II-2, a support used in Sample 104 of Example 1 of U.S. Pat. No. 5,597,682 was used in place of the cellulose triacetate film support, namely, a PEN support having provided thereon a subbing layer and a back layer and being subjected to a heat treatment according to the method described in column 21, line 54 to column 23, line 29 of the patent publication. These samples each was loaded into a package unit with a photographing function and evaluated in the same manner as in Example II-2.

As a result, similar results to those in Example II-2 were obtained.

EXAMPLE II-4

A color diffusion transfer light-sensitive material was prepared and processed in the same manner as Sample 102 in Example 1 of JP-A-7-333782 except that Emulsion Em-7AR as the emulsion of Example II-1 of the present invention was used in place of Em-D7 in the 8th, 15th and 22nd layers of Sample 102 of the patent publication. Also, in the same manner as in the Example of JP-A-7-333782, a cover sheet was prepared and processed. The photographic properties (maximum density, gradation) obtained all were good.

By using the compound represented by formula (3) of the present invention, higher sensitivity and lower fog than in the case of adding other gold sensitizers are liable to result and the increase of fog during long-term storage can be prevented.

Furthermore, when the compound represented by formula (3) of the present invention is added for a photographic light-sensitive material using an internal latent image-type direct positive silver halide emulsion, both the midpoint sensitivity and the footing sensitivity can be elevated as compared with the case of adding other gold sensitizers.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A method for preparing a gold sulfide colloid comprising reacting a solution of an Au(I) complex represented by formula (2) with a solution containing a sulfur compound in a protective colloid solution:

$$[L^1\text{-Au(I)-}(L^2)_m]X_n \qquad (2)$$

wherein $L^1$ represents a compound represented by formula (1), $L^2$ represents a compound represented by formula (1) or a halogen atom, provided that $L^1$ and $L^2$ may be the same or different or may be combined, X represents a counter salt necessary for neutralizing the electric charge of the compound, m represents 0 or 1, and n represents a value of 0 to 1 and may be a decimal;

$$R^1\text{—Ch—}R^2 \qquad (1)$$

wherein $R^1$ and $R^2$ each independently represents an alkyl group, an alkenyl group, an alkynyl group, an aryl group or a heterocyclic group, $R^1$ and $R^2$ may combine with each other to form a 3-, 4-, 5-, 6- or 7-membered ring, and Ch represents a sulfur atom, a selenium atom or a tellurium atom.

2. A method of chemically sensitizing a silver halide emulsion, which comprises:

(a) preparing a gold sulfide colloid by reacting a solution of an Au(I) complex represented by formula (2) with a solution containing a sulfur compound in a protective colloid solution:

$$[L^1\text{-Au(I)-}(L^2)_m]X_n \qquad (2)$$

wherein $L^1$ represents a compound represented by formula (1), $L^2$ represents a compound represented by formula (1) or a halogen atom, provided that $L^1$ and $L^2$ may be the same or different or may be combined, X represents a counter salt necessary for neutralizing the electric charge of the compound, m represents 0 or 1, and n represents a value of 0 to 1 and may be a decimal;

$$R^1\text{—Ch—}R^2 \qquad (1)$$

wherein $R^1$ and $R^2$ each independently represents an alkyl group, an alkenyl group, an alkynyl group, an aryl group or a heterocyclic group, $R^1$ and $R^2$ may combine with each other to form a 3-, 4-, 5-, 6- or 7-membered ring, and Ch represents a sulfur atom, a selenium atom or a tellurium atom; and (b) chemically sensitizing a silver halide emulsion using the gold sulfide colloid.

3. The method for preparing a gold sulfide colloid as claimed in claim 1, wherein $L^1$ and $L^2$ in formula (2) are the same compound and the metal complex is a symmetric gold complex.

4. The method for preparing a gold sulfide colloid as claimed in claim 1, wherein in formula (2), either $L^1$ or $L^2$ is substituted by at least one water-soluble group.

5. The method for preparing a gold sulfide colloid as claimed in claim 1, wherein in formula (2), $L^1$ and $L^2$ are substituted by at least one water-soluble group.

6. The method for preparing a gold sulfide colloid as claimed in claim 1, wherein the reaction temperature is from 0 to 100° C.

7. The method for preparing a gold sulfide colloid as claimed in claim 1, wherein one of said solution of an Au(I) complex represented by formula (2) and said solution containing a sulfur compound is added to said protective colloid solution first and the other is added later.

8. The method for preparing a gold sulfide colloid as claimed in claim 1, wherein both of said solution of an Au(I) complex represented by formula (2) and said solution containing a sulfur compound are simultaneously added dropwise to said protective colloid solution.

9. The method for preparing a gold sulfide colloid as claimed in claim 1, wherein the gold concentration of the gold sulfide colloid is, in terms of the gold atom concentration, from 0.1 to 100 mmol/kg.

10. The method for preparing a gold sulfide colloid as claimed in claim 1, wherein the sulfur compound is added in an amount of from 0.5 to 10 molar times amount of the Au(I) complex represented by formula (2).

11. The method for preparing a gold sulfide colloid as claimed in claim 1, wherein the colloidal gold sulfide is prepared without producing environmentally harmful cyan ion.

12. The method for preparing a gold sulfide colloid as claimed in claim 1, further comprising preparing said solution of an Au(I) complex represented by formula (2) by adding an excess amount of a compound represented by formula (1) to a solution of an Au(III) compound.

13. The method for preparing a gold sulfide colloid as claimed in claim 12, wherein said Au(III) compound is selected from the group consisting of chloroauric acid, sodium tetrachloroaurate, sodium tetrabromoaurate, potassium tetrachloroaurate, potassium tetrabromoaurate, ammonium tetrachloroaurate, ammonium tetrabromoaurate, auric chloride, auric bromide, auric iodide, potassium auric iodide and Au(III) hydroxide.

14. The method for preparing a gold sulfide colloid as claimed in claim 12, wherein said excess amount is 2 to 100 molar times.

15. The method for preparing a gold sulfide colloid as claimed in claim 1, wherein said solution containing a sulfur compound comprises a labile sulfur compound selected from the group consisting of a thiosulfate, thiourea, thioamide, rhodanine, phosphinesulfide, thiohydantoin, 4-oxo-oxazolidine-2-thione, disulfide, dipolysulfide, mercapto compound, polythionate, elemental sulfur, hydrogen sulfide, sodium sulfide, sodium hydrosulfide, and active gelatin and water or an organic solvent.

16. The method for preparing a gold sulfide colloid as claimed in claim 1, wherein said protective colloid solution is selected form the group consisting of gelatin, gelatin derivative, graft polymer of gelatin with another polymer, albumin, casein; sugar derivative, cellulose derivative, sodium alginate, starch derivative; and homo- or co-polymer of polyvinyl alcohol, polyvinyl alcohol partial acetal, poly-N-vinylpyrrolidone, polyacrylic acid, polymethacrylic acid, polyacrylamide, polyvinylimidazole and polyvinylpyrazole.

17. The method for preparing a gold sulfide colloid as claimed in claim 1, wherein said protective colloid solution is gelatin.

18. The method for chemically sensitizing a silver halide emulsion as claimed in claim 2, wherein $L^1$ and $L^2$ in formula (2) are the same compound and the metal complex is a symmetric gold complex.

19. The method for chemically sensitizing a silver halide emulsion as claimed in claim 2, wherein in formula (2), either $L^1$ or $L^2$ is substituted by at least one water-soluble group.

20. The method for chemically sensitizing a silver halide emulsion as claimed in claim 2, wherein in formula (2), $L^1$ and $L^2$ are substituted by at least one water-soluble group.

* * * * *